United States Patent [19]
Ikeda et al.

[11] Patent Number: 5,720,014
[45] Date of Patent: Feb. 17, 1998

[54] IMAGE PROCESSING APPARATUS CONNECTABLE TO AN INFORMATION PROCESSING TERMINAL

[75] Inventors: Atsushi Ikeda, Tokorozawa; Masatomo Takahashi, Tokyo; Soichi Yamamuro, Tokyo; Nobuyuki Hirai, Tokyo; Masaya Kondo, Yokohama; Takekazu Kumagai, Tokyo; Kazuomi Oishi, Yokohama, all of Japan

[73] Assignee: Canon Kabushiki Kaisha, Japan

[21] Appl. No.: 424,085

[22] Filed: Apr. 19, 1995

[30] Foreign Application Priority Data

Apr. 20, 1994 [JP] Japan .................. 6-081583

[51] Int. Cl.⁶ .................................. H04N 1/32
[52] U.S. Cl. .............. 395/114; 358/457; 358/442
[58] Field of Search .................. 358/400, 434, 358/437, 442, 468; 395/113, 114, 200.02, 200.12, 835–839; 379/100.06; H04N 1/32

[56] References Cited

U.S. PATENT DOCUMENTS

| | | | |
|---|---|---|---|
| 4,727,435 | 2/1988 | Otani et al. ................ | 358/468 |
| 4,947,345 | 8/1990 | Paradise et al. . | |
| 5,124,809 | 6/1992 | Koishikawa . | |
| 5,159,692 | 10/1992 | Imai et al. . | |
| 5,237,427 | 8/1993 | Mizutori . | |
| 5,253,077 | 10/1993 | Hasegawa et al. . | |
| 5,283,638 | 2/1994 | Engberg et al. . | |
| 5,377,016 | 12/1994 | Kashiwagi et al. ........ | 358/468 |
| 5,428,458 | 6/1995 | Aiba et al. ................. | 358/468 |
| 5,459,579 | 10/1995 | Hu et al. .................... | 358/434 |
| 5,563,986 | 10/1996 | Suzuki ........................ | 358/468 |

FOREIGN PATENT DOCUMENTS

| | | |
|---|---|---|
| 0366425 | 5/1990 | European Pat. Off. . |
| 0465765 | 1/1992 | European Pat. Off. . |
| 0478340 | 4/1992 | European Pat. Off. . |
| 0545446 | 6/1993 | European Pat. Off. . |
| 0576226 | 12/1993 | European Pat. Off. . |
| WO9318610 | 9/1993 | WIPO . |

OTHER PUBLICATIONS

Pat. Abs. Jp., vol. 18, No. 630 (P-1835) Nov. 30, 1994 (JP-A-06242893).

Primary Examiner—Kim Vu
Attorney, Agent, or Firm—Fitzpatrick, Cella, Harper & Scinto

[57] ABSTRACT

Disclosed is an image processing apparatus.

The image processing apparatus comprises interface means for exchanging data with an external information processing terminal, instruction receipt means for receiving an instruction via said interface means from said external information processing terminal, and control means for controlling various processes, such as communication, image recording, and image reading, in consonance with said instruction received by said instruction receipt means, and wherein said instruction receipt means receives another instruction though a control process for one instruction is being performed.

18 Claims, 48 Drawing Sheets

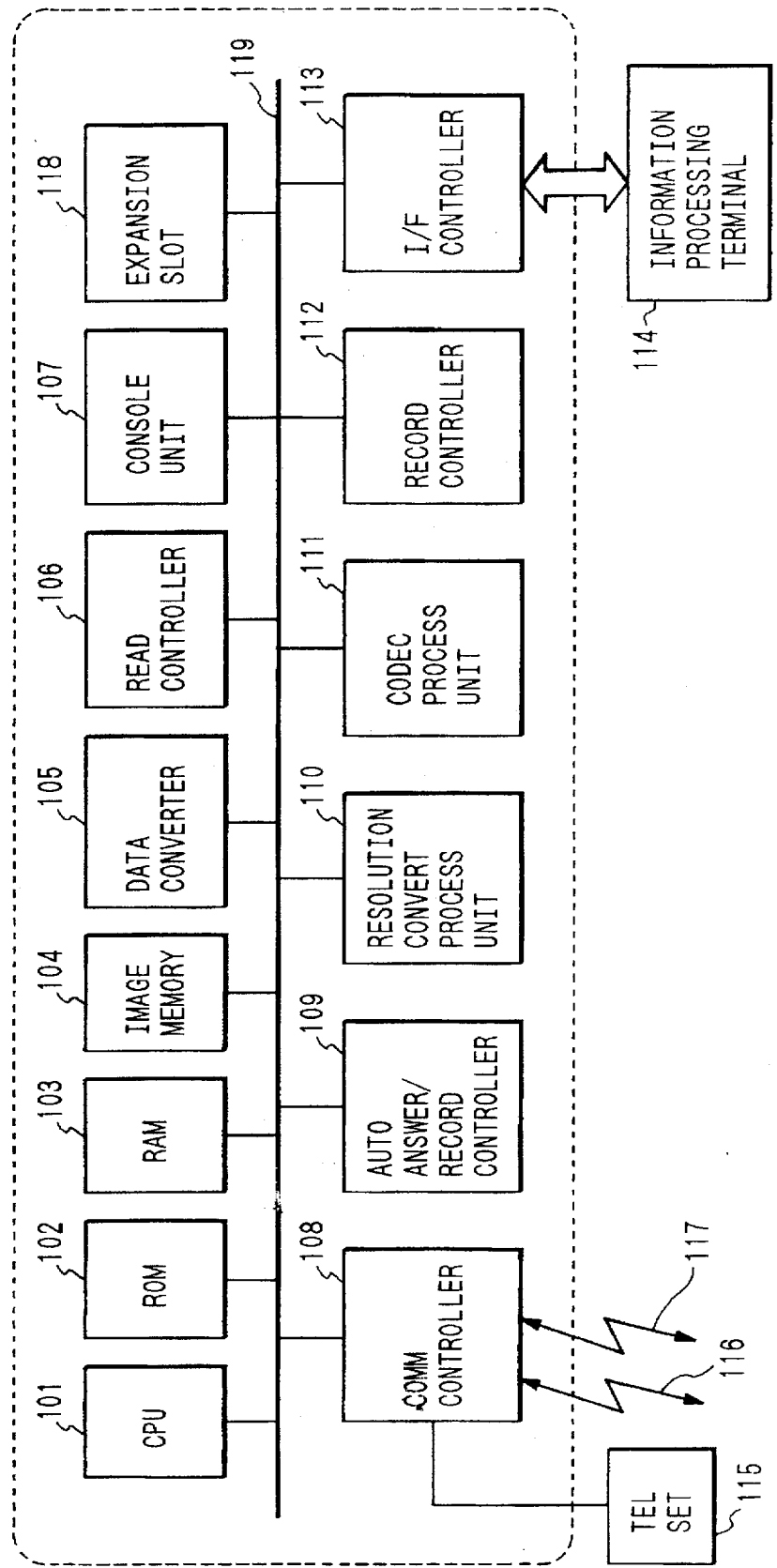

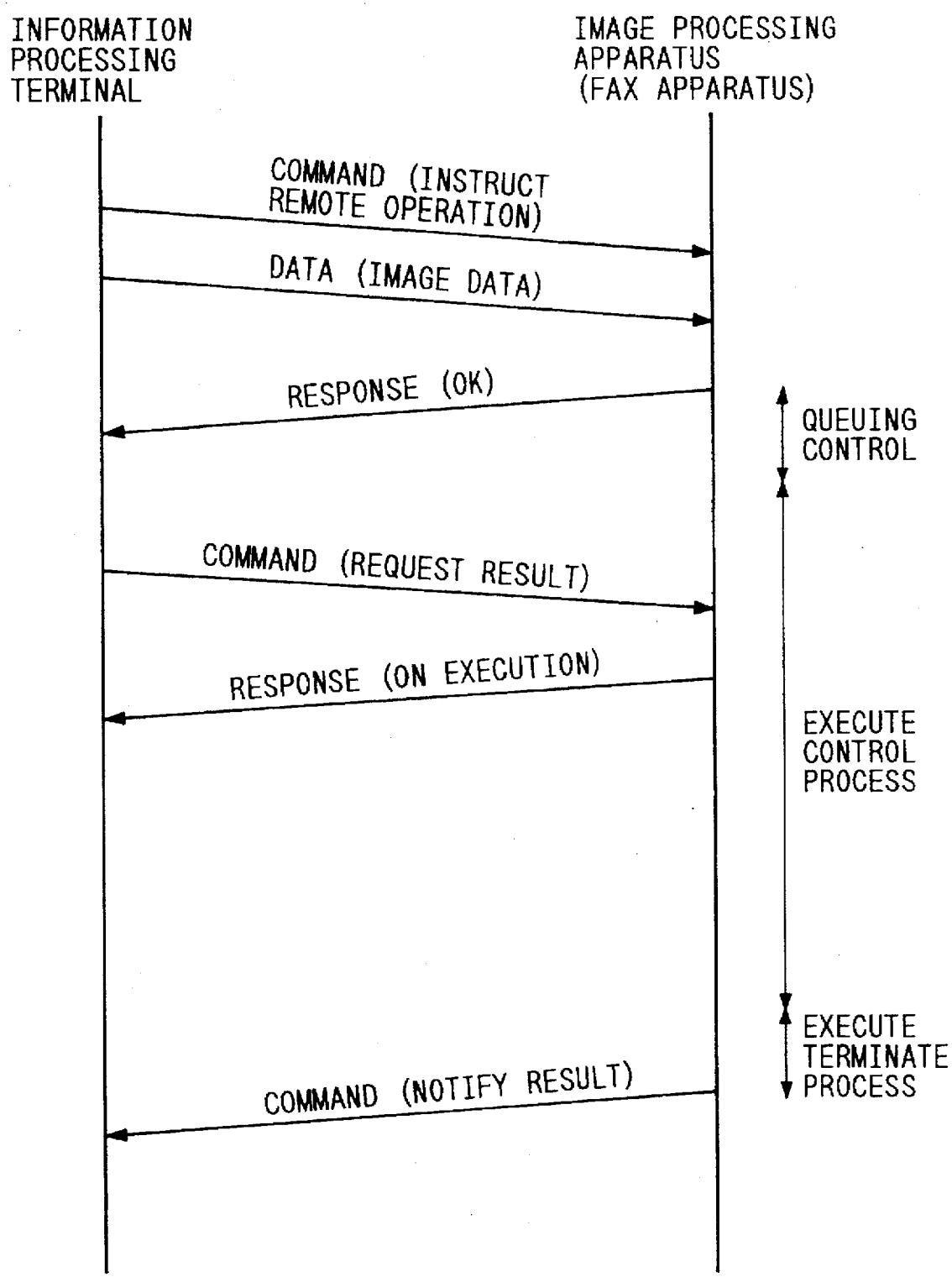

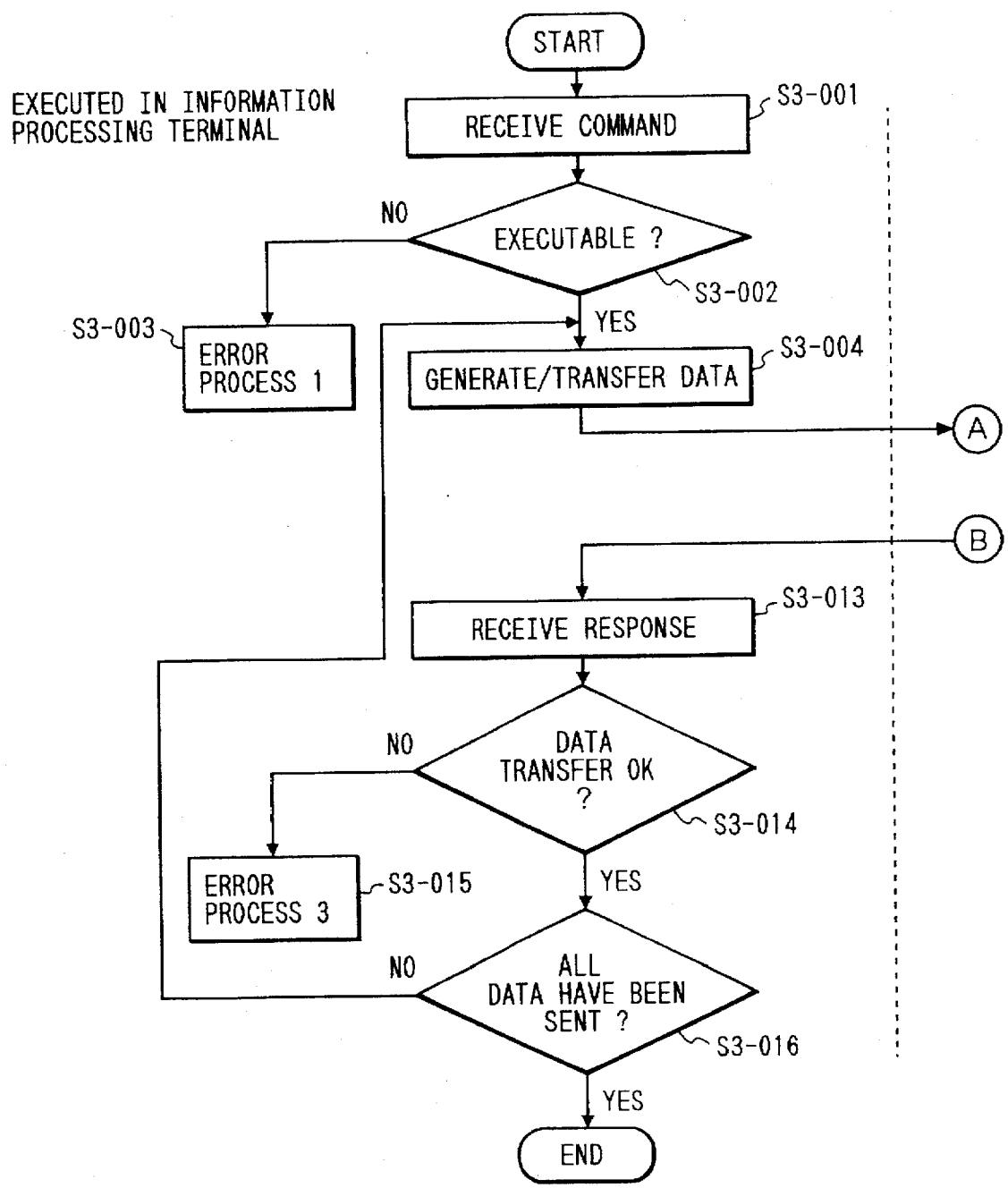

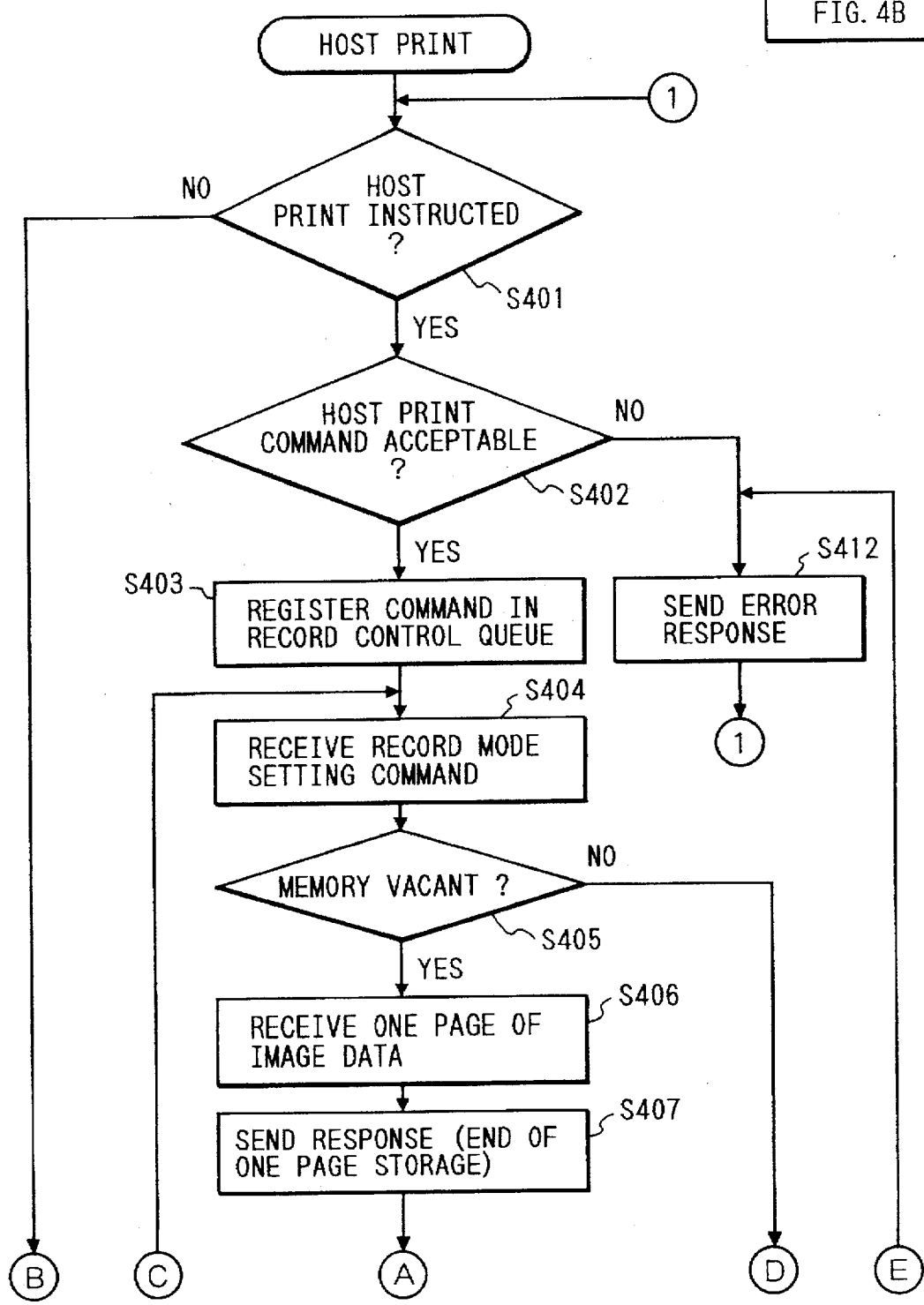

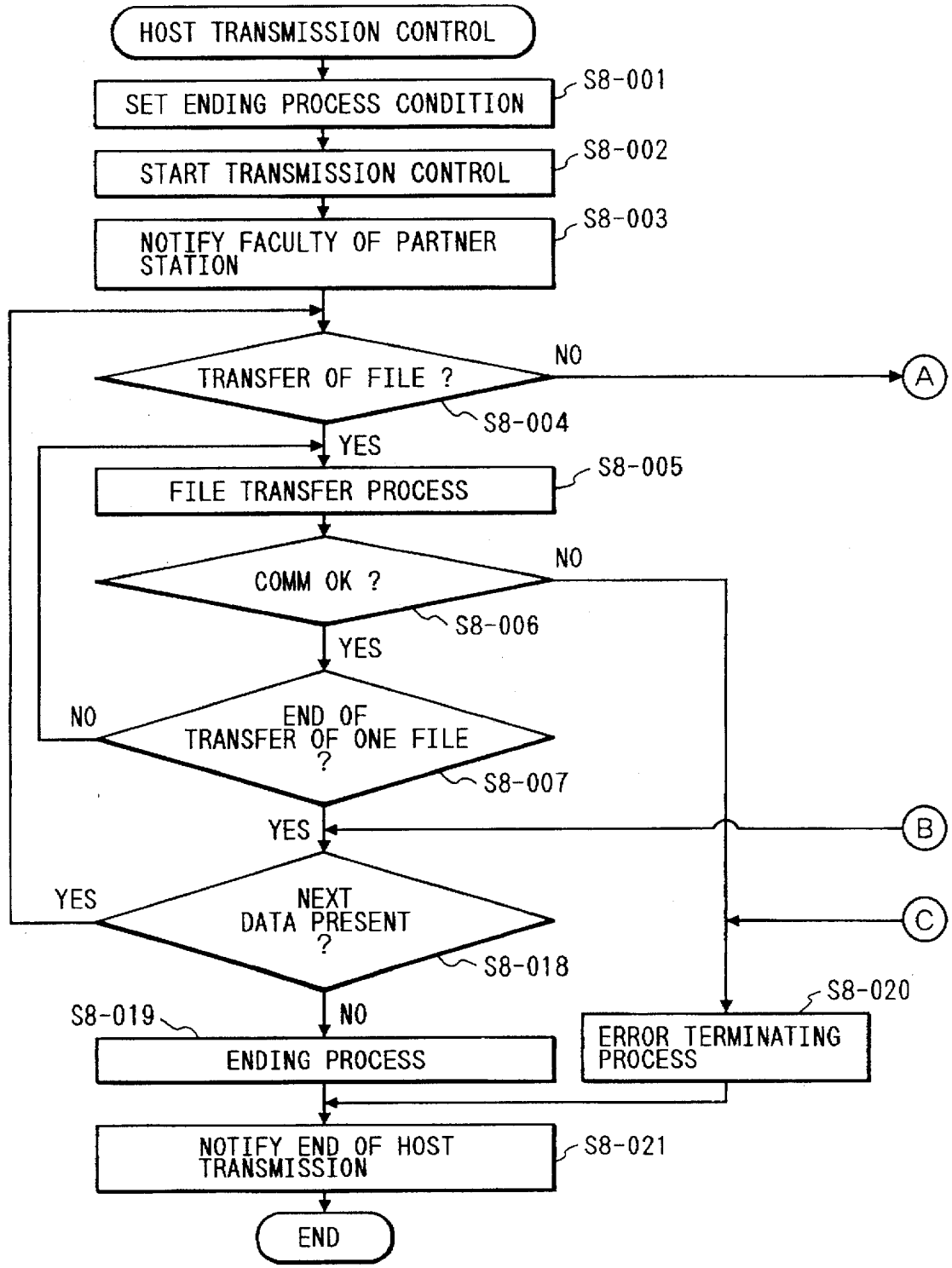

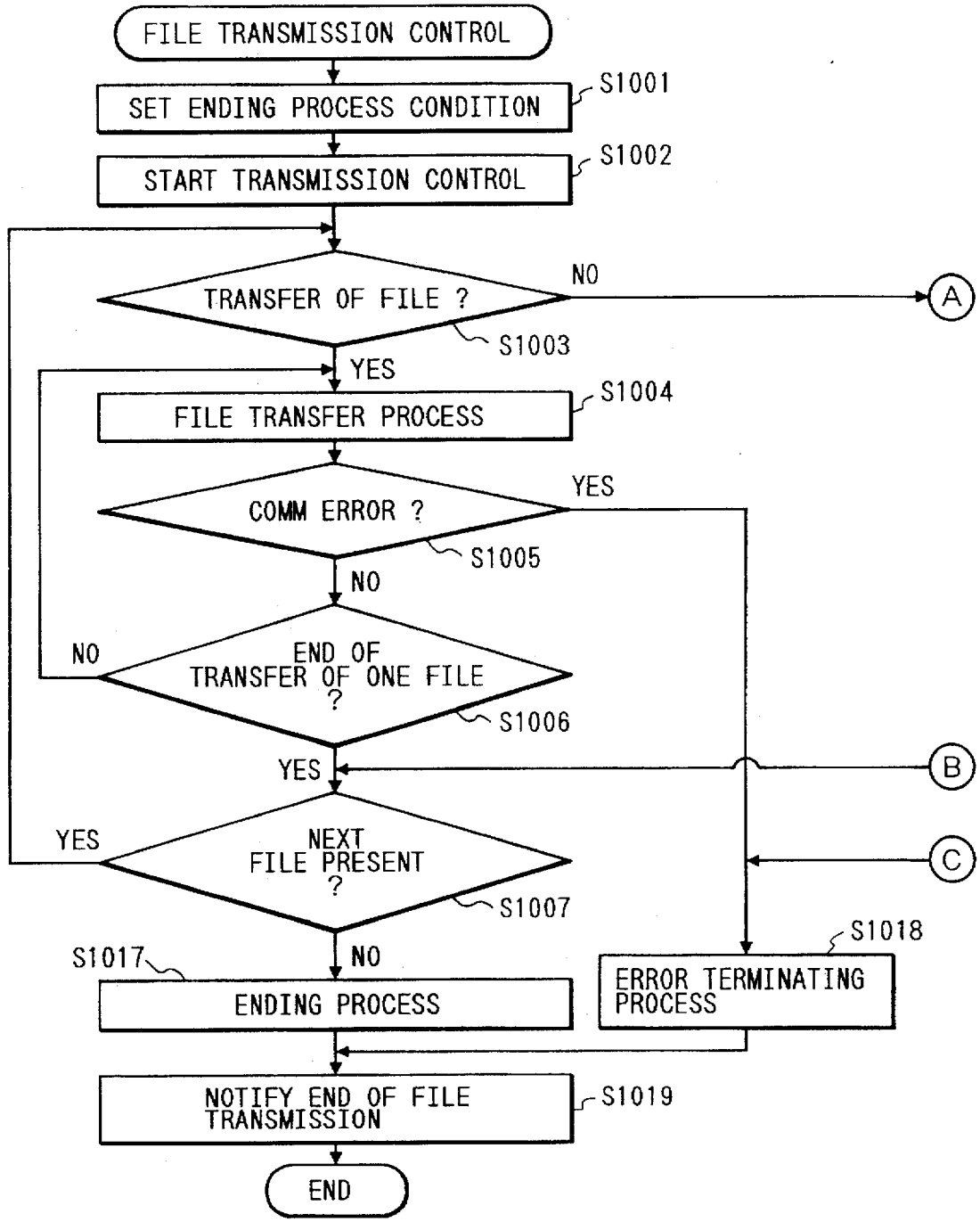

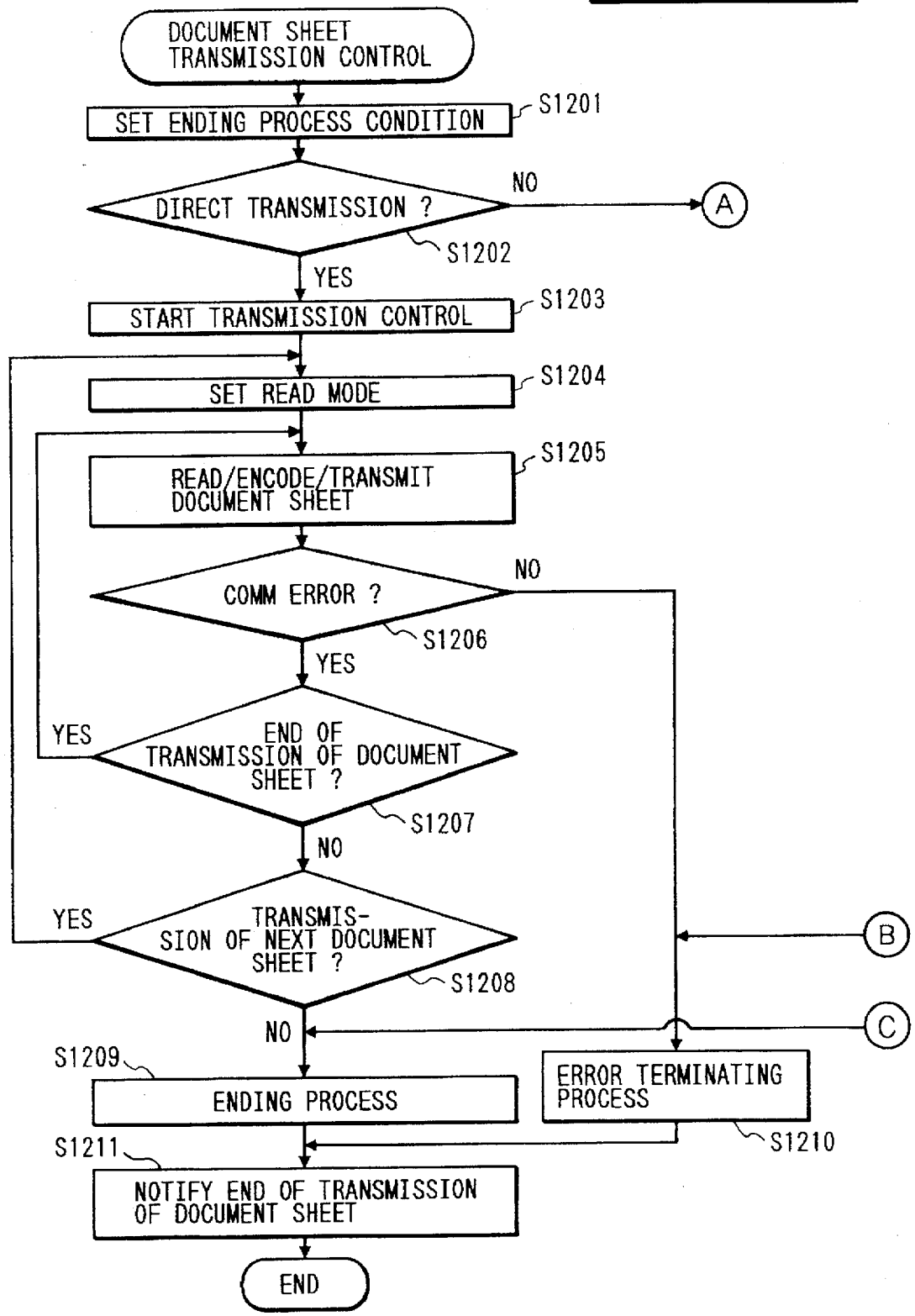

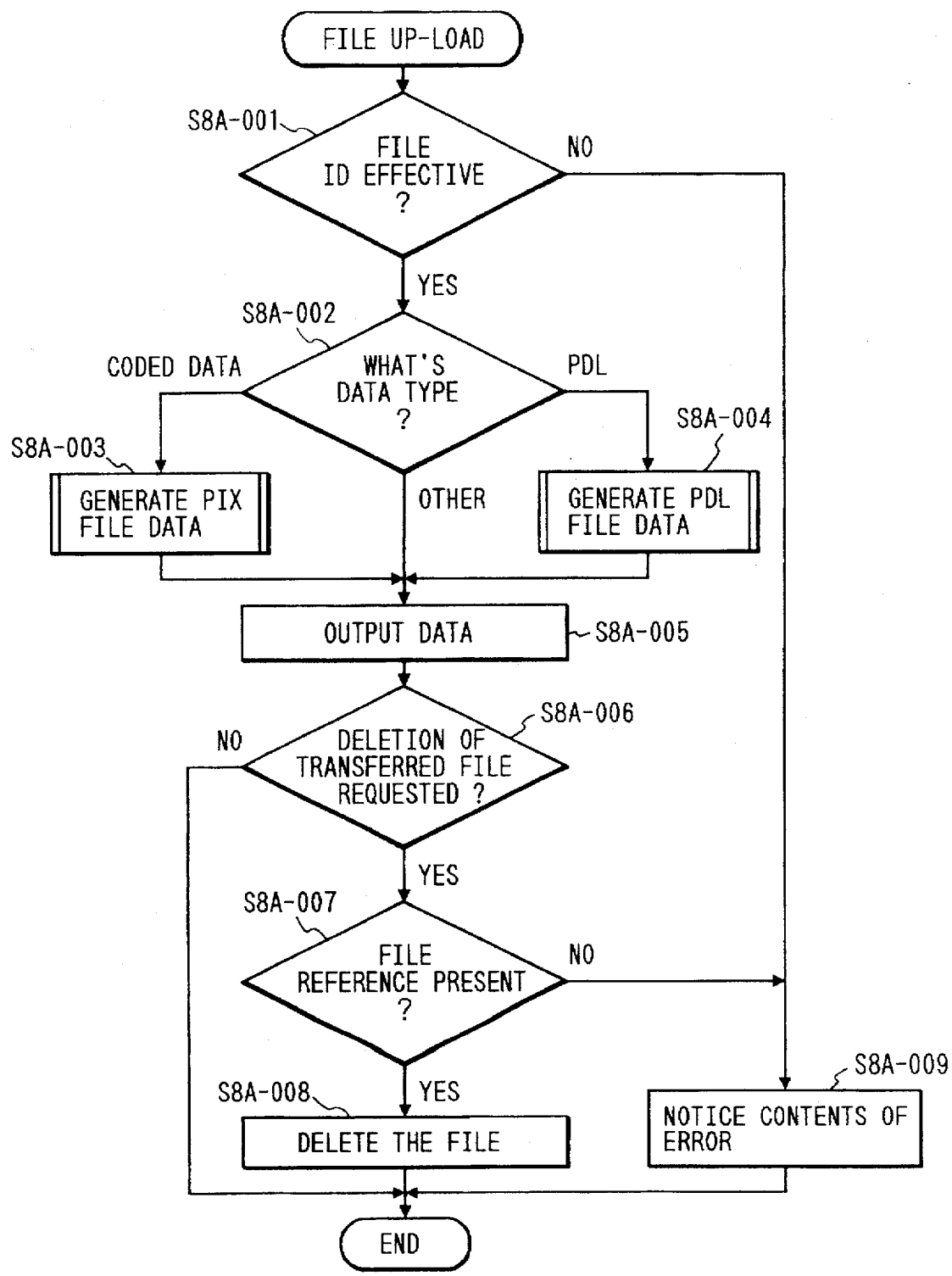

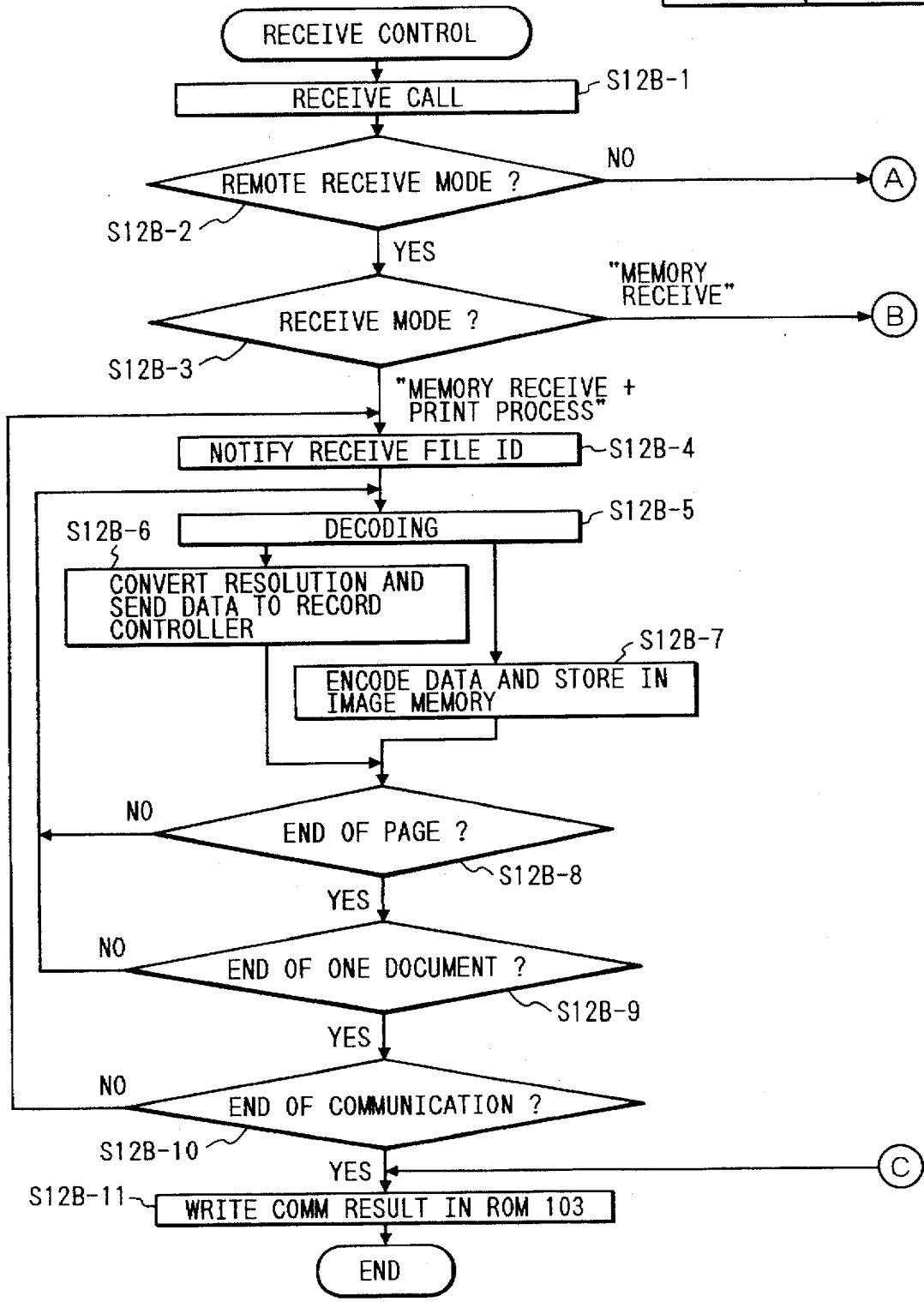

FIG. 26

| SERVICE ID |
|---|
| COMM MODE |
| COMM START TIME [7] DATE, TIME, DAY OF WEEK |
| COMM END TIME [7] DATE, TIME, DAY OF WEEK |
| LINE |
| TEL NUMBER OF PARTNER [60] |
| SUB-ADDRESS OF PARTNER [10] |
| TID OF PARTNER [24] |
| ABBREV. NAME OF PARTNER [24] |
| NUMBER OF PAGES |
| RECEIVE BOX NUMBER |
| CHARGE DATA |
| COMM RESULT |
| FILE ID |
| COMM COMPLETION FLAG |

| SERVICE ID |
|---|
| COMM MODE |
| COMM START TIME [7] DATE, TIME, DAY OF WEEK |
| COMM END TIME [7] DATE, TIME, DAY OF WEEK |
| LINE |
| TEL NUMBER OF PARTNER [60] |
| SUB-ADDRESS OF PARTNER [10] |
| TID OF PARTNER [24] |
| ABBREV. NAME OF PARTNER [24] |
| NUMBER OF PAGES |
| RECEIVE BOX NUMBER |
| CHARGE DATA |
| COMM RESULT |
| FILE ID |
| COMM COMPLETION FLAG |

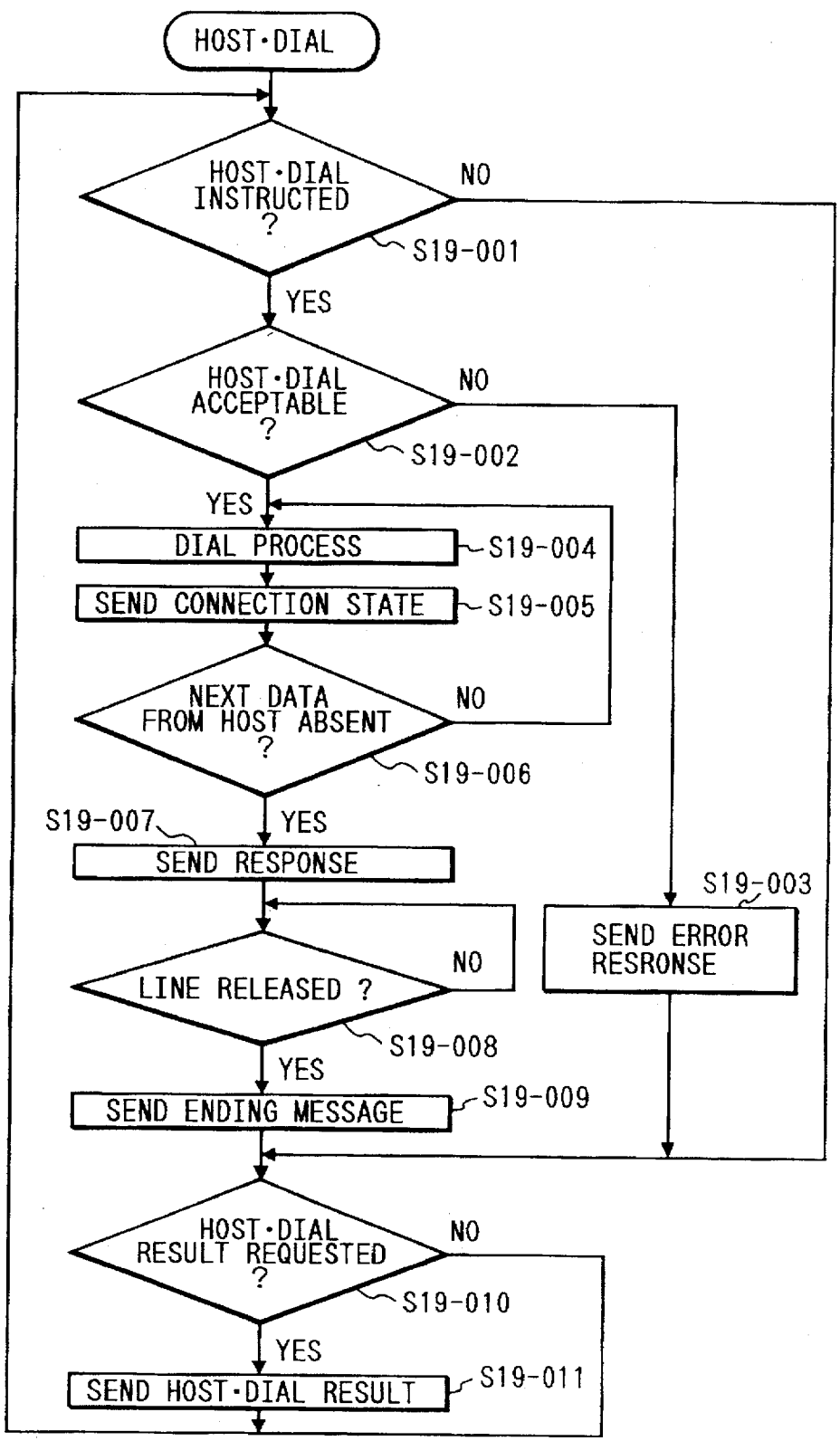

IMAGE PROCESSING APPARATUS CONNECTABLE TO AN INFORMATION PROCESSING TERMINAL

BACKGROUND OF THE INVENTION

1. Field of the Invention

The present invention relates to an image processing apparatus that can be connected to an information processing terminal.

2. Related Background Art

Conventionally, among such image processing apparatuses as facsimile apparatuses, for example, their reading, recording, and communication functions can be used at an information processing terminal. Such a facsimile apparatus is connected to an information processing terminal via a serial interface, such as an RS232C interface. As soon as the facsimile apparatus has completed the processing of a single command received from the information processing terminal, it receives the next command.

The above described facsimile apparatus, however, can not perform an individual process for a single command that is sent from the information processing terminal. Further, commands that are output by the information processing terminal are simple, merely for initiating the reading of data or only for transmitting data that are received from the information processing terminal, for example, and such commands do not effectively utilize the software that is available at the information processing terminal.

Although there are information processing terminals that can issue a plurality of commands by performing a multitask process, since the above described facsimile apparatus will accept only a single command, in effect, the functions of the information processing terminal can not be adequately used.

SUMMARY OF THE INVENTION

To solve the above shortcomings, it is one object of the present invention to provide an improved image processing apparatus.

It is another object of the present invention to provide an image processing apparatus that accepts as many commands as possible from an information processing terminal so as to efficiently utilize the functions that are available at the information processing terminal.

It is an additional object of the present invention to provide an image processing apparatus that executes various processes in response to commands from an information terminal.

Other objects of the present invention will become apparent while referring to the following detailed description of embodiments and the accompanying drawings.

BRIEF DESCRIPTION OF THE DRAWINGS

FIG. 1 is a block diagram illustrating the arrangement of a facsimile apparatus according to one embodiment of the present invention;

FIG. 2 is a diagram showing a communication sequence between an information processing terminal 114 and a facsimile apparatus;

FIG. 13 is a flowchart showing the control process performed by the CPU 101 for a file up-load function;

FIG. 43 is a flowchart showing the control process performed by the CPU 101 for a host dial function.

DETAILED DESCRIPTION OF THE PREFERRED EMBODIMENTS

Figure 3B:
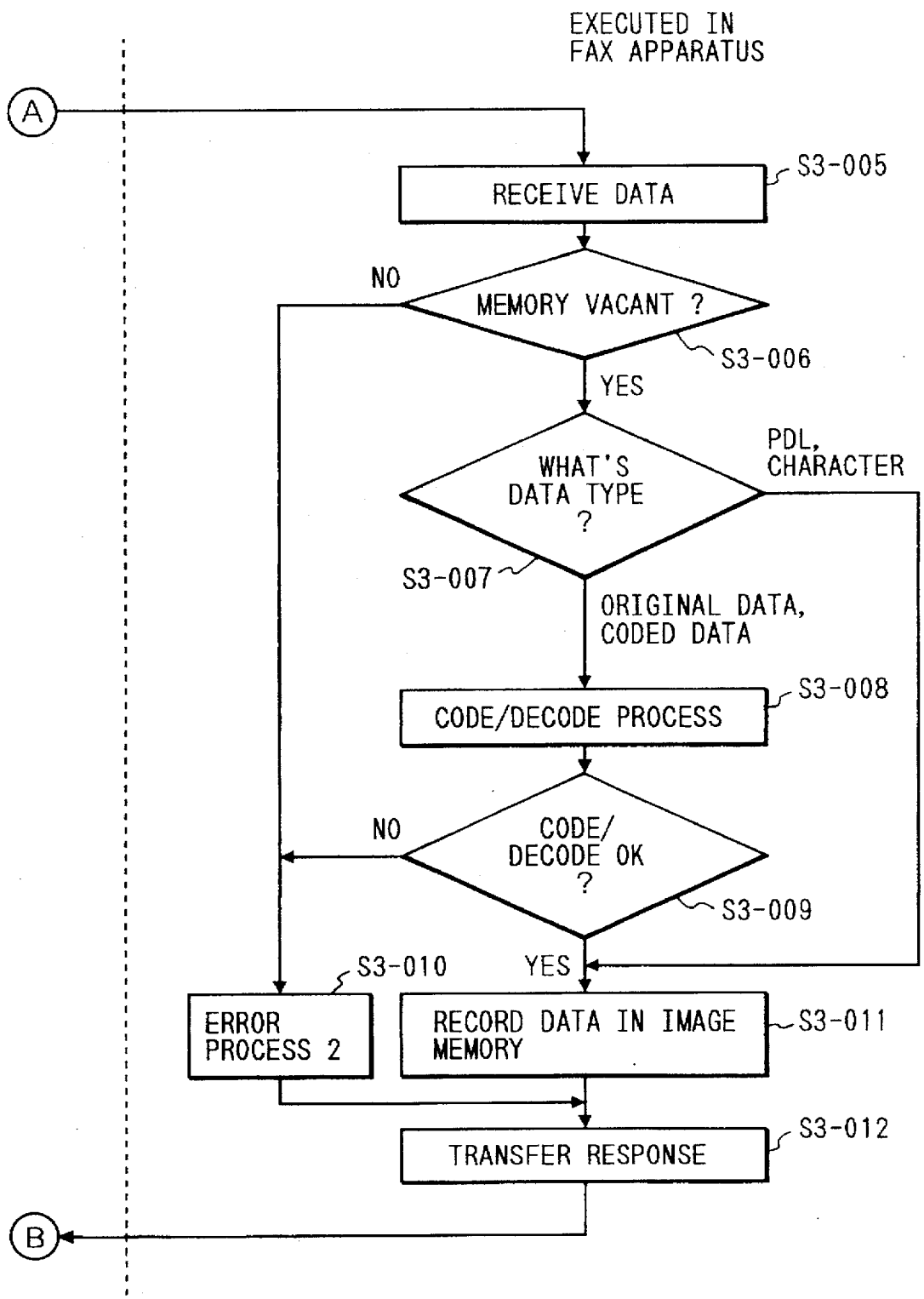
FIG. 3 which is composed of FIGS. 3A and 3B is a flowchart showing the control processing performed by the information processing terminal 114 in a download function and of a CPU 101 of the facsimile apparatus.

The preferred embodiments of the present invention will now be described in detail while referring to the accompanying drawings.

In the following embodiment, an explanation is given for a facsimile apparatus that is employed as an image processing apparatus.

FIG. 1 is a schematic diagram illustrating the arrangement of an image processing apparatus (a facsimile apparatus) according to the embodiment of the present invention.

A CPU 101, a system controller, controls the entire image processing apparatus via a system bus 119.

A ROM 102 is employed to store control programs and an operating system (OS) for the CPU 101. A RAM 103, which is constituted by SRAM, etc., is employed to store program control variables, etc. A set value that an operator has registered, management data for the apparatus, and various work buffers are also stored in the RAM 103. An image memory 104 is designed to use DRAM, etc., to store image data. In this embodiment, the control programs stored in the ROM 102 are employed for software control, such as the scheduling and the task switching that is controlled by the OS that is stored in the ROM 102.

A console unit 107, which is constituted by various keys, an LED, and an LCD, and is employed for various input manipulations that are performed by an operator and for displaying the operational state of the image processing apparatus.

A read controller 106 is so designed that it includes a CS image sensor (close contact image sensor) and an image processor. In the read controller 106, the CS image sensor optically reads a document and converts the data it has read into electric image data, and the image processor performs various image processing, such as a binary process and a halftone process, and outputs high precision image data. It should be noted that the read controller 106 in this embodiment will work with both a sheet reading system, which reads a document as feeding it, and a book reading system, which scans a document that is placed on a document support plate.

A record controller 112 includes a page printer, such as a laser beam printer or an ink-jet printer, a sorter, and an image processing section. In the record controller 112, the image processing section performs various image processing procedures, such as smoothing and record density correction, on image data that is to be recorded, in order to convert the data into high precision image data, and the page printer prints the converted image data. In this embodiment, a sorter stores sheets of recording papers, which are to be output by the page printer, in a predetermined bin.

A communication controller 108 includes a MODEM (MOdulator-DEModulator) and an NCU (Network Control Unit). The communication controller 108 in this embodiment can be connected to an analog communication line (PSTN) 116 and a digital communication line (ISDN) 117. It controls communication by means of G3 and G4 protocols, and performs line control for issuing and receiving calls through the communication lines. Further, a telephone set 115 is connected to the communication controller 108 to enable communication and a DTMF remote control. An auto answer/record controller 109 includes a voice IC and a voice recording/reproduction section, and auto answering/recording functions.

A codec (code/decode) processing unit 111 performs coding/decoding and enlarging/reducing of image data that are used in the image processing apparatus. A resolution conversion process unit 110 performs data conversions, such as millimeter to inch conversions, for image resolution. The resolution conversion process unit 110 can also alter data for the enlargement and reduction of images. Further, a data converter 105 performs image data conversion, such as the analysis of a page description language (PDL) and the CG development of character data.

An I/F controller 113 performs the interface control that is required for an information processing terminal 114, such as a personal computer or a word processor that is connected externally. In this embodiment, the I/F controller 113 manages a serial interface such as an RS232C, a parallel interface such as a Centronics interface, or a LAN interface. The remote operations from the information processing terminal 114, such as transmission, printing, and data registration, are performed by transmitting predetermined command, parameter, data, etc., to the image processing apparatus via the I/F controller 113. It should be noted that application software and driver software for remote operations are installed in the information processing terminal 114 in this embodiment.

An expansion slot 118, which is a slot for inserting an optional board into the image processing apparatus, is employed to attach various optional boards, such as an expanded image memory, an SCSI interface board, and a video interface board.

The basic operation for the interface control with the information processing terminal (host) will now be described while referring to FIG. 2.

FIG. 2 is a schematic diagram showing the exchange, transmission and reception, of data by the information processing terminal 114 and the I/F controller 113 in this embodiment.

The remote operation by the information processing terminal 114 is performed by transmitting and receiving commands, image data, and responses for each processing procedure that are in accordance with a determined interface protocol. Each command includes a command code for identifying the command and set values (recording paper size, destination telephone number, image data type, etc.) that are required for the execution of the command. The image data are transmitted or received regarding an image data request command or an image data transfer command.

It is possible to designate, for a command, ending processing conditions that are related to various controls, and abnormal ending processing conditions when abnormalities occur in the apparatus. The designation of an end processing condition is performed to specify a control procedure (e.g., the clearing of selected image data) that the image processing apparatus will execute when the control is ended. The designation of an abnormal end processing condition is performed to specify the control procedure (e.g., the execution of an error retransmission) that the image processing apparatus executes when an abnormality (e.g., a communication error, the jamming of recording paper, etc.) occurs in the apparatus. By designating the ending processing condition and the abnormal processing condition, it is possible to set the condition for the end process so that it is in consonance with a command type and command characteristic, independently the status of the image processing apparatus. In a command, it is also possible to establish a priorities that are employed to determine the order in which various controls are performed.

For the remote operation, a command that corresponds to the remote operation is transmitted by the information processing terminal 114 to the image processing apparatus. The image processing apparatus analyzes the received command, determines whether it can accept the command, and then transmits a response relative to the command to the information processing terminal 114. The response includes the result relative to the accepted command and a service ID for identifying a command. After having transmitted the response, the image processing apparatus begins to set various controls, such as communication and recording, in consonance with the accepted command. When the apparatus has terminated the various control processes (including an error end process), it performs an ending process that is designated in advance by a command, and transmits an ending message to the information processing terminal 114. The ending message includes the above service ID and the processing result (ending/error code, etc.).

In addition, a queuing control function for commands that are employed for various remote operations is available with this embodiment. The queuing control function enables the image processing apparatus to accept subsequent commands during or before the execution by the apparatus of the control process that corresponds to one command. For the queuing control function in this embodiment, when a command is received by the information processing terminal 114, the command is analyzed to make reservation for controls for various control queues, such as a communication control queue and a record control queue, in consonance with command types. The various controls are conducted by sequentially executing the commands in the control queue. When the priorities of the commands are set, the command control can be performed in the priority order. The queuing control function and the priority control function enable an interrupt process in which a specific control is executed first. Further, by performing the queuing control, a plurality of commands can be accepted and the control processes, such as communication control and recording control, can be simultaneously executed, thus ensuring more efficient operation of the image processing apparatus. In addition, since the service ID is issued upon the acceptance of the command, even when the rotation of the execution order for the control queues is performed, the information processing terminal 114 can be informed of the result obtained from the execution by the image processing apparatus.

As the ending processing condition and the abnormality processing condition can be set by a command using the following functions, the condition setting for the ending process is possible that is in consonance with the types and the characteristics of commands, independently of the status of the image processing apparatus.

Further, by performing the command queuing control function, a plurality of commands can be accepted and the communication control function, the recording control function, etc., can be performed at the same time, thus ensuring more efficient operation of the image processing apparatus.

In addition, since the service ID is issued upon the acceptance of the command, even when the rotation of the command execution order is performed to alter the order, the result obtained by the execution of the image processing apparatus can be notified to the information processing terminal.

By performing the priority control function, an interrupt process in which a specific control function is performed first is possible.

The functions of the image processing apparatus (facsimile apparatus) in this embodiment will now be explained.

1. Download function (FIGS. 3A and 3B)

Function for loading image data, which the information processing terminal (host) 114 transfers, into an image memory of the facsimile apparatus.

Figure 4B:
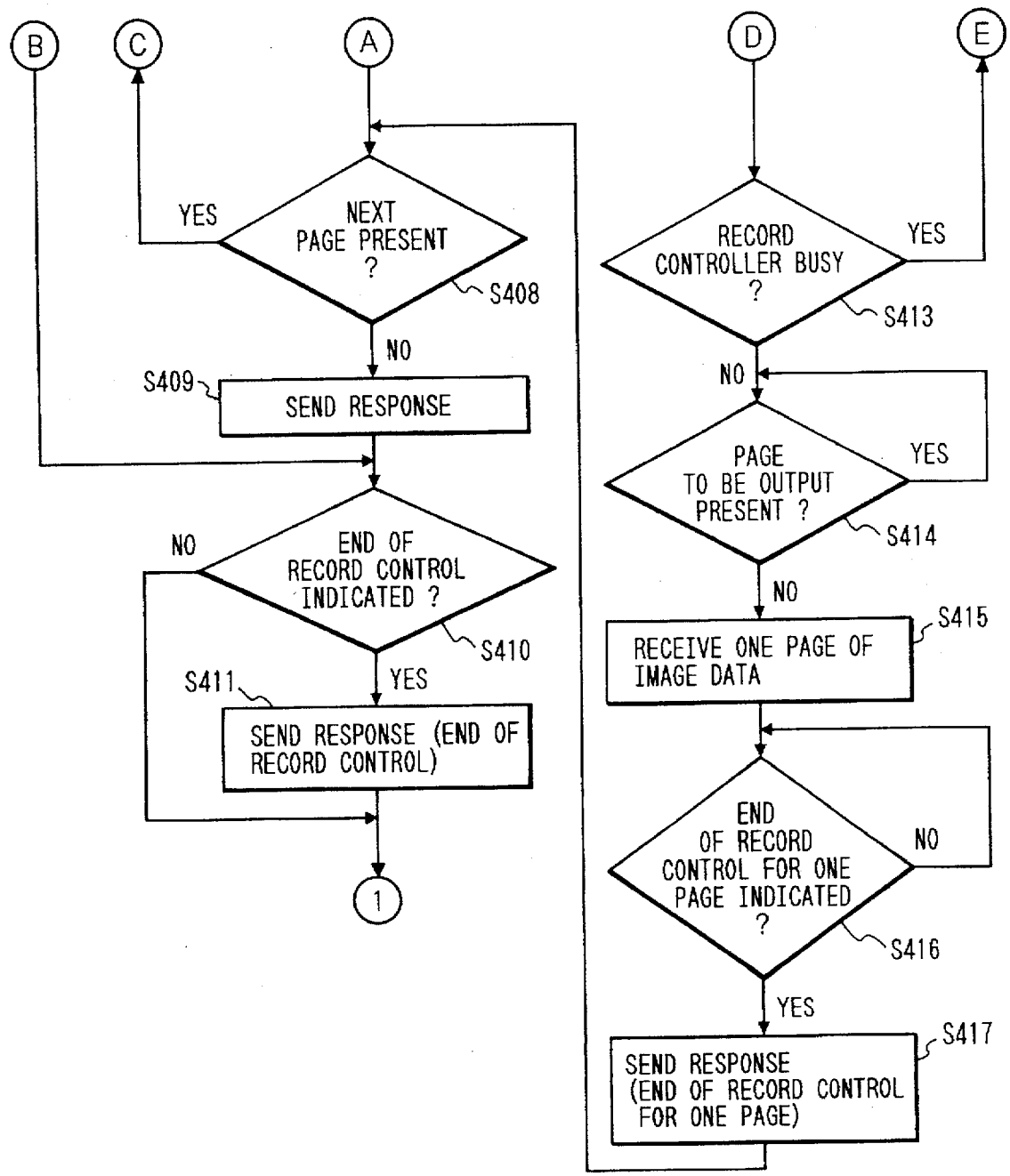
FIG. 4 which is composed of FIGS. 4A and 4B is a flowchart showing the control processing performed by the CPU 101 for a host print function.
Figure 5:
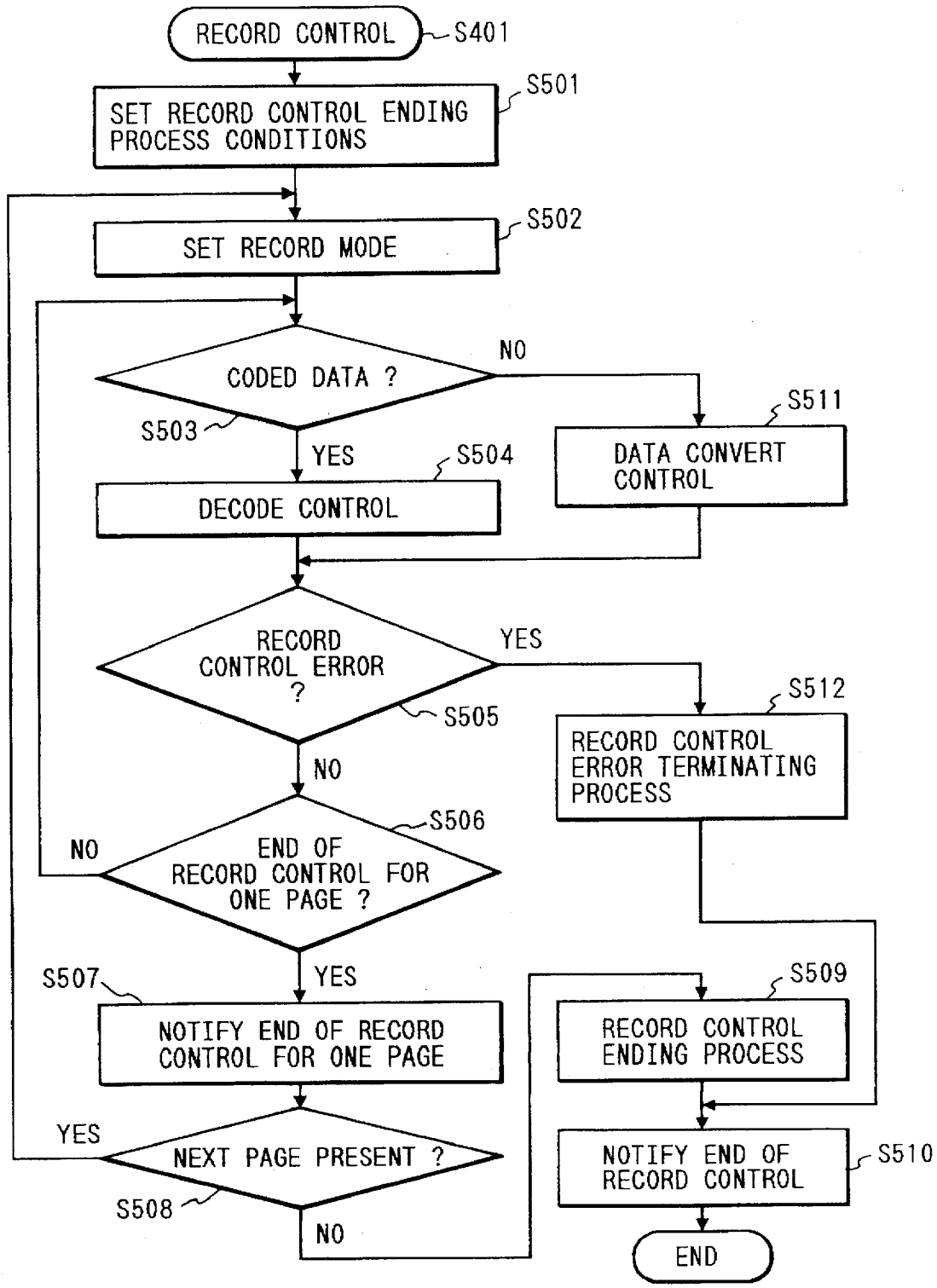
FIG. 5 is a flowchart showing the control process performed by the CPU 101 for the host print function.

2. Host print function (FIGS. 4A to 5)

Function for printing image data that are transferred by the host.

Figure 6:
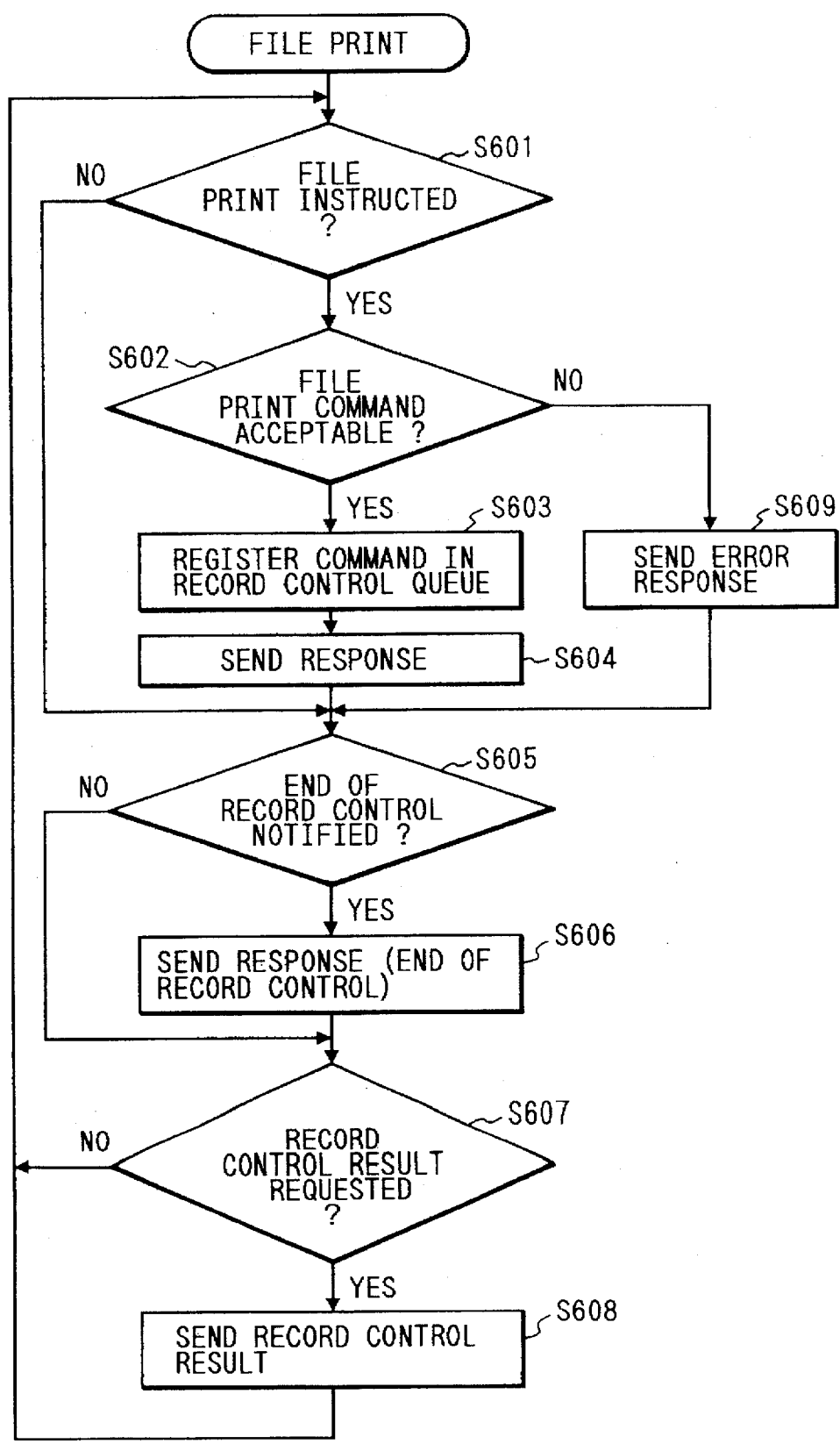
FIG. 6 is a flowchart showing the control process performed by the CPU 101 for a file print function.

3. File print function (FIG. 6)

Function for the printing of an image file by the facsimile apparatus.

Figure 7:
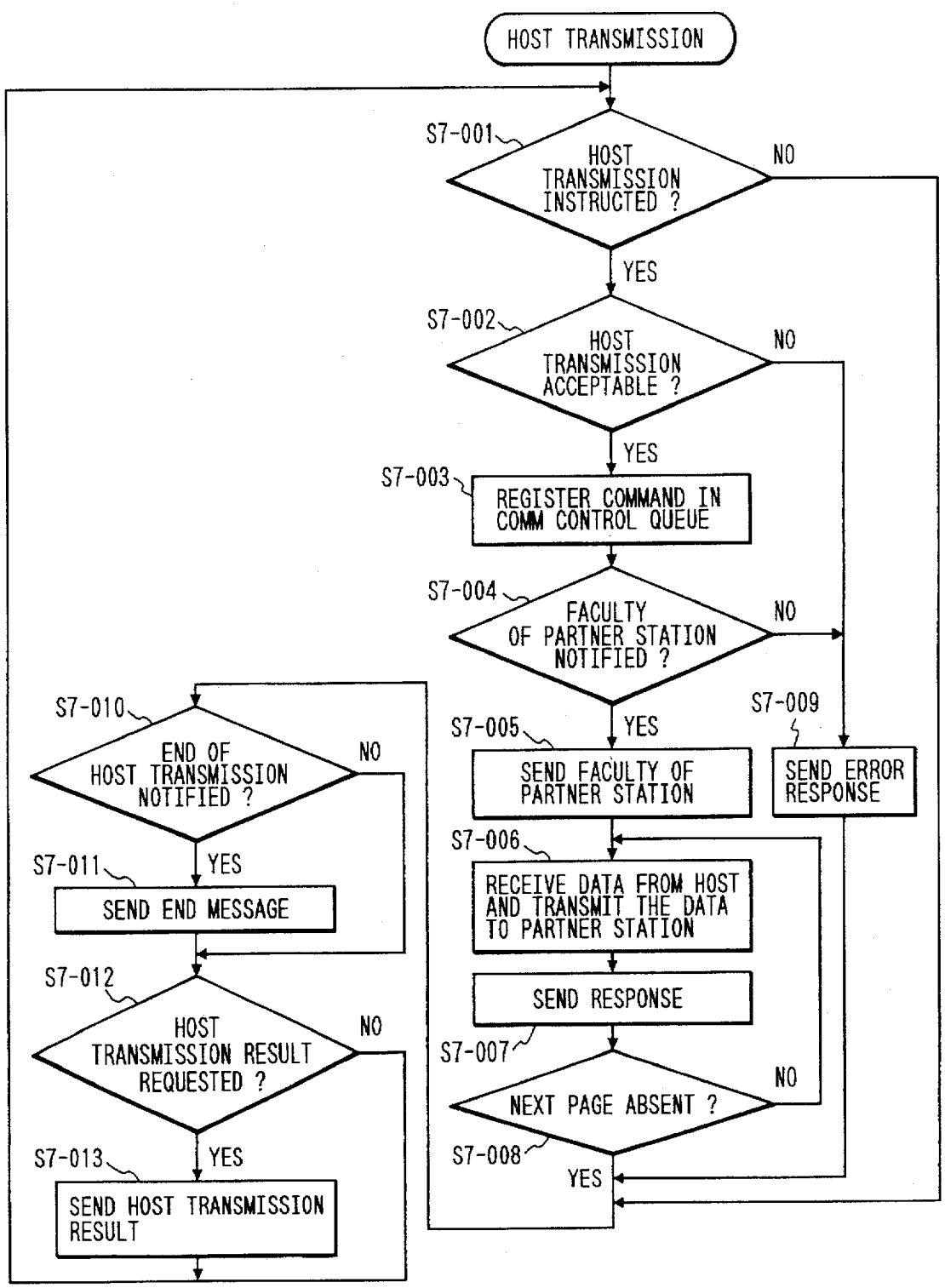
FIG. 7 is a flowchart showing the control process performed by the CPU 101 for the host transmission function.
Figure 8B:
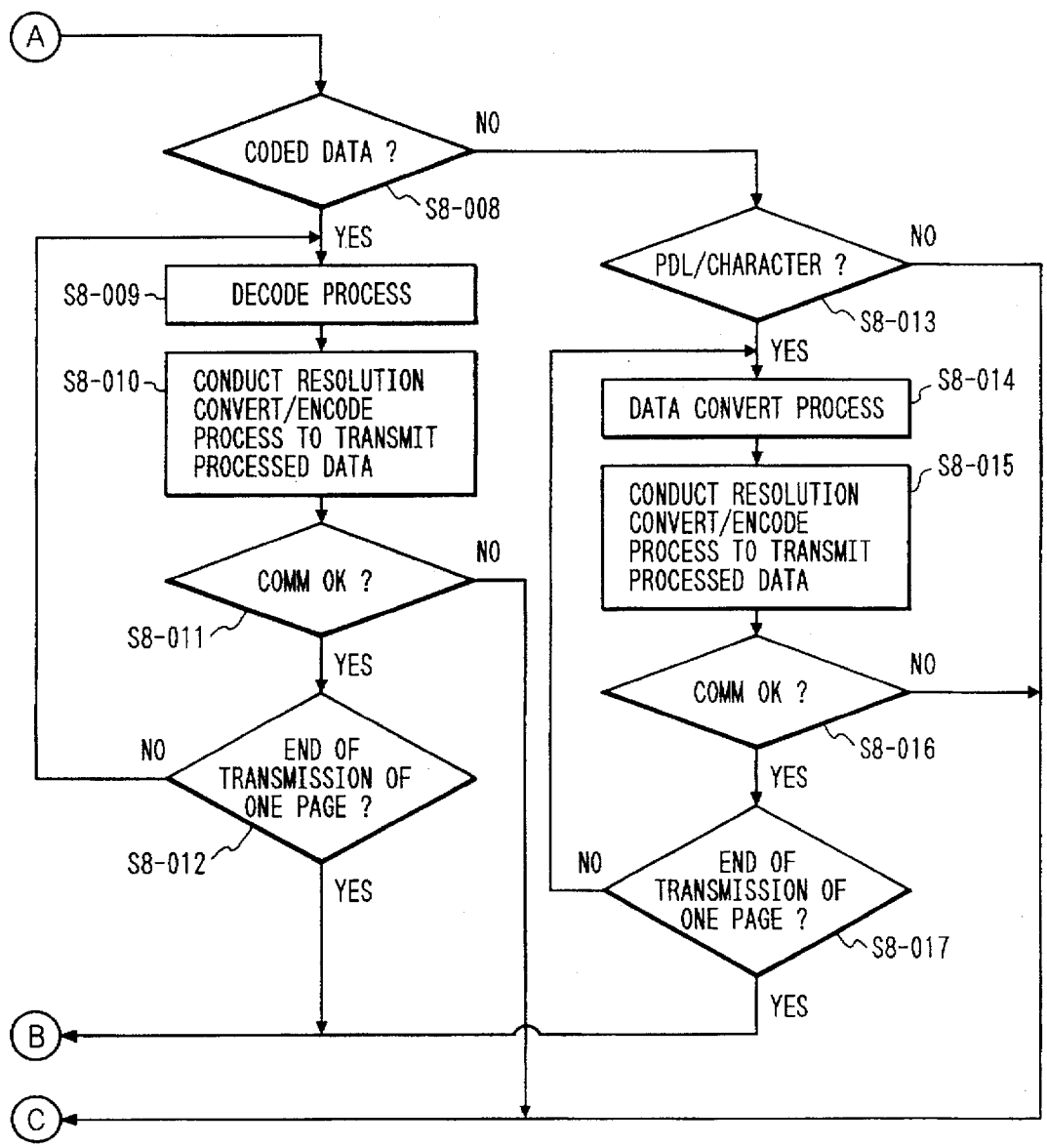
FIG. 8 which is composed of FIGS. 8A and 8B is a flowchart showing the control process performed by the CPU 101 for the host transmission function.

4. Host transmission function (FIGS. 7 to 8B)

Function for the transmitting of image data that are transferred by the host.

Figure 9:
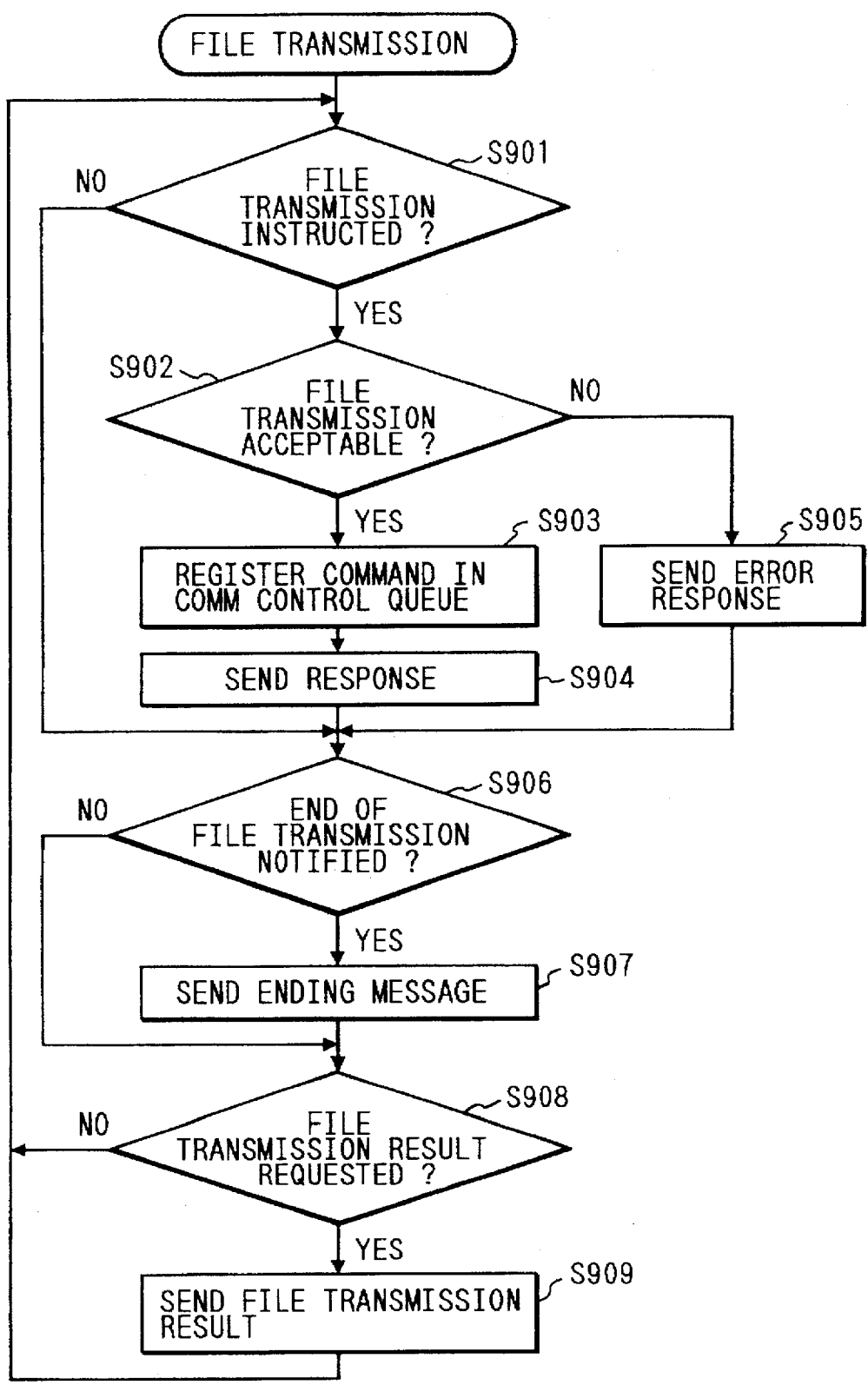
FIG. 9 is a flowchart showing the control process performed by the CPU 101 for the file transmission function.
Figure 10B:
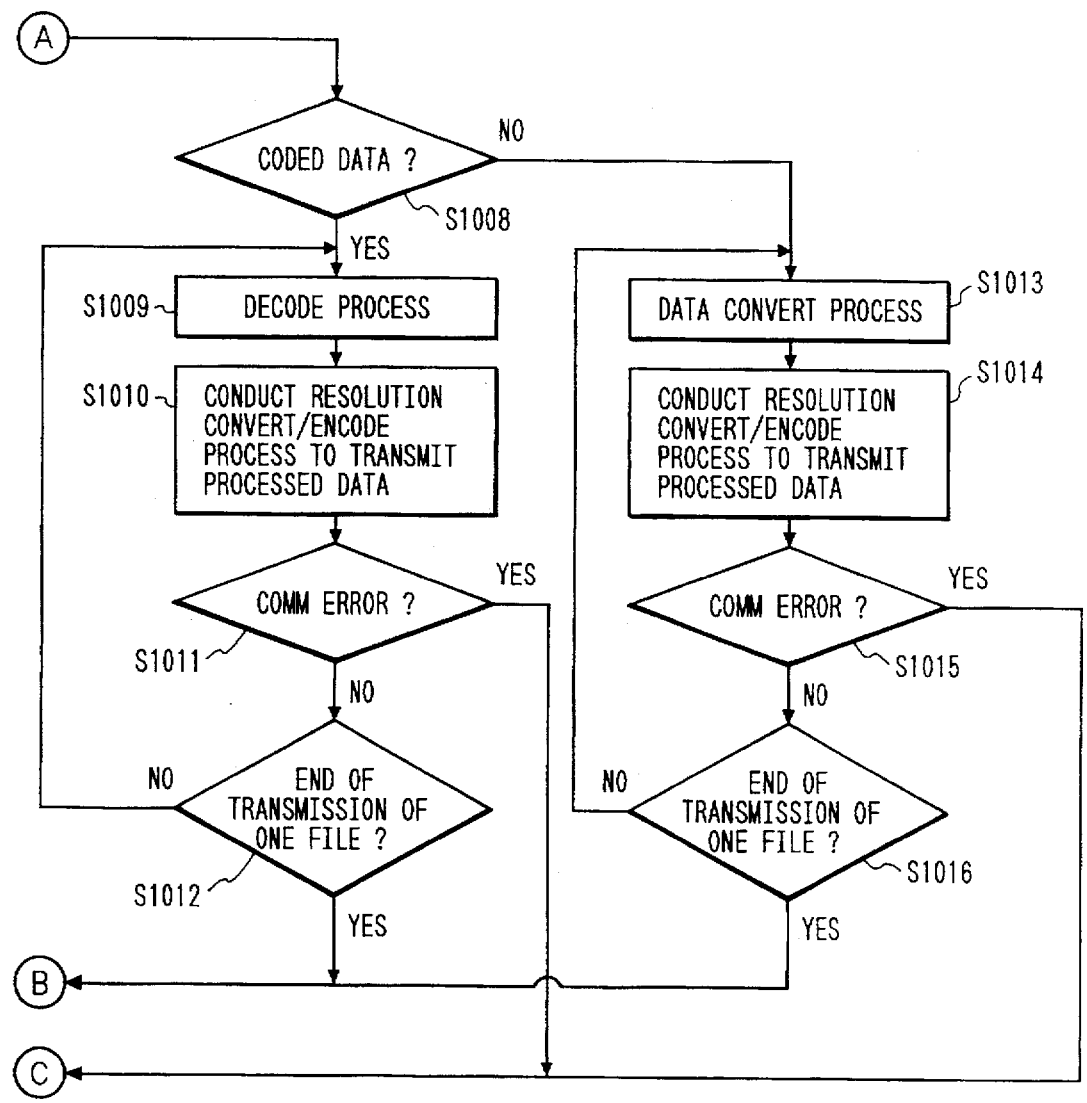
FIG. 10 which is composed of FIGS. 10A and 10B is a flowchart showing the control process performed by the CPU 101 for the file transmission function.

5. File transmission function (FIGS. 9 to 10B)

Function for the transmission of an image file by the facsimile apparatus.

Figure 11:
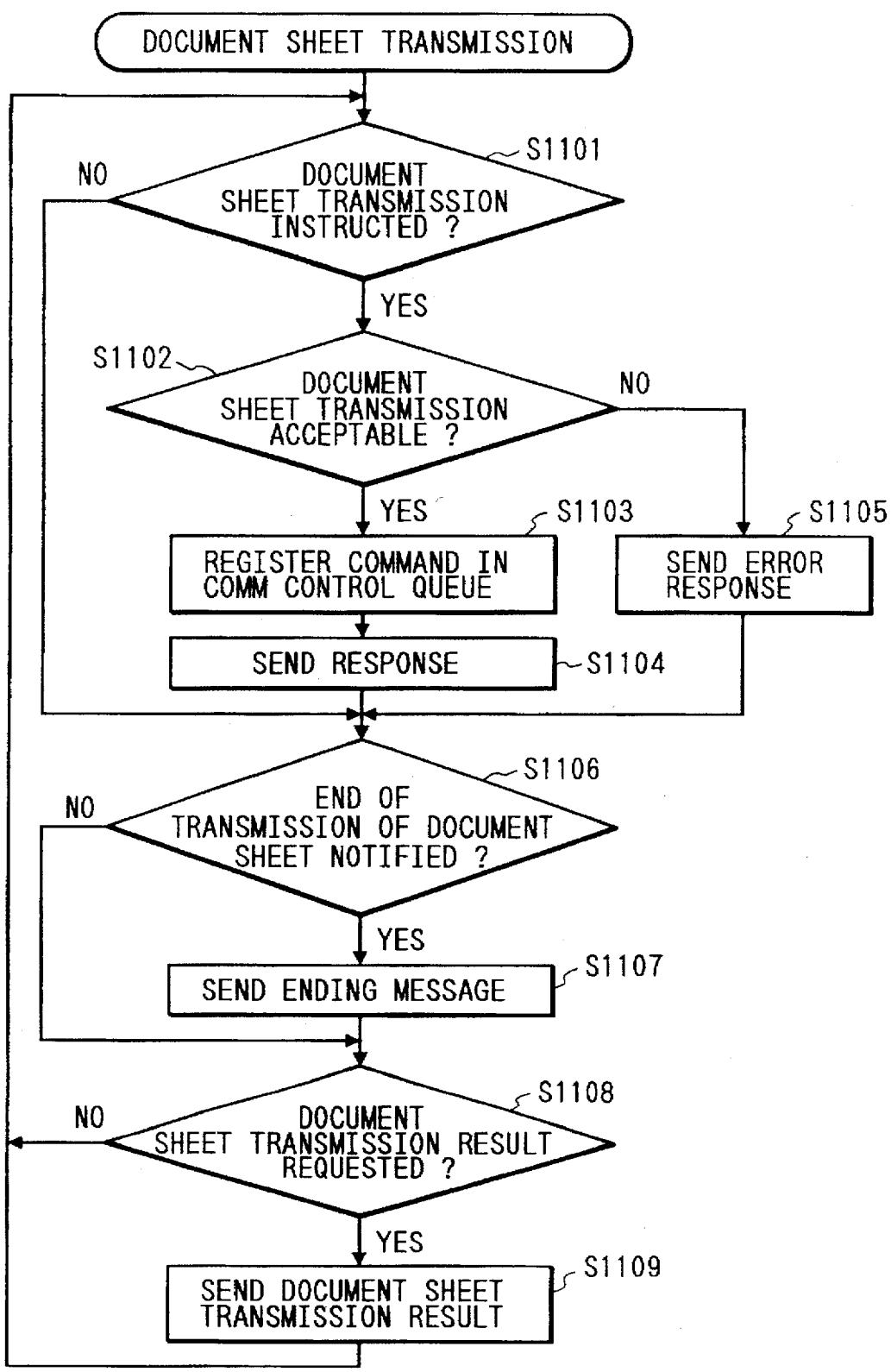
FIG. 11 is a flowchart showing the control process performed by the CPU 101 for a document sheet transmission function.
Figure 12B:
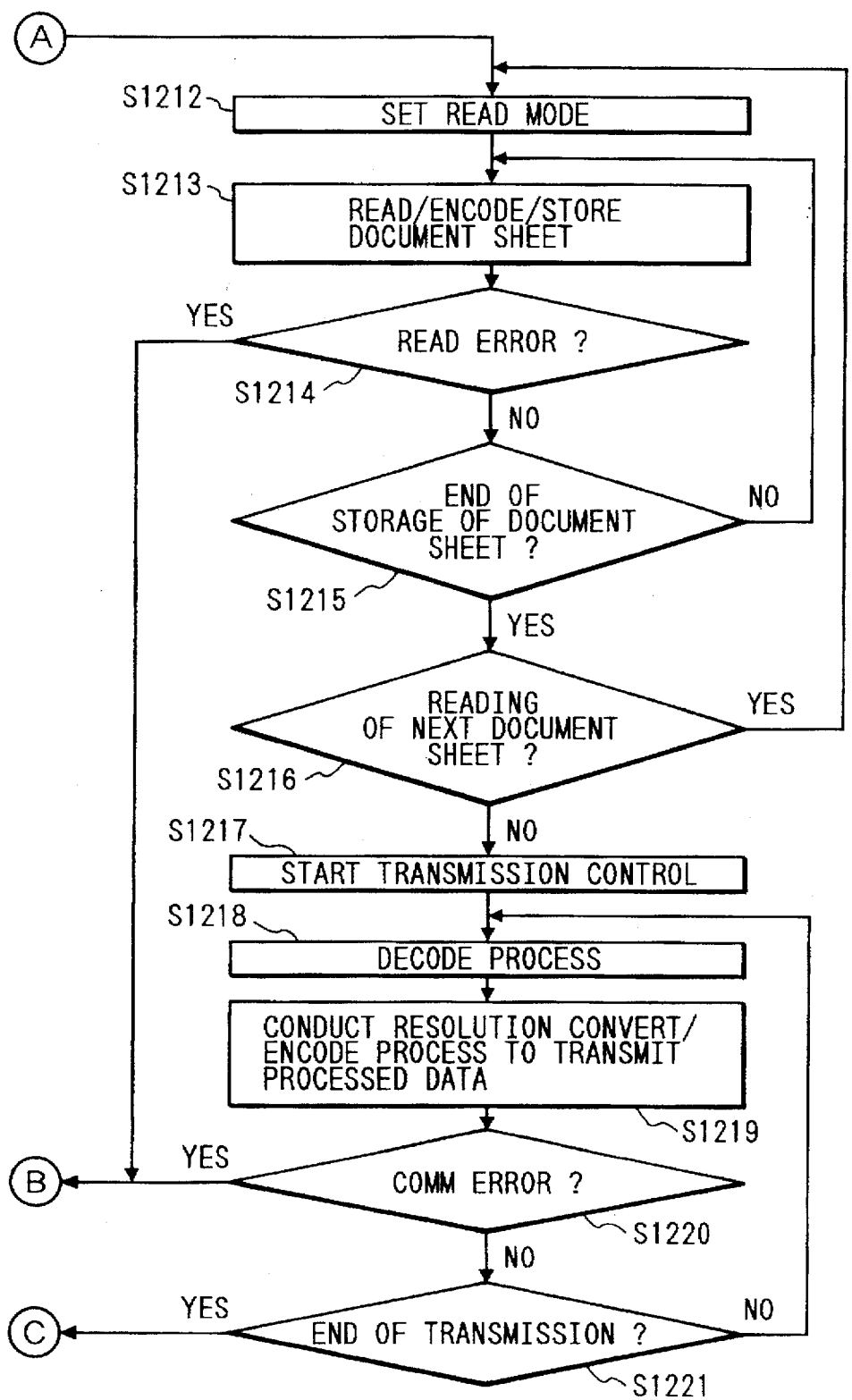
FIG. 12 which is composed of FIGS. 12A and 12B is a flowchart showing the control process performed by the CPU 101 for the document sheet transmission function.

6. Document sheet transmission function (FIGS. 11 to 12B)

Function for the transmission of image data that are scanned by the facsimile apparatus.

7. File upload function (FIGS. 13, 14, 15, 17, and 18)

Function for the transferring of image data in file units by the facsimile apparatus to the host.

Figure 16:
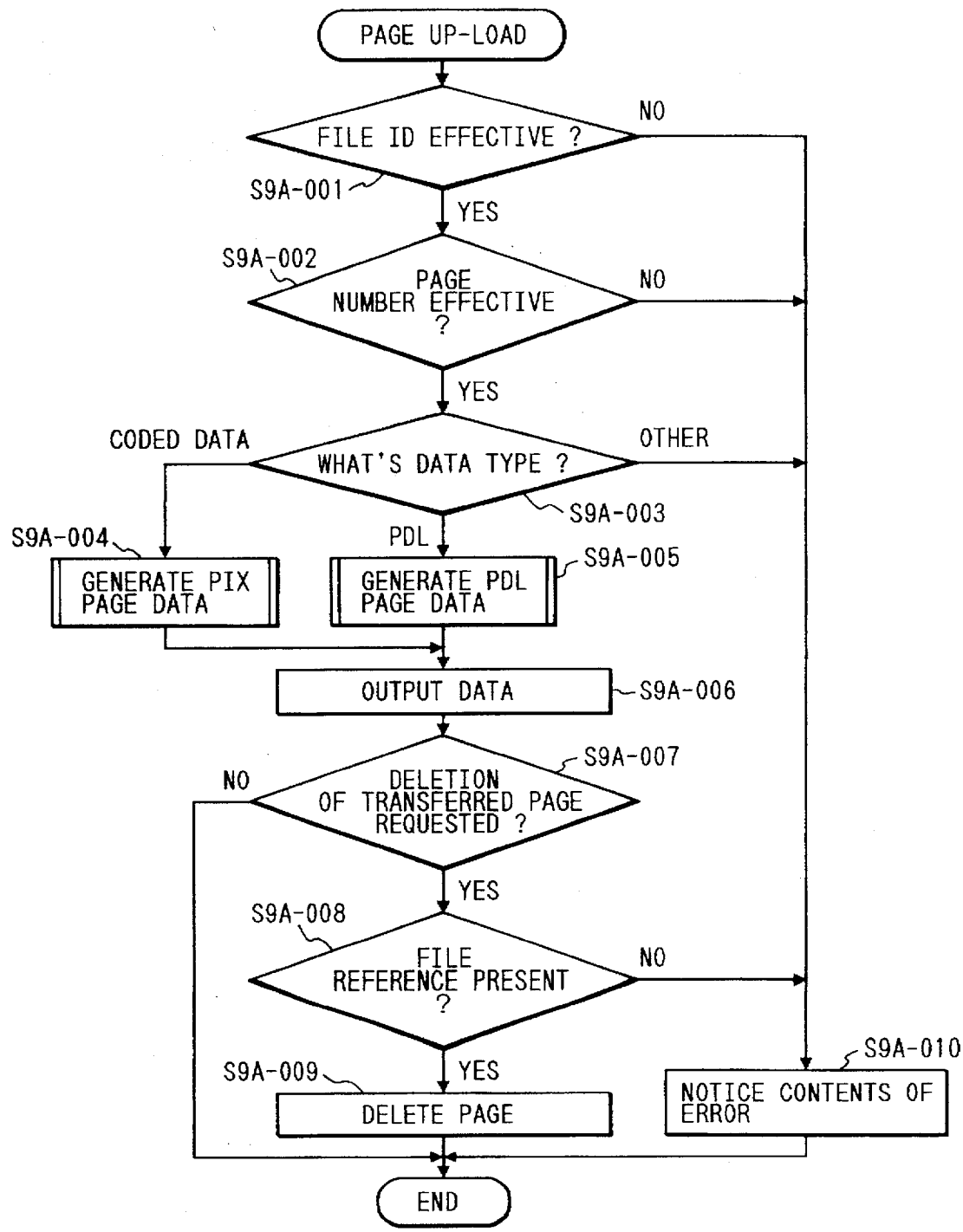
FIG. 16 is a flowchart showing the control process performed by the CPU 101 for a page up-load function.
Figure 17:
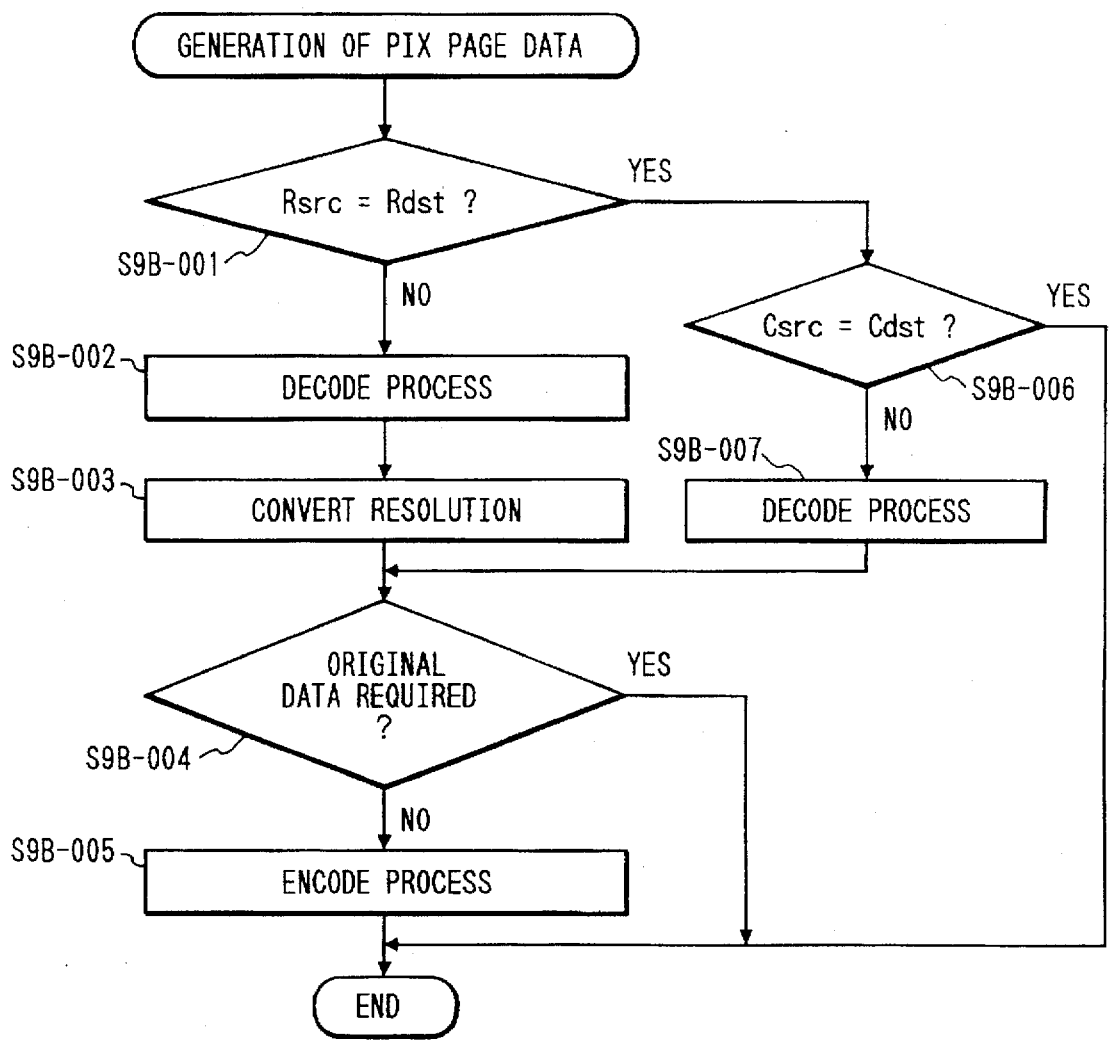
FIG. 17 is a flowchart showing a Pix page data generation process in FIGS. 14 and 16.
Figure 18:
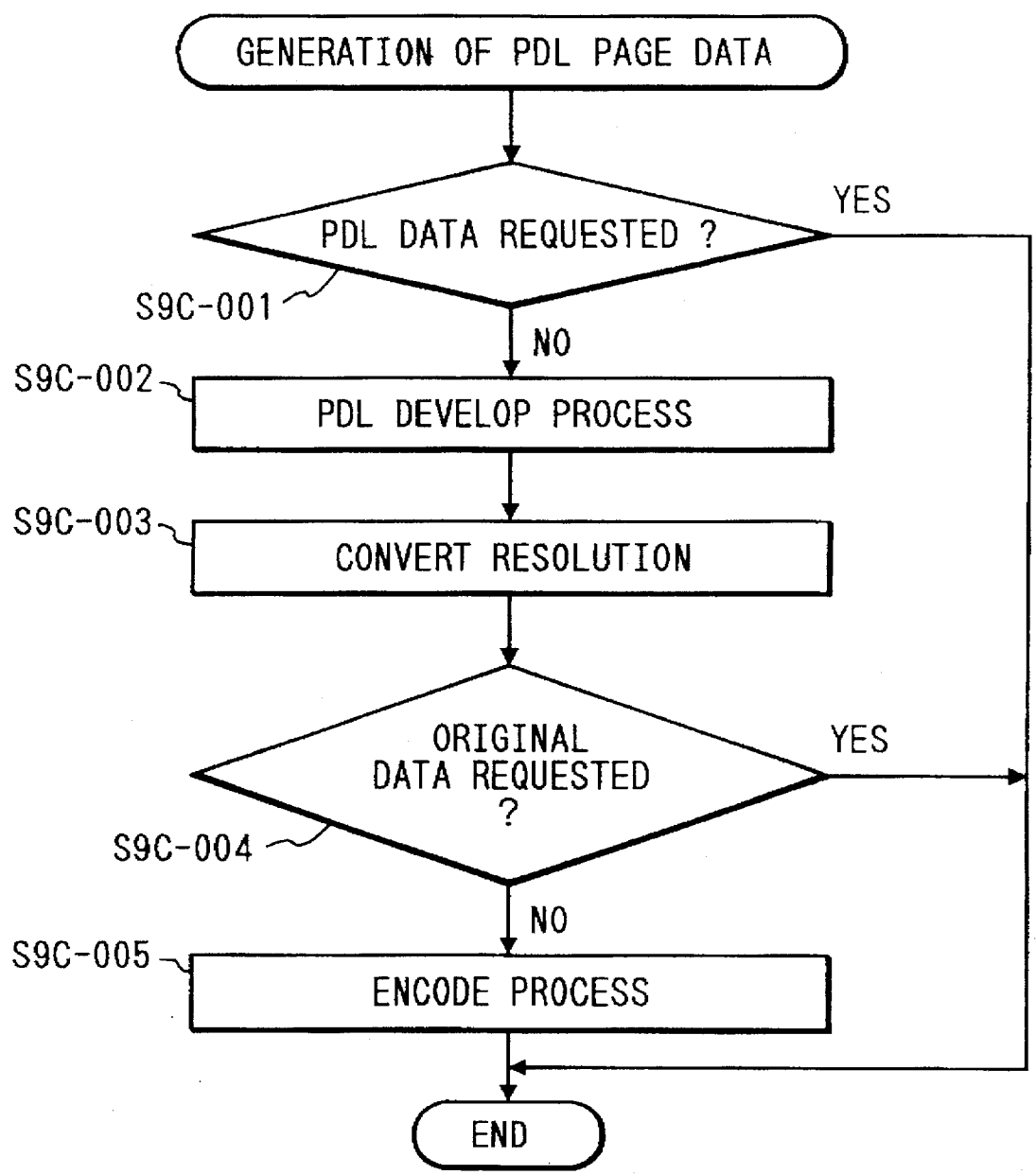
FIG. 18 is a flowchart showing a PDL page data generation process in FIGS. 15 and 16.

8. Page upload function (FIGS. 16, 17, and 18)

Function for the transferring of image data in page units from the facsimile apparatus to the host.

Figure 19:
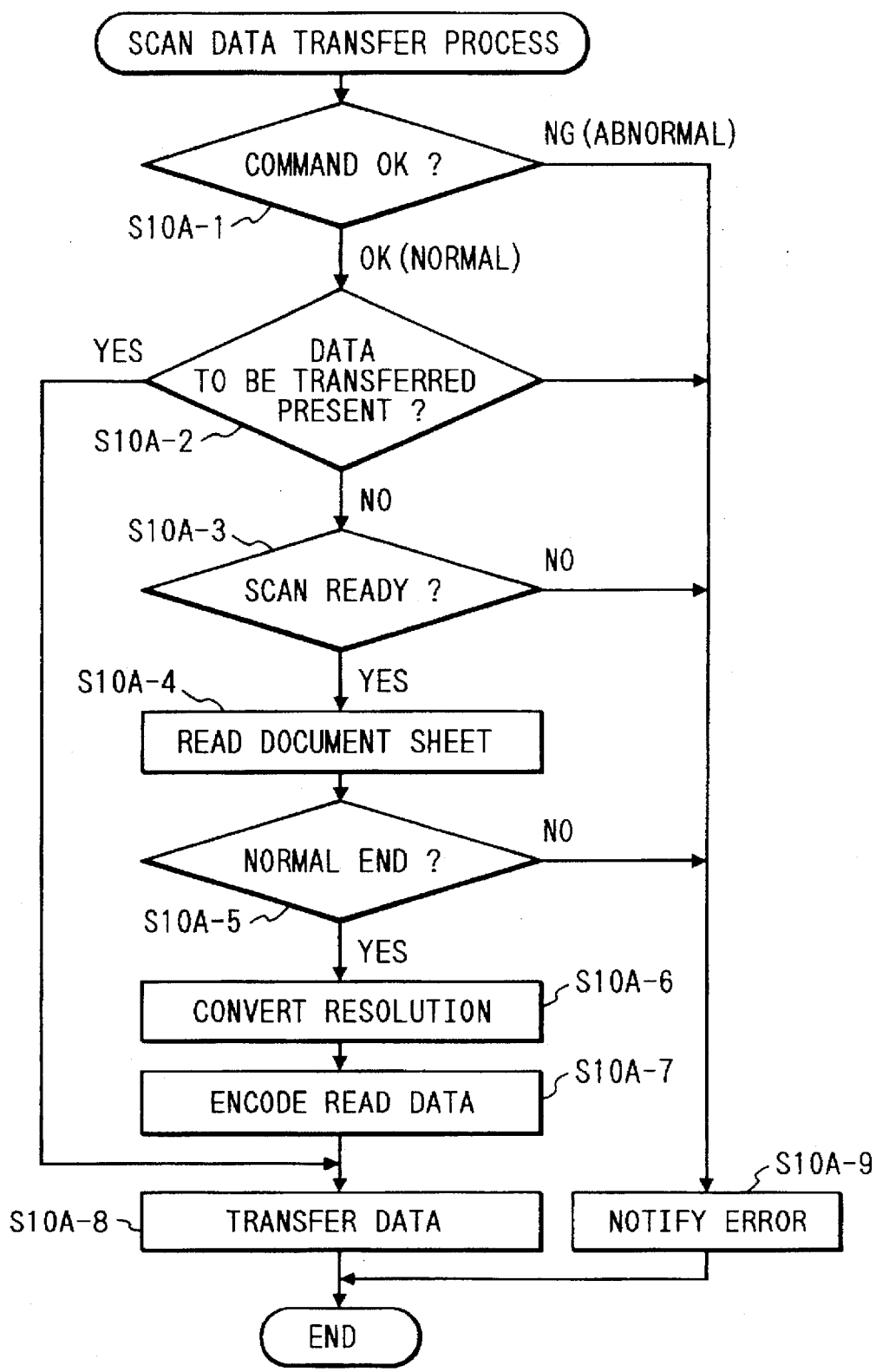
FIG. 19 is a flowchart showing the control process performed by the CPU 101 for a scan data transfer function.

9. Scan data transfer function (FIG. 19)

Function for the transmission of image data that are scanned by the facsimile apparatus.

Figure 20:
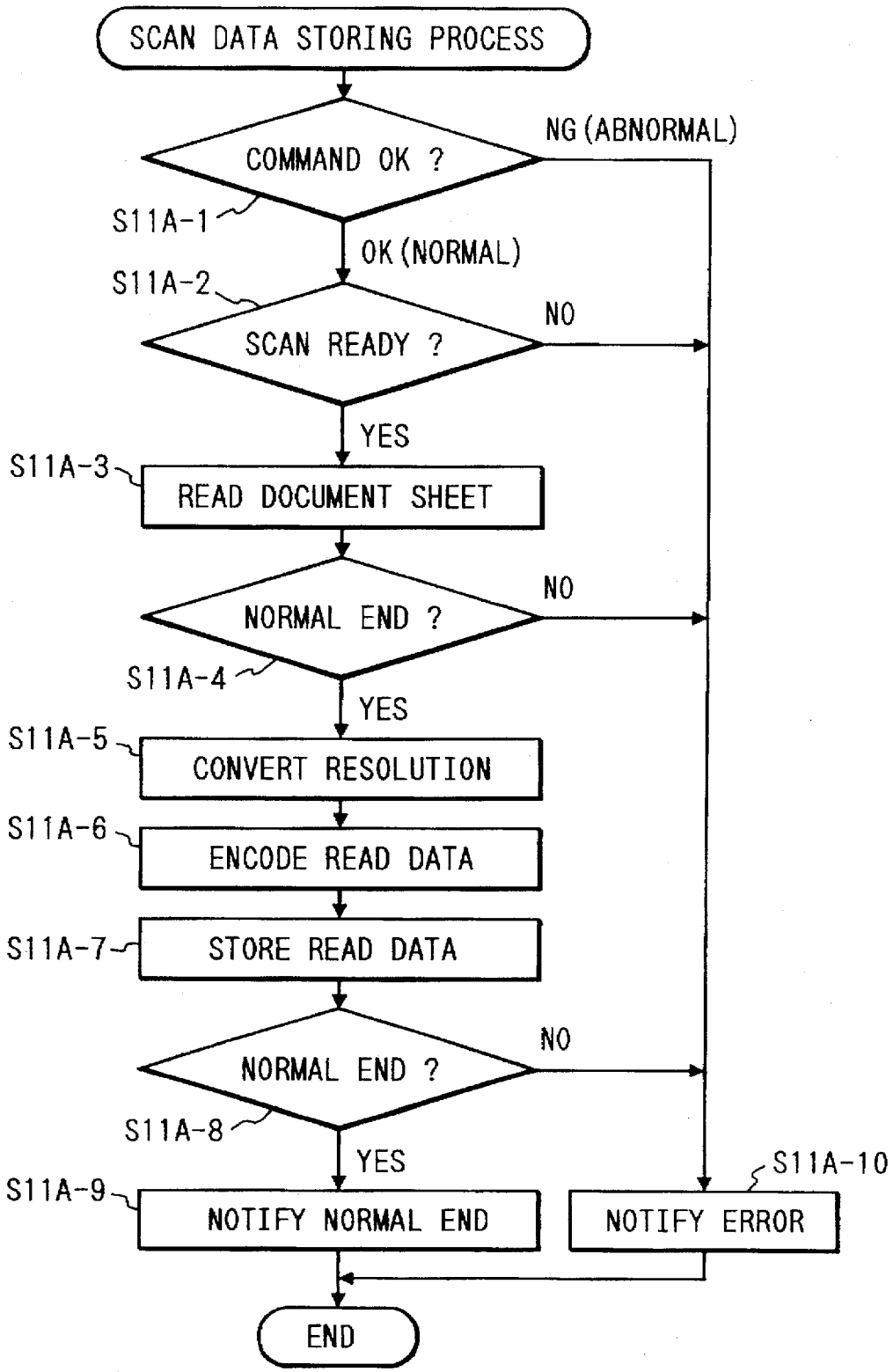
FIG. 20 is a flowchart showing the control process performed by the CPU 101 for a scan data storing function.
Figure 21:
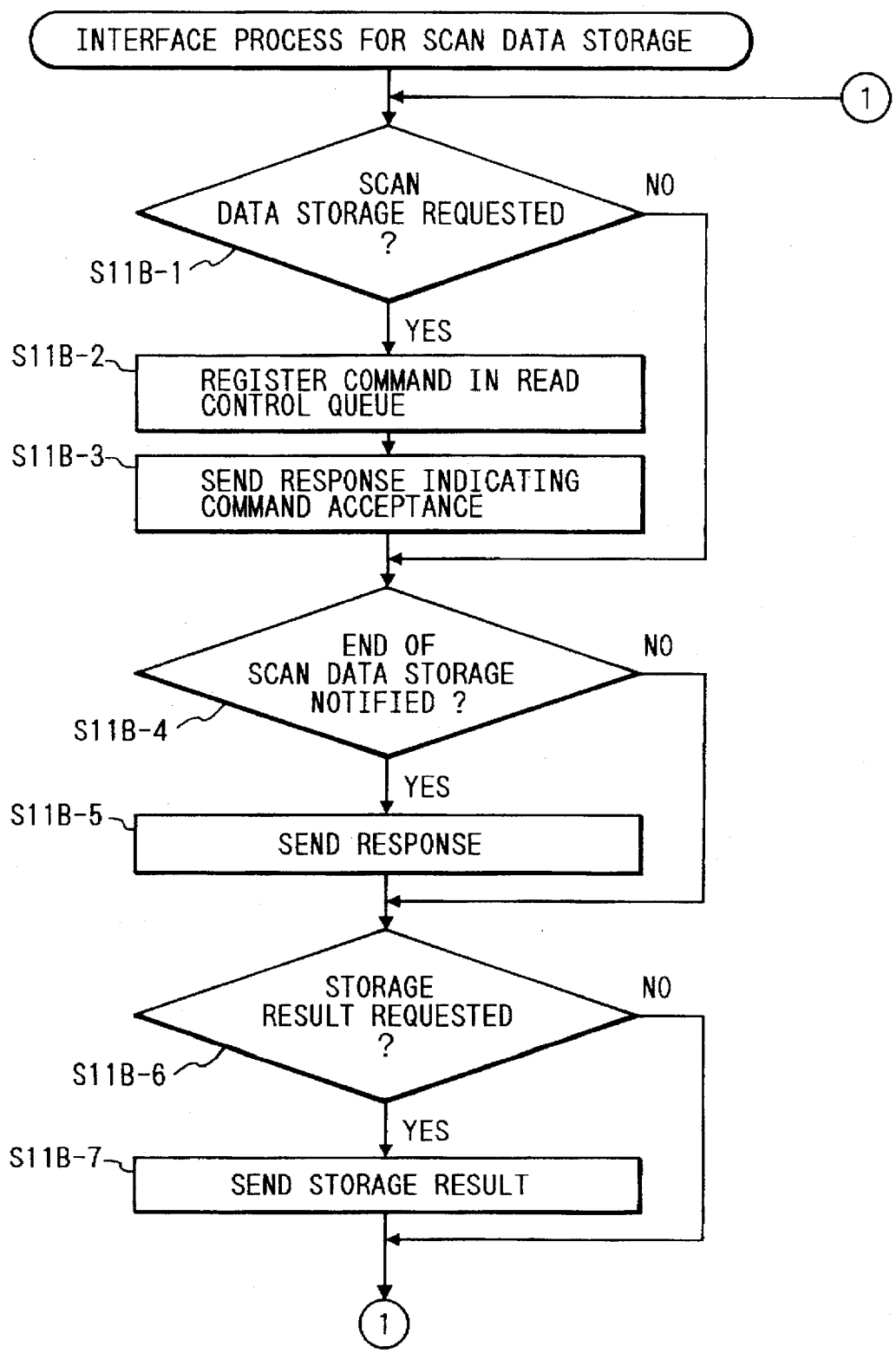
FIG. 21 is a flowchart showing the control process performed by the CPU 101 for a scan data storage interface function.

10. Scan data storage function (FIGS. 20 and 21)

Function for the storage of the image data that are scanned by the facsimile apparatus in the image memory in the facsimile apparatus.

Figure 22:
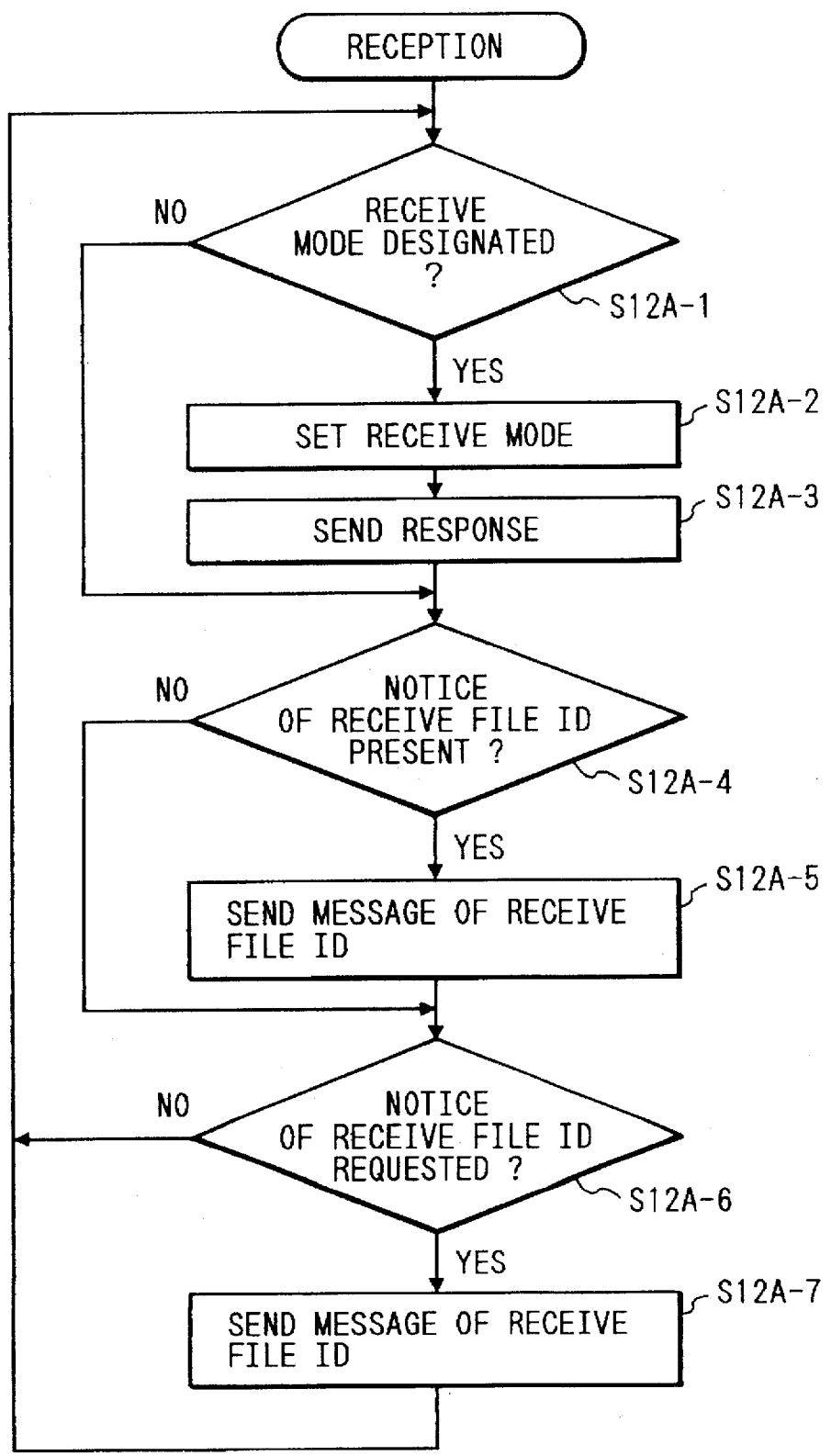
FIG. 22 is a flowchart showing the control process performed by the CPU 101 for a reception function.
Figure 23B:
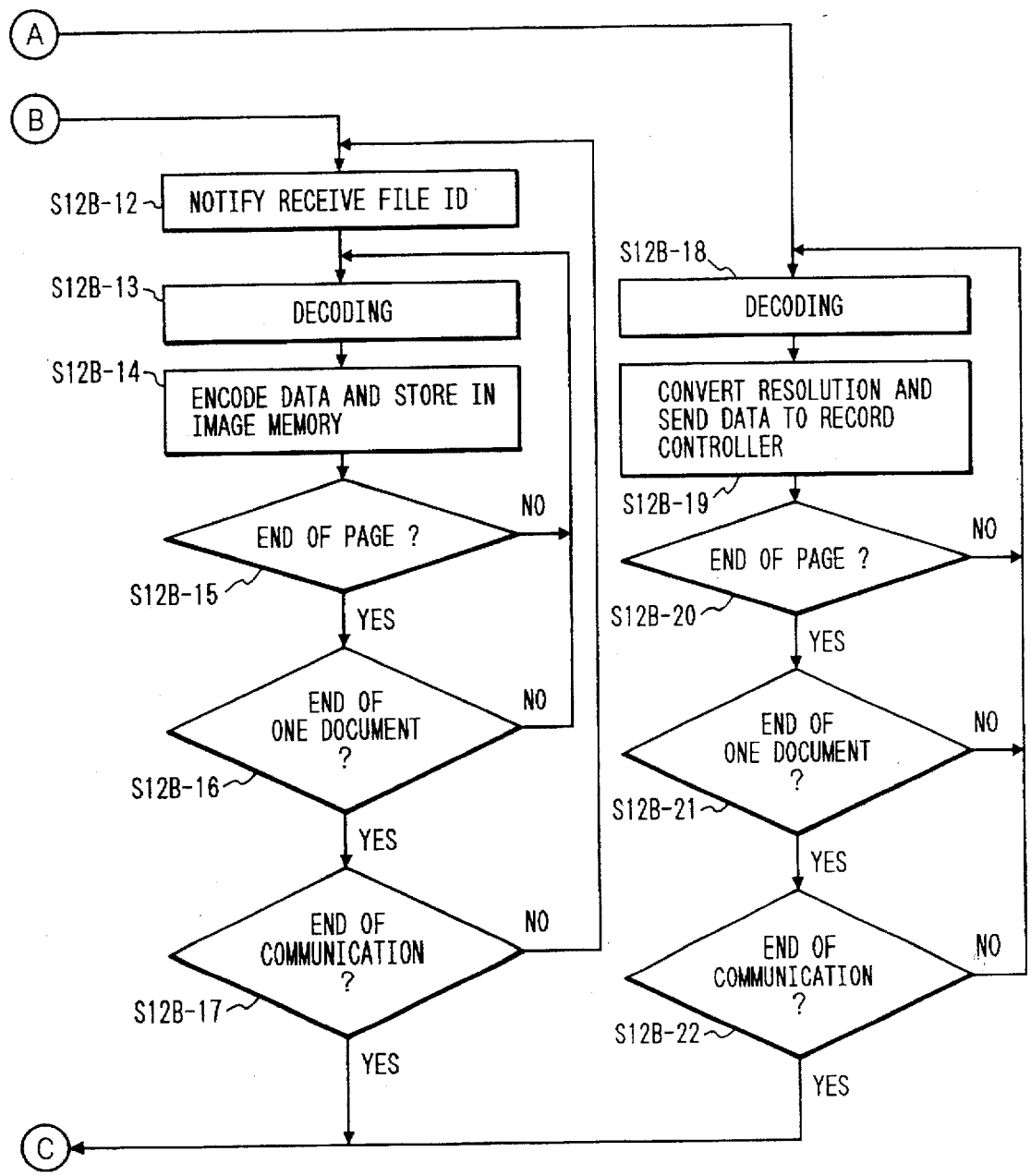
FIG. 23 which is composed of FIGS. 23A and 23B is a flowchart showing the control process performed by the CPU 101 for a reception function.

11. Reception function (FIGS. 22 to 23B)

Function for the setting of a reception mode for the facsimile apparatus and for acquiring the reception status.

Figure 24:
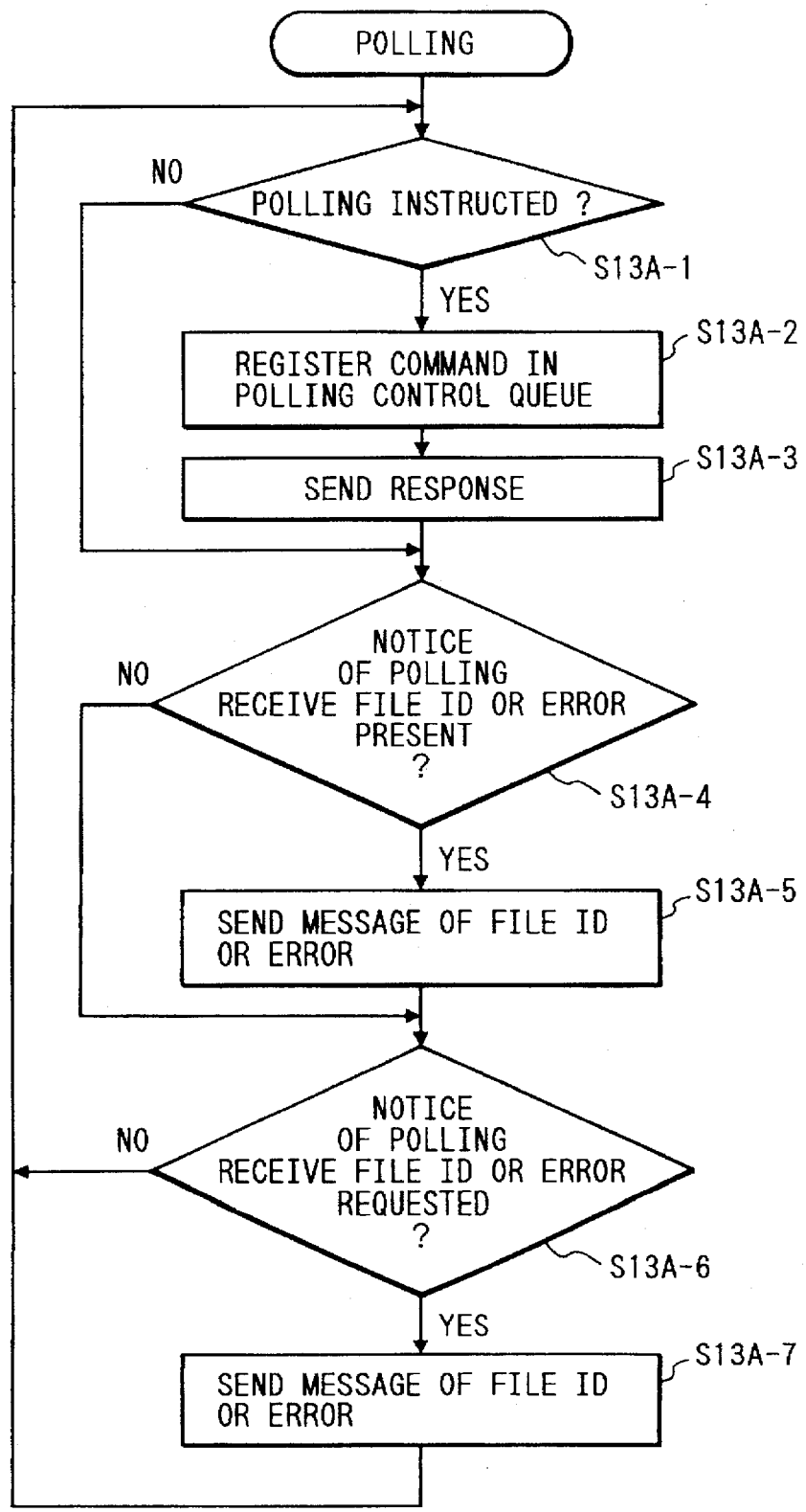
FIG. 24 is a flowchart showing the control process performed by the CPU 101 for a polling function.
Figure 25:
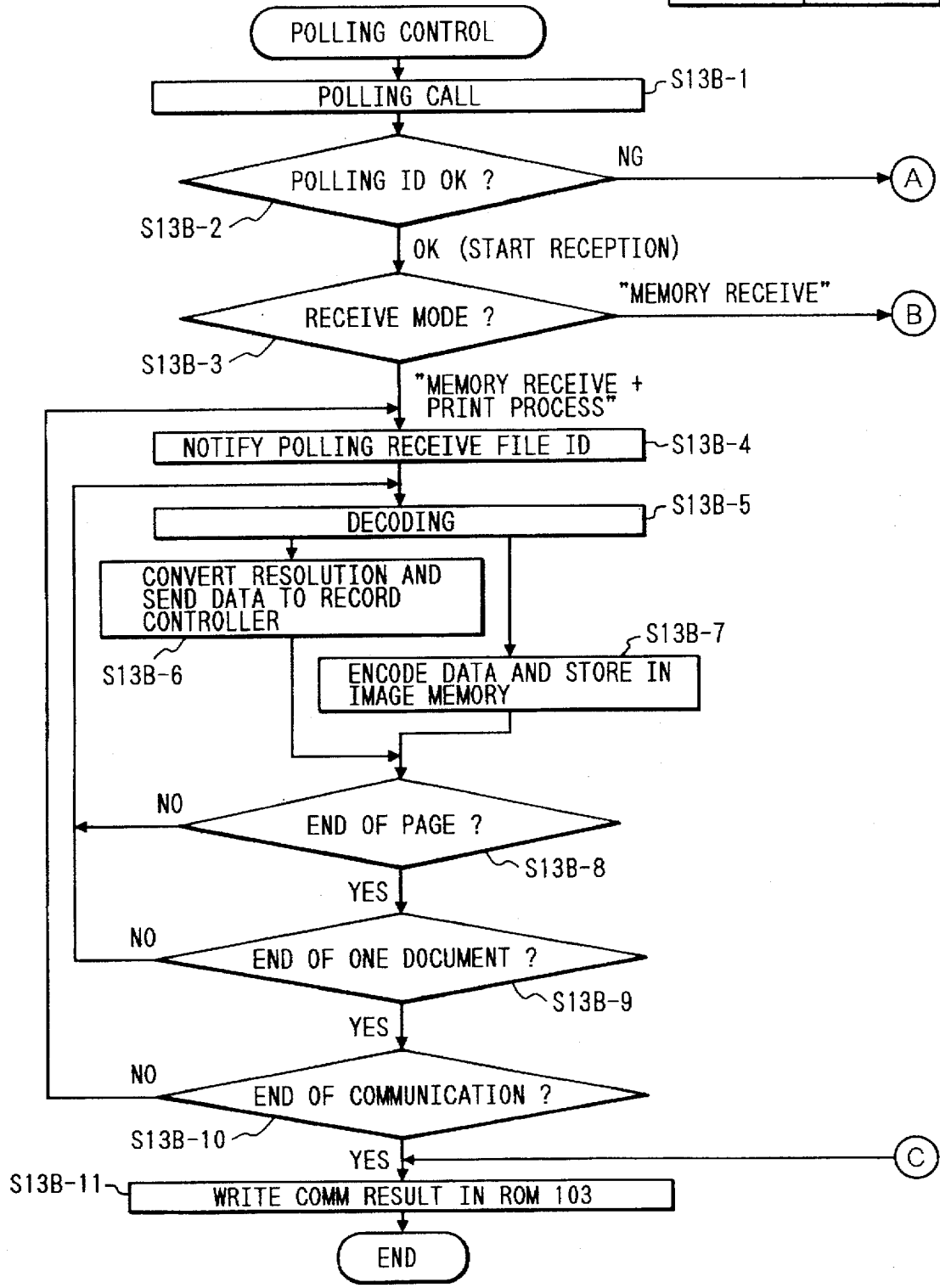
FIG. 25 which is composed of FIGS. 25A and 25B is a flowchart showing the control process performed by the CPU 101 for the polling function.

12. Polling reception function (FIGS. 24 to 25B)

Function for instructing the making of a polling call, and for acquisition of the result.

Figure 26:
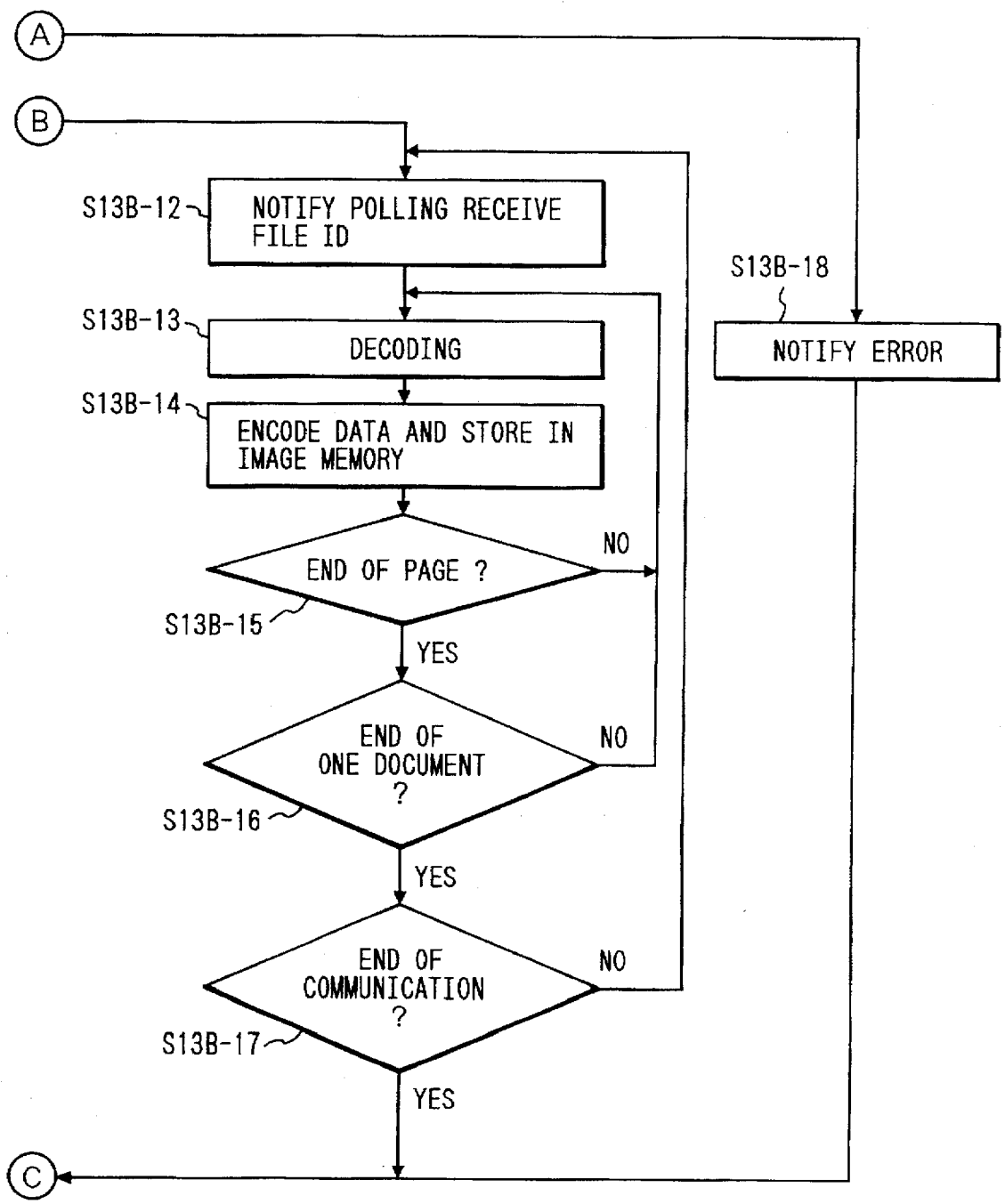
FIG. 26 is a diagram showing a format for communication management information.
Figure 27:
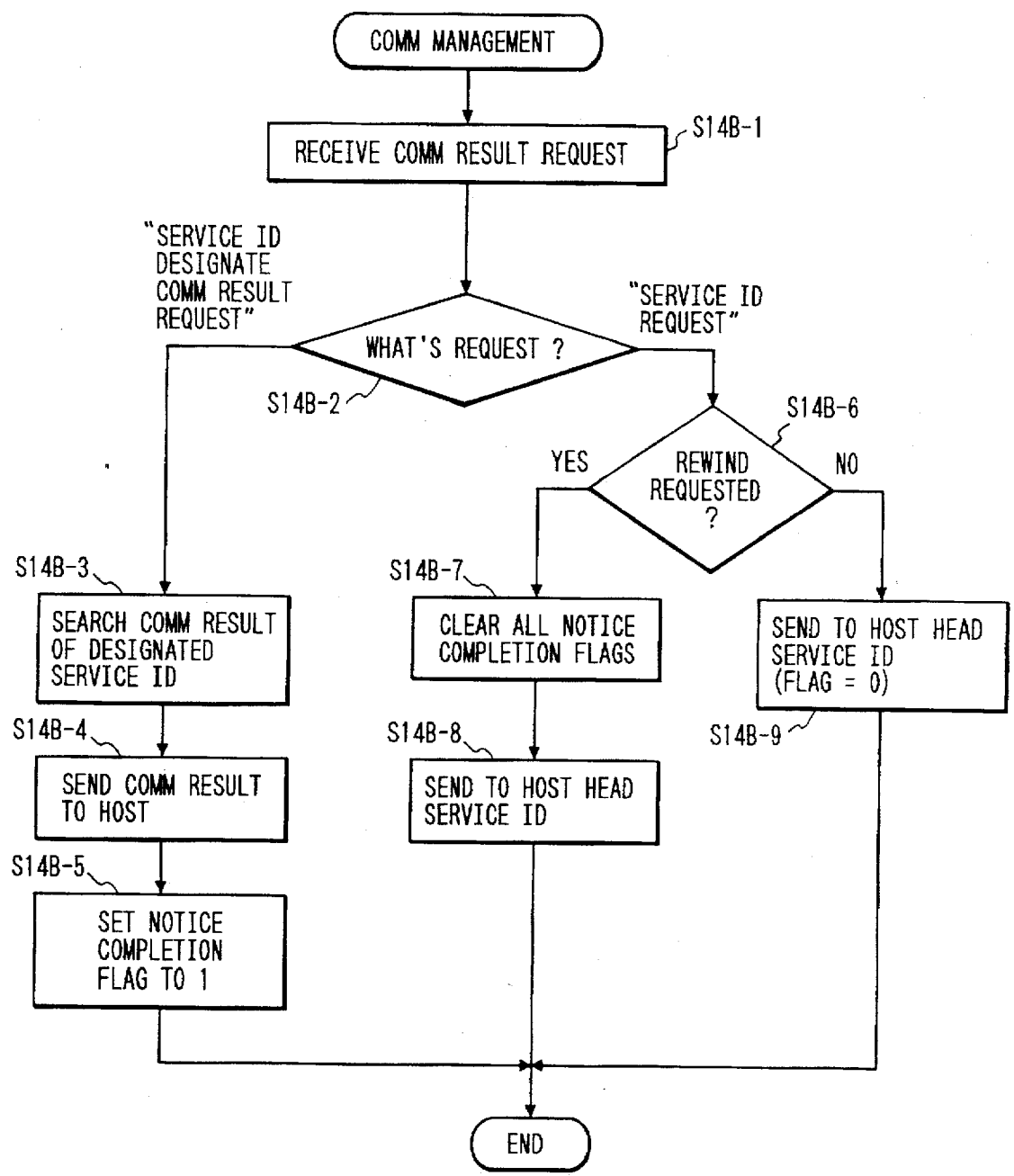
FIG. 27 is a flowchart showing the control process performed by the CPU 101 for a communication management function.

13. Communication management function (FIGS. 26 and 27)

Function for the acquisition of communication management information in the facsimile apparatus.

Figure 28:
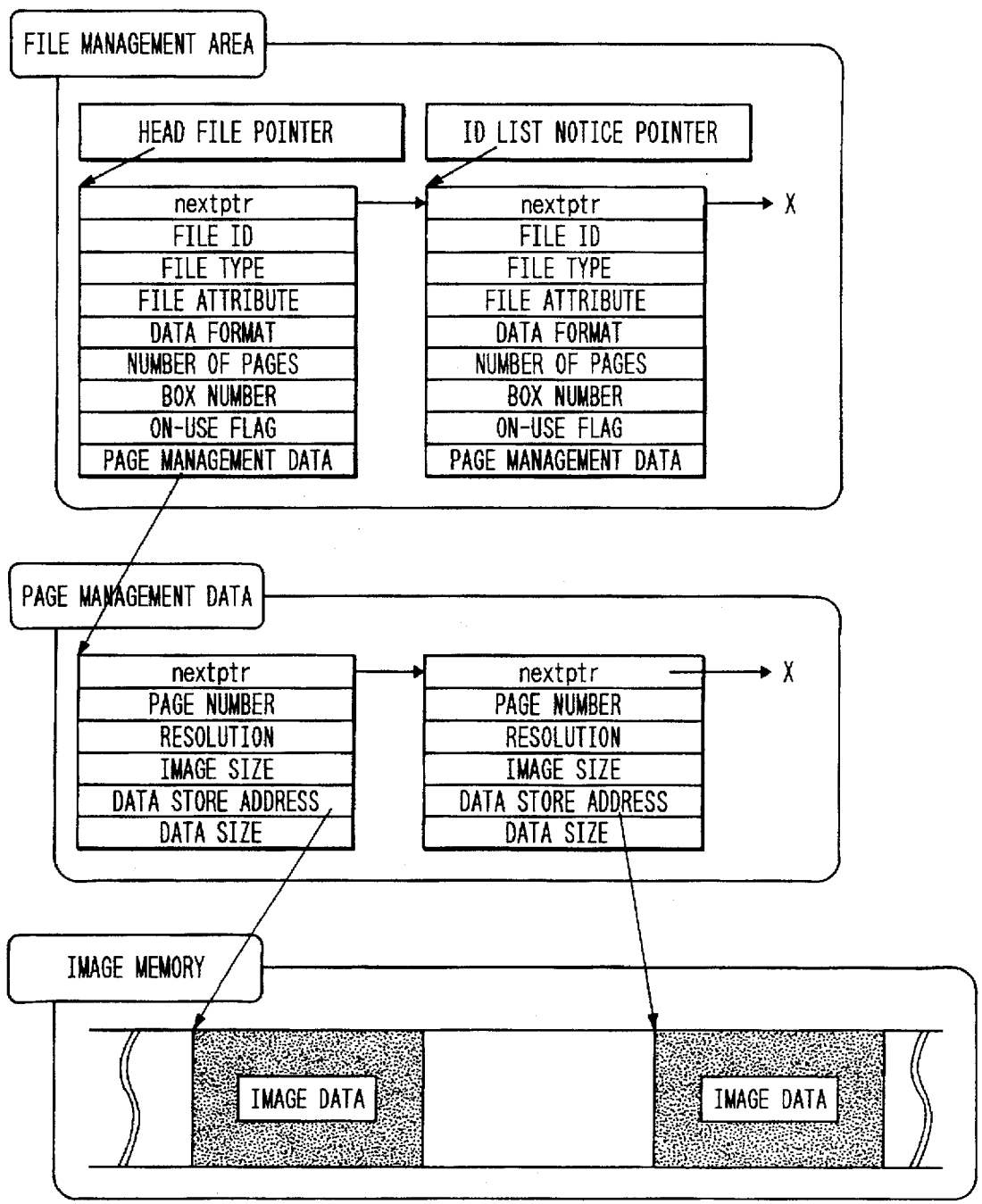
FIG. 28 is a schematic diagram for file management.
Figure 29:
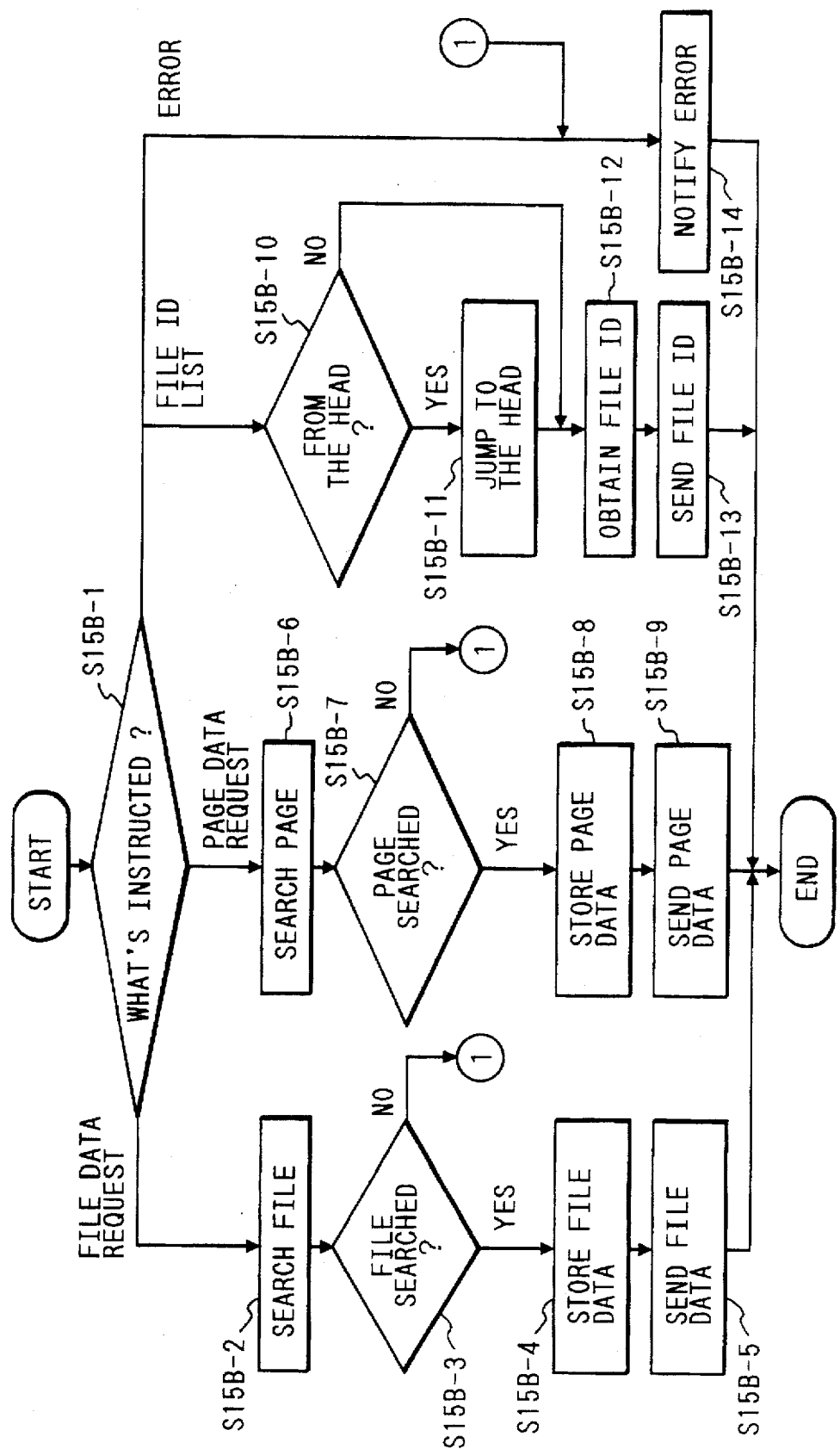
FIG. 29 is a flowchart showing the control process performed by the CPU 101 for a file management function.
Figure 30:
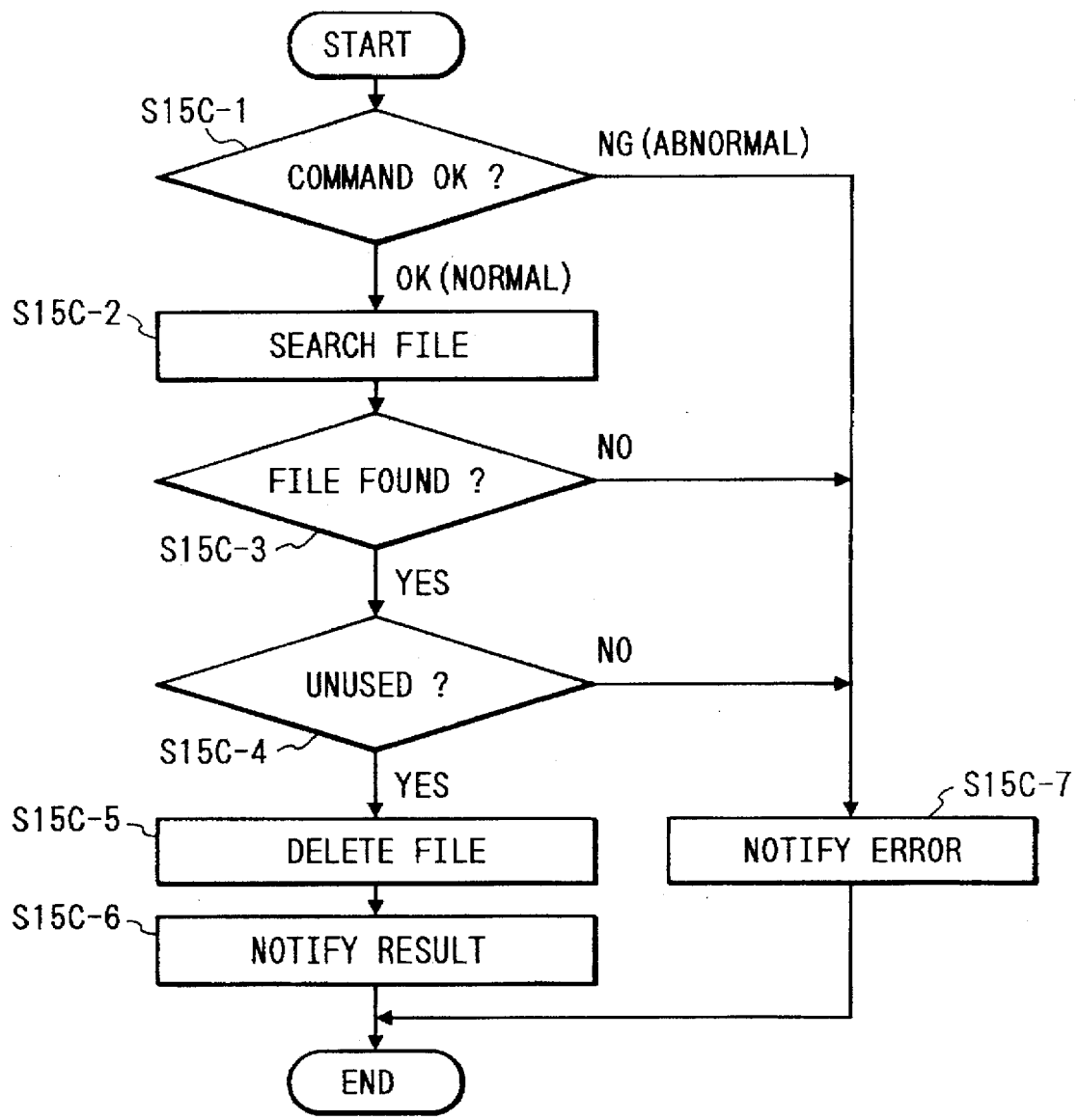
FIG. 30 is a flowchart showing the control process performed by the CPU 101 for the file management function.

14. File management function (FIGS. 28, 29, and 30)

Function for the acquisition of file information and page information concerning image data in the facsimile apparatus and for deleting files.

15. System memory management function (FIGS. 31 through 39)

Function for referring to and registering dial data.

Figure 40:
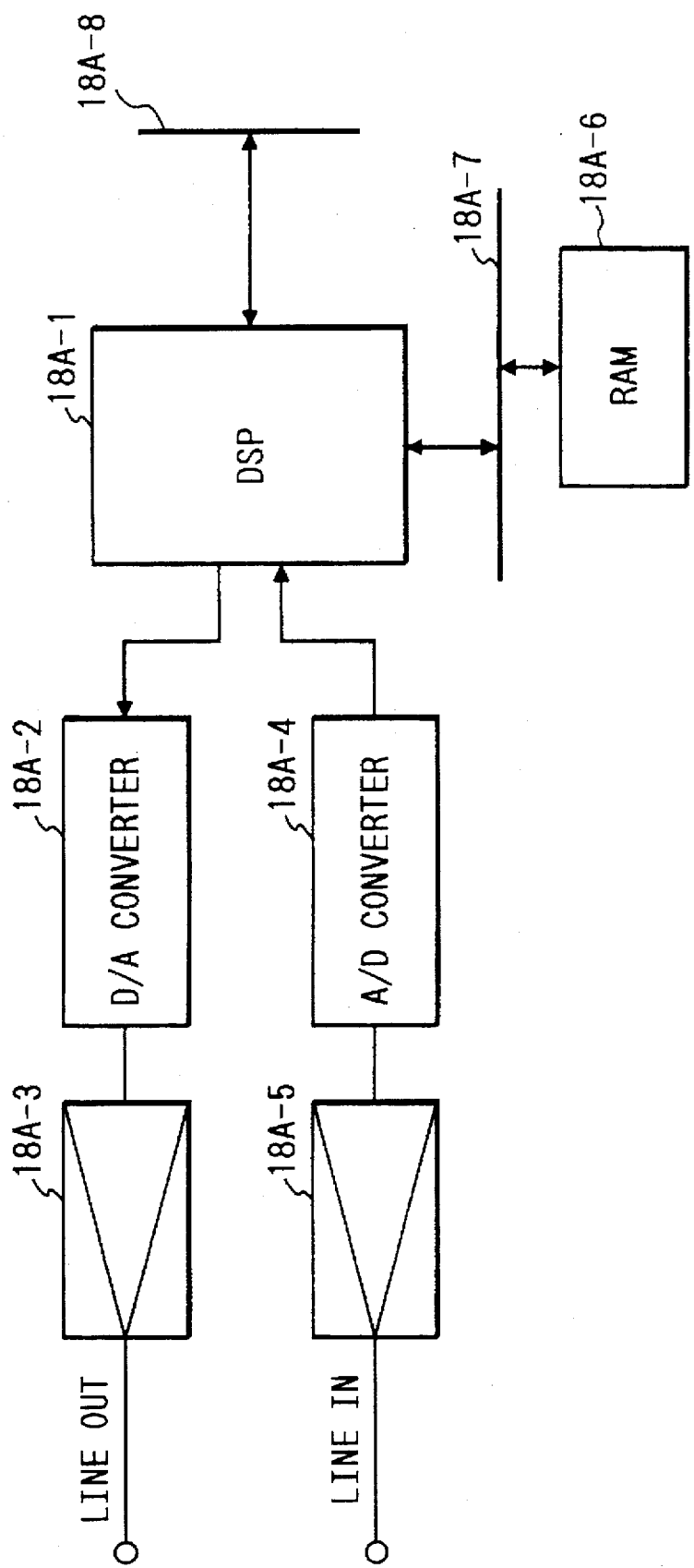
FIG. 40 is a block diagram illustrating the arrangement of a voice data processor in an auto answer/record controller 109.
Figure 41:
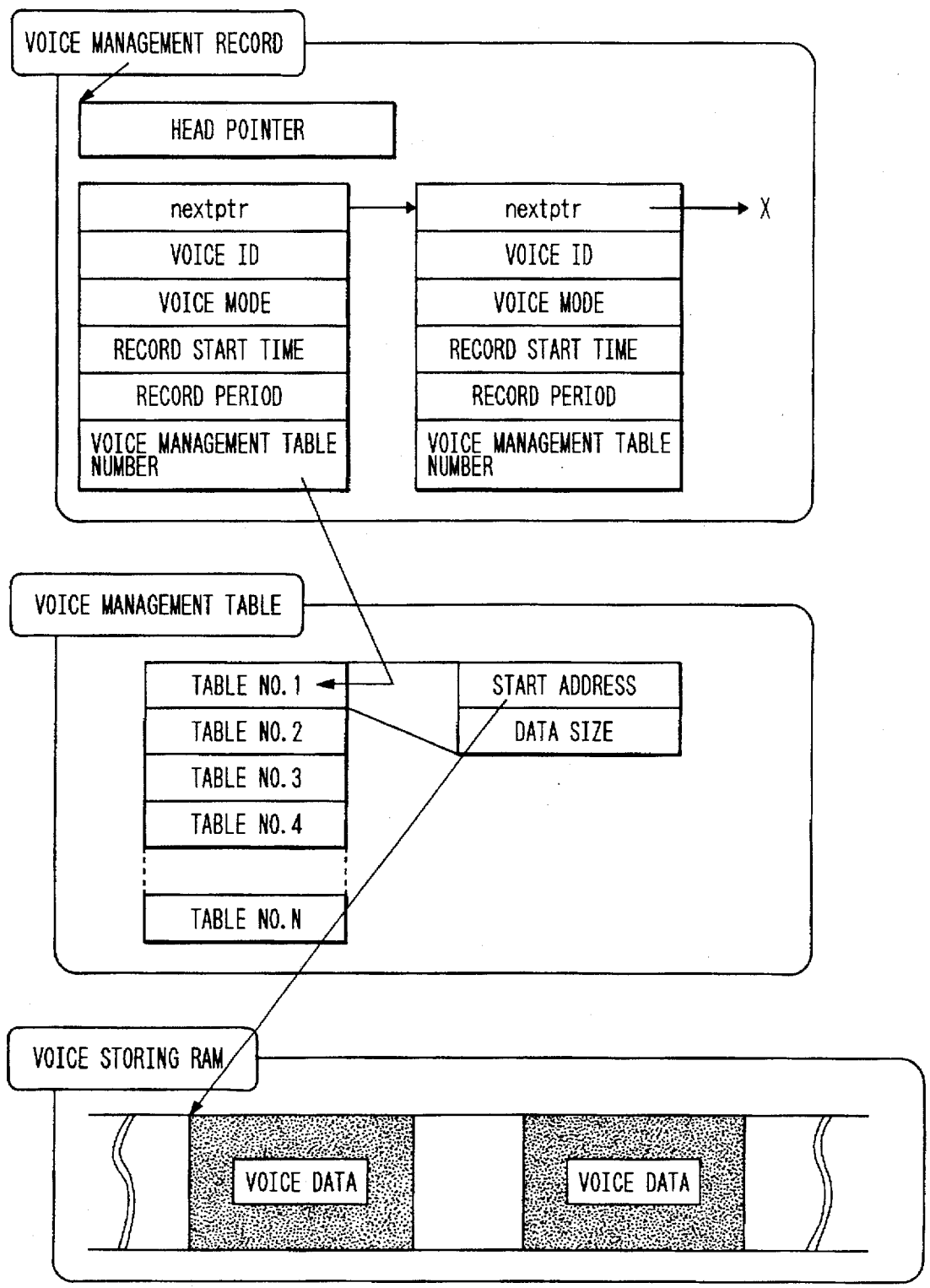
FIG. 41 is a schematic diagram showing voice data management.
Figure 42:
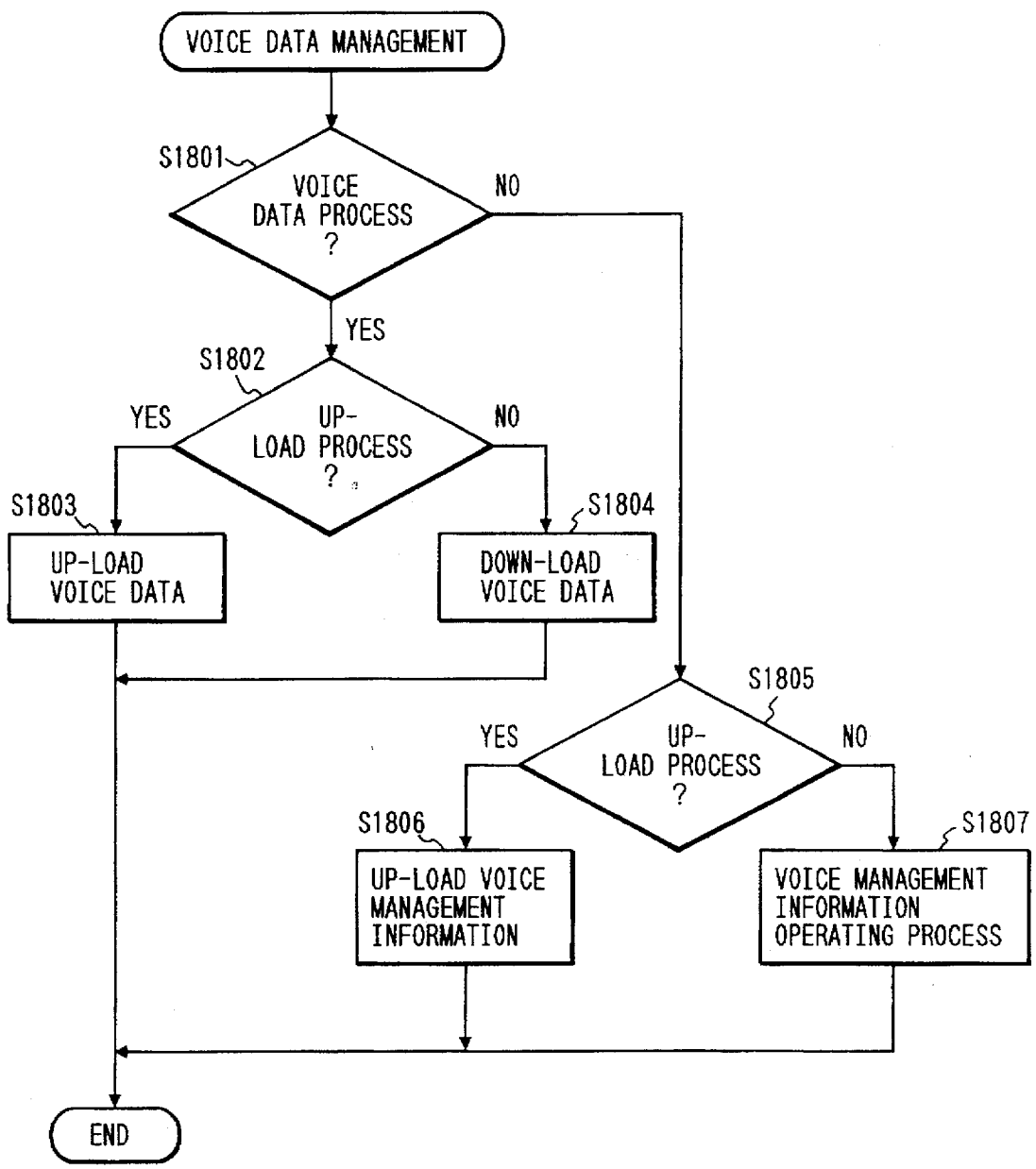
FIG. 42 is a flowchart showing the control process performed by the CPU 101 for a voice data management function.

16. Voice data management function (FIGS. 40, 41, and 42)

Function for the downloading and the uploading of voice data and voice management information that are managed by the auto answer/record controller 109.

17. Host dial function (FIG. 43)

Function for the transmission of a call upon a request from the information processing terminal and for performing an associated line control process.

The processing of the above described functions will now be described in detail.

1. Download function

The download function is to convert data that the information processing terminal 114 manages, if needed, transfer the data to the facsimile apparatus, and store the data in the image memory 104.

FIGS. 3A and 3B are flowcharts for the download processing of the information processing terminal 114 and the image processing apparatus (facsimile apparatus). Since downloading is the most essential communication procedure that is performed by the information processing terminal, the process for the information processing terminal 114 is shown on the right side in FIGS. 3A and 3B, while the control process for the CPU 101 of the image processing apparatus is shown on the left.

At step S3-001, a download instruction is received. In this procedure, the information processing terminal 114 receives an instruction to download data. This instruction is submitted to the information processing terminal 114 through its operational section. The instruction in this case is input by the facsimile apparatus through the I/F controller 113, or by another information processing terminal on the network to which the information processing terminal 114 is connected.

At step S3-002, the interpretation of and a decision relative to the instruction is performed. In these procedures, the information processing terminal 114 interprets the received instruction and determines whether or not it can be executed. When it is determined that the instruction can not be executed, error process 1 (S3-003) is performed. When the instruction is executable, the generation and transfer of the download data (S3-004) is performed.

At step S3-003, error process 1 is performed. In this process, the information processing terminal 114 displays a fact that the downloading is disabled and a message stating the reason.

At step S3-004, generation and transfer of data is performed. In this process, the data that is first transferred from the information processing terminal 114 to the facsimile apparatus is a download command (including information indicating that the downloading is to be executed, parameter details, the end process condition, and the abnormal process condition). As to the second data transfer and the following, the information processing terminal 114 converts or generates data for the n-th (n>1) transfer, among all the data to be downloaded, to obtain a form that is decided with the facsimile apparatus. This decision is regulated by a command. This decision may be determined according to the notice of the result at the (n-th−1) transfer. In any case, when condition required for all the data to be downloaded is equal, all the data may be converted or generated at this stage. When the formation of the download data is completed, the information processing terminal 114 sends the download data to the facsimile apparatus.

At step S3-005, data reception is performed. In this procedure, the CPU 101 of the facsimile apparatus receives the download data via the I/F controller 113.

At step S3-006, a check is performed to determine how much memory is available (or vacant). In this procedure, the CPU 101 of the facsimile apparatus searches the image memory 104 for available memory. When there is no memory available, error process 2 (S3-010) is performed. When there is available memory, the determination of a data type (S3-007) is performed.

At step S3-007, the data type is examined. In this procedure, the CPU 101 of the facsimile apparatus determines the data type of the received download data. This determination is performed as follows. The data that is received while the facsimile apparatus is on standby is regarded as character data that indicates a command and is analyzed. The data received after a command has been received is determined to be in the form that is designated (by a command or by a previous result notice) before that data is transferred. As a result of the determination, when the data is coded data (MH, MR, MMR, or JBIG) or original (non-coded) data, a coding/decoding process (S3-008) is performed. When the data is character data or PDL, the data is stored in the image memory 104 (S3-001).

At step S3-008, the coding/decoding process is performed. In this process, the CPU 101 of the facsimile apparatus codes/decodes the coded data (MH, MR, MMR, or JBIG) or the original data. For example, the MH data is decoded to obtain the original data, which is in turn coded to obtain data having a form that can be recorded in the image memory 104.

At step S3-009, a check is performed to determine whether the coding/decoding process has been normally completed. With this process, when the coding/decoding process (S3-007) has been completed normally, the data is recorded in the image memory 104 (S3-011). When the process has not been normally terminated, error process 2 (S3-010) is performed.

At step S3-010, error process 2 is performed. In this process, when it is determined during the memory check (S3-006) there is no remaining memory available, or when the coding/decoding process (S3-008) is not normally terminated, program control follows the abnormal process condition. The abnormal process condition is, for example, to halt the downloading when the reception of the download data has failed or when the retransmission of the same data has been repeated a designated number of times (e.g., three times) and has failed. As a response, a message requesting that data transmission be halted or requesting that data be retransmitted may be sent to the information processing terminal 114.

At step S3-011, data is recorded in the image memory 104. The CPU 101 of the facsimile apparatus stores coded/decoded data, PDL, character data, etc., in the image memory 104.

At step S3-012, a response is transmitted. In this procedure, the CPU 101 of the facsimile apparatus transmits a response to the information processing apparatus 114. When the process has been terminated normally, information indicating that fact is used for the response. When the process has failed, a response (a request for a transmission halt or a request for retransmission) that corresponds to the processing contents described for error process 2 at step S3-010 is employed.

At step S3-013, response reception is performed. In this procedure, the information processing terminal 114 receives the response.

At step S3-014, a check is performed to determine whether the data transfer has been completed normally. The information processing terminal 114 confirms this by referring to a response stating that the downloaded data has been normally transferred. When the data has not been transferred normally, error process 3 (S3-015) is performed.

At step S3-015, error process 3 is performed. In this process, the information processing terminal 114 halts the following downloading process when the response is a request for a halt. When the response is a request for retransmission, the information processing terminal 114 generates the same data again. Program control returns to step S3-004 for the transfer of the data.

At step S3-016, a check is performed to determine the quantity of remaining data. In this procedure, the information processing terminal 114 examines the data to determine how much remains to be downloaded. When there are some data remaining, program control returns to the step for data generation and transfer (S3-004). When there are no data remaining, the downloading is terminated.

Since, by the downloading function, the facsimile apparatus can treat the data that the information processing terminal handles, as data that are stored in the image memory:

(1) it is possible for the facsimile apparatus to employ data that are entered, corrected, and processed by various applications, such as word processors, databases, and graphic applications, that can be used by the information processing terminal, another terminal of the network connected to the information processing terminal, and peripheral device. Therefore, it is possible to perform a data process that is difficult to perform with a single facsimile apparatus, and operability and quality can be increased;

(2) with a combination of this function and a file transmission function, data that the information processing terminal manages can be transmitted by facsimile, and since digital data is transferred electrically, there is hardly any deterioration of quality, and paper and human effort can be saved; and (3) by combining this function with a file print function, the data that the information processing terminal manages can be printed. Therefore, the facsimile apparatus can also be used as a printer.

2. Host print function

FIGS. 4A to 5 are flowcharts showing the control operation of a host print function in this embodiment. The host print function is for the sequential printing of image data that are received from the information processing terminal 114. In this embodiment, the analysis of a host print command and the reception of image data are performed by an interface control program, and the recording is performed by a recording control program.

First, the analysis of the host print command and the reception of the image data will be explained while referring to FIGS. 4A and 4B.

The analysis of a host print command and the reception of image data are controlled by the interface control program in the ROM 102. The reception of the host print command and a notice for termination of the recording that is sent by the recording control program in the ROM 102 are monitored.

First, the reception of a command from the information processing terminal 114 is monitored (S401). When a host print command is received, the host printing is begun. When a host print command is not received, program control moves to step S410, and the termination of the recording of the host printing is monitored.

When a host print command is received, the state of the record controller 112 is examined to determine whether or not a host print command is acceptable (S402). When an error, other than the exhausting of recording paper or the jamming of recording paper, has occurred in the record controller 112, it is determined that the error can not be eliminated immediately, and an error response is transmitted to the information processing terminal 114. The host printing is thereafter terminated (S412).

When it is determined that record control can be initiated, the record control job for executing the received host print command is entered in the record control queue (S403). The record control job that is entered in the record control queue performs record control in the order that follows the priority that is set with a command by the record control program in the ROM 102. Record control jobs for which image data transfer has not yet been performed can also do queuing control. In this case, the record control process is initiated at the time that a predetermined amount of image data has been transferred. When the job is to be entered, the record control ending process condition and record control error process condition that are set by a host command, and information such as an ID to identify the individual record controls, are queued at the same time.

When the record job has been entered, a record mode setting command is received from the information processing terminal 114 (S404). The record mode setting command is performed to set various parameters, such as recording paper sizes and recording densities, for the record control. The set value of the received command is analyzed by an analyzing program of the ROM 102, and is stored at a predetermined position of the RAM 103.

When the setting of a record mode is terminated, the available (or remaining) memory capacity in the image memory 104 is obtained to determine whether or not the available memory capacity is equal to or larger than a predetermined amount (S405). A predetermined amount of available memory in this embodiment is a memory capacity that is large enough to store one page of image data, and is set in page units in accordance with the data format for image data. When the available memory amount is equal to or larger than the predetermined amount, it is determined that the image data from the information processing terminal 114 can be stored in the image memory 104, and the reception control of image data is performed asynchronously with the record controller 112. By performing host print control asynchronously with the record controller 112, the image data can be received without waiting for the termination of the processing that is performed by the record controller 112 and the system can be efficiently utilized. When the available memory amount is less than the predetermined amount, it is determined that the image memory can not be stored in the image memory 104 and the reception of image data is performed synchronously with the record controller 112. By performing host print control synchronously with the record controller 112, record control can be performed without using the image memory 104 and the image memory 104 can be efficiently used.

When, at step S405, it is determined that sufficient memory is available, the image data for one page is received from the information processing terminal 114 (S406). The reception of image data is controlled according to various parameters, such as data resolutions and image data types that are set by an image data transfer command and are received from the information processing terminal 114. The data type that can be handled in this embodiment are coded data, such as MMR, original data, and character data, such as the page description language (PDL) of the printer.

Sampling is sequentially performed on the image data sent from the information processing terminal 114 by the I/F controller 113, and the resultant data are processed according to their data types. The coded data is transferred to the codec processing unit 111 where the coding/decoding of that data is performed. The resultant data that have been coded in consonance with a determined system are stored sequentially in the image memory 104. The original data are transferred to codec processing unit 111, which then codes the data according to a predetermined coding system. The resultant data are sequentially stored in the image memory 104. The character data are transferred to the data converter 105, which performs CG development of the data. The resultant data are transferred to the code processing unit 111, which then codes the received data according to a set coding system. The coded data are sequentially stored in the image memory 104. In this embodiment, a DMA is employed for the transfer control to increase the data transfer speed.

After the image data for one page have been received, a signal indicating that the process of receiving one page data has been terminated (that the storage of one page of data has been completed) is transmitted to the information processing terminal 114 (S407).

When the process for the reception of one page is terminated, a check is performed to determine whether or not a succeeding page is present (S408). When there is a succeeding page, program control moves to step S404, and the reception of image data is continued. When there is no succeeding page, host print control is determined to be terminated, and the information processing terminal 114 is notified of the ending of the process for the host print command, and the service ID of the received command (S409). The notice of the end of the process for the command states that a series of data for the host print function has been fully received, and does not mean that the service of the host print command is terminated (only the recording is terminated).

When notification of the termination of the process for the command has been made, a check is performed to determine whether or not a notice for record control termination has been sent by the record control program relative to the received command (S410). When record control is terminated, the termination of the service by the host print command, the result obtained by the record control, and the service ID for the command are reported to the information processing terminal 114 (S411). After the notice for the ending of record control has been transmitted, program control returns to step S401 and command observation is repeated.

When, at step S405, the remaining memory is less than a predetermined amount, the state of the record controller 112 is detected (S413). When the record controller 112 is stopped because there is no recording paper or because it is executing another record control job, it is determined that the record controller 112 can not perform the record control in synchronization with the reception of image data, and an error signal is transmitted to the information processing terminal 114 to terminate record control (S412). When the record control for a currently received host print command is performed, it is determined that the record controller 112 can execute record control.

When the record control for a currently received host print command is performed, the termination of record control for a page that has not yet been output is waited for (S414), so that reception control of image data can be synchronized with record control. The termination of record control for the page not yet output is performed by observing a notice from the record control program indicating the termination of the recording for one page. This control is also performed when the available memory capacity in the image memory 104 is reduced (is less than a predetermined amount) during host print control for a certain page of image data.

When the output of the page not yet output is completed, the image data for one page is received from the information processing terminal 114 (S415). After the receipt of the image data for one page, to synchronize with the record controller 112, a notice from the record control program, indicating the termination of record control for one page, is monitored (S416). When the processing of the record controller 112 is terminated, a response is transmitted that notifies the information processing terminal 114 that the reception and record control of one page of image data has been terminated (S417). Program control then moves to step S408, where a check is performed to determine whether or not a succeeding page is present, and host print control is continued.

Record control for the image data will now be explained while referring to FIG. 5.

The recording of the image data is controlled by the record control program in the ROM 102, and the record control queue is monitored. When the record control job is entered, record control is initiated.

First, the job that is entered in the record control queue is analyzed, and the record control ending process condition and the record control error process condition are set (S501). In this embodiment, the image memory 104 for which record control is performed is cleared when record control has been terminated. When the error process is terminated, memory is held and an error recovery process for reperforming record control is set.

When the ending process condition has been set, the job that is entered in the record control queue is analyzed and various parameters that are required for record control are set (S502).

After the record control has begun, the image data type of an image file for which record control is to be performed is analyzed (S503). When the designated image data are coded data, the image data that are stored in the image memory 104 are transferred to the codec processing unit 111 for decoding (S504). The decoded image data are then converted by the resolution conversion processing unit 110 into data for a determined resolution that is selected in advance. The resultant data are sequentially transferred to the record controller 112 for record control. When the image data that are designated at step S503 are character data, such as page description language, the image data that are stored in the image memory 104 are transferred to the data converter 105, which then converts them to raster data (S511). Resolution conversion is performed for the obtained data as well as for the coded data, and then the results are recorded.

When a record control error has occurred, such as the jamming of recording paper, during record control (S505), the record error ending process that is set at step S501 is performed (S512). Since record control is reemployed in this embodiment, the job is again entered in the record control queue. The record error ending and an ID are sent to an interface control program, and thereafter record control is terminated (S510).

When no error has occured, termination of record control of one page is checked. If the record control is not terminated, a flow shifts to step S503 in which the record control is continued.

When one page of data has been recorded (S506), a notice that the recording of one page has been completed is sent to the interface control program (S507), and a check is performed to determine whether or not a succeeding page is present (S508).

When there is a succeeding page, program control returns to step S502 to continue the recording. When there is no succeeding page, the record ending process that is set at step S501 is performed (S509). In this embodiment, the image data are cleared and the record ending and the ID are sent to the interface control program to terminate the record control (S510).

In the above described host print control process, since control for transferring received image data to the recording section without being routed via an image memory is performed, record control can be performed even when there is a data memory overflow. Further, when there is available memory, data are first stored in the image memory, and control for performing the sequential recording of specific pages is added, so that the operation speed of the system can be increased.

3. File print function

FIG. 6 is a flowchart showing the control process for a file print function in this embodiment. The file print function sequentially prints image files that are stored in the image memory 104 of the image processing apparatus. In this embodiment, the analysis of a file print command and the reception of the image data are performed by the interface control program, and the record control is performed by record control program that is explained while referring to FIG. 5.

The file print function will now be described while referring to FIG. 6.

The analysis and the control of the file print command is performed by the interface control program in the ROM 102. The reception of a host print command and a notice from the record control program in the ROM 102, indicating the record control end, are monitored, and control for each process is performed.

The reception of a command from the information processing terminal 114 is monitored (S601). When the file print command is received, file print control is started. When the file print command is not received, program control moves to step S605 where the termination of record control for the file print is monitored.

Upon the receipt of the file print command, the state of the record controller 112 and the state of a selected image file are detected, and a check is performed to determine whether or not a file print command can be accepted (S602). When the record controller 112 is in an error state, other than one state where the recording paper is exhausted or where the recording paper is jammed, it is determined that the removal of the error can not be performed immediately, and an error response is transmitted to the information processing terminal 114. File print control is thereafter terminated (S609). When a file that is not present in the image memory or a file that is being recorded is designated, it is determined that it is impossible to accept the file print, and the information processing terminal 114 is notified of this by an error response. File print control is therefore terminated.

When it is determined that the start of record control is enabled, the record control job for executing a received file print command is registered in the record control queue (S603). In the record control job that is entered in the record control queue, the recording is sequentially performed by the record control program in the ROM 102 in the priority order that is set by a command. When the job is entered, the record control ending process condition and record control error process condition, which are set by a host command, and information such as an ID for identifying each record control job are also queued at the same time.

After queuing control of the recorded image is terminated, the information processing terminal 114 is notified of the termination of the receipt of the file print command and a service ID of the command (S604).

When the notification of the termination of the command has been sent, a check is performed to determine whether or not there is a notice, indicating the record control end, that is transmitted relative to the received command by the record control program (S605). When record control is terminated, the information processing terminal is notified of termination of the service by the file print command, the result of record control, and the service ID for the command (S606).

When a record control result request command is received from the information processing terminal 114 (S607), the current recording state is ascertained, and the current record control result, such as the recording ending, the recording being processed, or the recording error ending, is transmitted to the information processing terminal 114 (S608).

After the monitoring/control of the record control result request command, program control returns to step S601, and the monitoring/control of the command is repeated.

In the above described file print control process, control where the data type of a selected image file is automatically identified is performed, so that record control for image data that are stored in the character data form can easily be performed.

In addition, since the ending process condition can be set in the file print control process, print error recovery can be easily controlled.

4. Host transmission function

The host transmission function involves the transfer to the facsimile apparatus of data that are managed by the information processing terminal 114, and the transmission of that data by the facsimile apparatus. At this time, the data that the information processing terminal 114 handles are transmitted without using the image memory 104 of the facsimile apparatus, and the facsimile apparatus notifies the information processing terminal 114 of the transmission result.

FIG. 7 is a flowchart showing the control process for the host transmission function.

In the host transmission, the information processing terminal 114 makes a call to a designated destination. The data that are managed by the information processing terminal 114 are converted into data that an apparatus at the destination can receive. The information processing terminal 114 is notified of the transmission result. There are several possible procedures for data conversion that depend on which apparatus performs that conversion, either the information processing terminal or the facsimile apparatus. In the present invention, the procedure wherein the information processing terminal 114 performs data conversion will be explained.

At step S7-001, an instruction for host transmission is received. At this step, the CPU 101 of the facsimile apparatus determines whether or not an instruction for host transmission (hereafter referred to as a "host transmission command") has been received. The host transmission command includes the phone number of a desirable partner station. As information concerning the partner station, the host transmission command may include one-touch dial numbers and abbreviated dial numbers that are registered in the facsimile apparatus. Further, end process condition and abnormal end process condition, which specify the control procedures that are to be performed following the transmission, may also be included. In this embodiment, only a result notice is specified as the end process condition and the abnormal end process condition. When the host transmission command has been received, program control moves to step S7-002. When the command has not yet been received, an error response is transmitted (S7-009).

At step S7-002, the probability that the host transmission can be executed is ascertained. During this process, a check is performed to determine whether or not the host transmission can be executed. The decision depends on whether or not the communication line can currently be used. When the host transmission is enabled, the host transmission command is registered in the communication control queue (S7-003). When the host transmission is disabled, an error response is transmitted (S7-009).

At step S7-003, the host transmission command in the communication control queue is registered. In this process, a communication control job for executing the received host transmission command is entered in the communication control queue. This job has a high priority. Since the communication line can be used currently, the host transmission control process for making a call is immediately executed and calling is done.

At step S7-004, it is determined whether or not there is a notice from a partner concerning the faculties of the partner station. During this process, the facsimile apparatus is connected to the partner station by the execution of the host transmission, and the faculties of the partner station can be acquired from the result of phase A of G3 FAX. Whether or not a notice indicating the result is present is detected.

At step S7-005, the faculties of the partner station are transmitted. By this process, the faculties of the partner station are transmitted to the information processing terminal 114.

At step S7-006, data are received from the host. In this process, the CPU 101 of the facsimile apparatus receives data (for each page) from the host via the I/F controller 113, and transmits the data to the partner station.

At step S7-007, a response is transmitted. During this process, notification of the completion of the data transmission is sent to the information processing terminal 114.

At step S7-008, it is determined whether or not a succeeding page is present. During this process, the CPU 101 of the facsimile apparatus determines whether or not data for a succeeding page have been sent by the host. When there is a succeeding page, program control returns to step S7-006. When there is no succeeding page, program control advances to step S7-010.

At step S7-009, an error response is transmitted. For this process, a response indicating that the host transmission has been disabled is forwarded to the information processing terminal 114.

At step S7-010, the facsimile apparatus determines whether or not notification of the ending of host transmission has been performed. In this process, it is determined whether or not a notice has been transmitted indicating the ending of host transmission. This notice is forwarded when the host transmission has been terminated under host transmission control, which will be described later. When a notice for the ending of host transmission is present, a process at step S7-011 is performed. When such a notice is not present, a process at step S7-012 is performed.

At step S7-011, an end message is transmitted. During this process, an end message that includes a service ID and the transmission result is forwarded to the information processing terminal 114.

At step S7-012, the presence of a request for the host transmission condition is confirmed. With this process, it is determined whether or not a request for the host transmission condition has been received from the information processing terminal 114. When the request has been received, program control advances to step S7-013.

At step S7-013, the host transmission condition is sent. During this process, the host transmission condition (transmission result) relative to the service ID, for which the acquisition of the condition is requested, is transmitted to the information processing terminal 114.

FIGS. 8A and 8B are flowcharts for host transmission control in this embodiment. The communication control jobs, which are registered in the communication control queue by the above described host transmission function, are performed by the communication control program that is in the ROM 102 following the priority order that is set by a command. In this embodiment, the job is immediately performed, as is previously described.

At step S8-001, the end process condition is set. With this process, when the communication control for the host transmission is initiated, the end process conditions that are instructed by a command from the information processing terminal 114 are set. In this embodiment, the detailed results for the communication are set as the end process condition and the abnormal end process condition.

At step S8-002, the transmission control process is begun. At this step, the communication controller 108 makes a call to the partner that is designated by a command.

At step S8-003, the information processing terminal 114 is notified of the faculties of the partner station. During this process, the facsimile apparatus is connected to the communication partner, and the faculties of the partner, which can be obtained from the result for phase B of G3 FAX, are included in the notification.

At step S8-004, whether the file transfer can be executed is ascertained. During this process, a check is performed to determine whether or not the file transfer should be executed. The decision must be shared with the information processing terminal 114. More specifically, on the basis of the partner's faculties, the information processing terminal 114 determines the data type that is to be transmitted to the facsimile apparatus, and the data and the data type are transferred to the facsimile apparatus, which complies to them. Or, the determination references are commonly determined in advance, and the information processing terminal 114 and the facsimile apparatus can make individual determinations. With either method, it should be noted that at this time the information processing terminal 114 transfers the data. For the execution of the file transfer, program control goes to step S8-005. When the file transfer is not to be executed, program control moves to step S8-008.

At step S8-005, the file transfer process is performed. In the process, the data (file) that is sent from the information processing terminal 114 is transmitted to the partner station. This can be performed by using a G3 BFT (Binary File Transfer) function.

At step S8-006, whether or not the communication has been normally performed is determined. During this process, by referring to result of the communication with the partner station, a check is performed to determine whether or not the communication (file transfer) has been normally completed. If a communication error has occurred during the transmission, program control goes to step S8-020. If there is no communication error, program control advances to step S8-007.

At step S8-007, a check is performed to determine whether or not the processing for one file has been terminated. During this process, the file transfer process is performed until the transfer of one file is completed. When the processing has not yet been terminated, program control returns to step S8-005. When the processing has been completed, program control moves to step S8-018.

At step S8-008, the confirmation of the coded data is performed. For this process, a check is performed to determine whether or not (page) data that have been transmitted from the information processing terminal 114 are coded data (MH, MR, etc.). In some cases, the decision concerning the data type has already been performed, as is described at step S8-004. If the data are coded data, program control advances to step S8-009. If not, program control moves to step S8-013.

At step S8-009, a decoding process is performed. During this process, coded data (MH, MR, etc.) are decoded by the code processing unit 111 to obtain the original data.

At step S8-010, a resolution convert/encode process is performed on the data before transmission. In this process, the original data (MH, MR, MMR, etc.) are encoded to obtain data that are in consonance with the faculties of the partner station, and the resultant data are transmitted.

At step S8-011, it is confirmed that the communication has been normally performed. For this process, the communication result with the partner station is employed to determine whether or not the communication has been normally performed. When a communication error has occurred during the transmission, program control goes to step S8-020. When there is no communication error, program control advances to step S8-012.

At step S8-012, a check is performed to determine whether or not the processing for one page has been terminated. In this process, the page transmission processing is continued until transmission of one page is completed. When the processing has not yet been completed, program control returns to step S8-009. When the processing has been terminated, program control advances to step S8-018.

At step S8-013, whether or not data are PDL or character data is ascertained. In this process, a check is performed to determine whether or not (page) data that are transmitted from the information processing terminal 114 are PDL or character data. In some cases, the decision concerning the data type has already been performed as is described at step S8-004. In any case, when the data are PDL or character data, program control advances to step S8-014. When the data are neither PDL nor character data, program control moves to step S8-020.

At step S8-014, data conversion is performed. During this process, the PDL or the character data are converted into the original data by the data converter 105.

At step S8-015, a resolution convert/encode process is performed on the data before transmission. During this process, the original data (MH, MR, MMR, etc.) is encoded to obtain data that are in consonance with the faculties of the partner station, and the resultant data is transmitted.

At step S8-016, it is confirmed that the communication has been normally performed. For this process, the result of the communication with the partner station is employed to determine whether or not the communication has been normally performed. When a communication error has occurred during the transmission, program control goes to step S8-020. When there is no communication error, program control advances to step S8-017.

At step S8-017, a check is performed to determine whether or not the processing for one page has been terminated. With this process, the page transmission processing is continued until transmission of one page is completed. When the processing has not yet been completed, program control returns to step S8-014. When the processing has been terminated, program control advances to step S8-018.

At step S8-018, the presence of succeeding data is checked. With this process, a check is performed to determine whether or not there is succeeding data that is to be transmitted from the information processing terminal 114. When succeeding data is present, program control returns to step S8-004. When there is no data present, program control advances to step S8-019.

At step S8-019, the ending process is performed. During this process, the communication end process (phases D and E in G3 FAX communication) is performed. Since a notice indicating that the detailed communication result is determined as the end process condition in this embodiment, the result is transferred.

At step S8-020, an error termination process is executed. In this process, since a notice of detailed result is set as the abnormal end process condition, transfer of the detailed result regarding transmission failure is conducted.

At step S8-021, notification of the termination of the host transmission is transmitted. In this process, the normal end or the error end for the host transmission is notified, and the host transmission control is thereafter terminated.

As is described above, according to the host transmission function, without requiring the image memory to store all the image data that are to be transmitted, the data that the information processing terminal 114 handles can be transmitted. More specifically, compared with the combination of the downloading function and the file transmission function, the host transmission function can provide advantages, such as a reduction in the manufacturing costs for the apparatus that is accompanied by an image memory 104 savings, and an increase in the memory that is available for data reception by using the image memory 104. Further, since the faculties of a communication partner is examined by making a call, and data in consonance with the faculties can be transmitted, it is possible to skip some processes, such as resolution conversion and decoding, that are required for file transmission. Therefore, the transmission process for the entire system, which consists of the information processing terminal 114 and the facsimile apparatus, can be efficiently executed.

5. File transmission function

FIG. 9 is a flowchart showing the control process for the file transmission function in this embodiment. The file transmission function is employed to make a call to a partner that is designated by the information processing terminal 114, to convert a designated file in the image memory 104 into data that the partner can receive, and to notify the information processing terminal 114 of the transmission result for the data.

First, a check is performed to determine whether or not a file transmission command has been received via the I/F controller 113 from the information processing terminal 114 (S901). When the command has been received, program control advances to S902. When the command is not received, program control moves to S906. The file transmission command includes the file ID of a desired file and the phone number of a partner. A plurality of file IDs may be designated. As information about the partner station, the file transmission command may include one-touch dial numbers and abbreviated dial numbers that are registered in the facsimile apparatus. Further, an end process condition and an abnormal end process condition, which designate the control process that is performed following the transmission, may also be included. In this embodiment, as the end process condition, the erasure of a file is selected, while as the abnormal end process condition, the non-erasure of a file and error retransmission are designated.

If, at S901, the file transmission command has been received, a check is performed to determine whether or not a file for the designated file ID can be transmitted (S902). This decision is made by referring to the presence of a file, a file attribute, the current use status of a file, etc. When it is determined that the transmission is disabled because of the absence of a file, etc., at S905, a response indicating that the file transmission is disabled is sent to the information processing terminal 114. Program control then advances to S906.

If, at S902, it is determined that the transmission is enabled, a communication control job for executing a received file transmission command is entered (registered) in a communication control queue (S903). Then, the completion of the reception and the service ID of the file transmission command are transmitted to the information processing terminal 114 (S904). Program control moves to S906. When the communication control queue is employed for control in the above described manner, a plurality of file transmission commands can be received. Also, since the information processing terminal 114 receives the service ID, it can identify the results of the individual commands as it receives them.

At S906, a check is performed to determine whether or not notification of the ending of the file transmission has been made. This notification is forwarded when the file transmission is completed during the file transmission control process, which will be described later. When notification of the ending of the file transmission is made, an end message that includes the service ID and the transmission result is sent to the information processing terminal 114 (S907). The receipt of the end message notifies the information processing terminal 114 that the file transmission has ended and provides it the transmission result.

At S908, a check is performed to determine whether or not a request for the file transmission result has been received from the information processing terminal 114. When such a request has been received, the file transmission status (transmission being performed, redialing and waiting, etc.) relative to the service ID, for which the acquisition of the status is requested, is transmitted (S909). Program control then returns to S901.

As described above, in the file transmission function, while the reception of a file transmission command (S901), the notification of the ending of the file transmission (S906), and the request for acquiring the file transmission status (S908) are monitored, the process that corresponds to the one that is detected is performed.

FIGS. 10A and 10B are flowcharts for file transmission control in this embodiment. The communication control jobs, which are registered in the communication control queue by the above described file transmission function, are performed by the communication control program in the ROM 102 following the priority order that is set by a command. When the communication control for the file transmission is begun, the ending process condition that is instructed by a command is set at S1001. In this embodiment, the erasure of a file is set as the end process condition, and the non-erasure of a file and error retransmission are set as the abnormal end process condition.

Then, transmission control is initiated, and the communication controller 108 makes a call to a partner that is designated by a command (S1002). A check is then performed to determine whether or not the file transfer is to be executed (S1003). This decision is made by referring to the file attributes and the previous communication results with the partner station before the file transmission. The previous communication results are stored in the RAM 103 for each one-touch dial/abbreviated dialing, and the decision may be made using the stored contents. Further, when the faculties of the partner station are known in advance, the data type that is to be transmitted is included in the file transmission command, and the information processing terminal 114 may instruct the execution of the command.

For the file transfer, data in the file in the image memory 104 are read and transmitted (S1004) sequentially. When there is a communication error during the transmission (S1005), the error end process is performed at S1018. When there is no communication error, the file transfer process is continued until the transfer of one file is completed (S1006). When one file has been transferred, a check is performed to determine whether or not a succeeding file has been designated (S1007).

When, at S1003, it is determined that the file transfer is not executed, coding (MH, MR, MMR, etc.) that is in consonance with the faculty of the partner station is performed on the data and the resultant data are transmitted.

At S1008, a check is performed to determine whether or not the data type of a designated file is coded data. If the data are coded data, the codec processing unit 111 decodes the data to obtain the original data (S1009). The resolution converter 110 performs resolution conversion on the original data, and then the codec processing unit 111 encodes the data and transmits them (S1010). When a communication error has occurred during the transmission (S1011), the error ending process is performed at S1018. When there is no communication error, transmission control is continued until the transmission of one file is terminated (S1012). When the transmission of one file is terminated, a check is performed to determine whether or not a succeeding file has been designated (S1007).

When, at S1008, the file is described in PDL or character data, the data converter 105 converts the file to obtain the original data (S1013). The resolution converter 110 performs resolution conversion of the original data and the codec processing unit 111 encodes the data and transmits the resultant data (S1014). When a communication error has occurred during the transmission (S1015), the error end process is performed at S1018. When there is no communication error, transmission control is continued until the transmission of one file is terminated (S1016). When the transmission of one file is terminated, a check is performed to determine whether or not a succeeding file has been designated (S1007).

At S1007, a check is performed to determine whether or not a succeeding file has been designated. If a succeeding file has been designated, program control returns to S1003 to transmit that file. If a succeeding file has not been designated, program control moves to S1017 to perform the end process.

Since the erasure of the file constitutes the end process condition in this embodiment, in the end process at S1017, the transmitted file is erased. In the error end process at S1018, since the non-erasure of the file and the error retransmission are set as the abnormal end condition in this embodiment, the file is not erased and the redial and wait process is performed. For this file, the redialing is performed so as to make a call after a predetermined time has elapsed, and an error image is transmitted.

Finally, notification of the normal end or the error end of the file transmission is made (S1019), and the file transmission control is terminated.

According to the file transmission function as described above, the abnormal end process condition is included in a command, so that recovery control for the error transmission can be set for each communication.

Further, by performing queuing control and priority control for a command, an efficient and highly operational transmission function can be provided. In addition, by employing the service ID, the information processing terminal 114 can identify commands when it receives the command results.

When this function is used with the download function, a file in the information processing terminal can be transmitted to a partner. At this time, since complicated processes, such as resolution conversion and coding, are performed by the facsimile apparatus, the load of the information processing terminal can be reduced.

6. Document sheet transmission function

FIG. 11 is a flowchart showing the control process for the document sheet transmission function in this embodiment. The document sheet transmission function involves reading of a document sheet in a read mode that is instructed by the information processing terminal 114, transmission of the data that is read to a designated partner, and the notification of the information processing terminal 114 of the result.

First, a check is performed to determine whether or not a document sheet transmission command has been received via the I/F controller 113 from the information processing terminal 114. (S1101). When the command has been received, program control advances to S1102. When the command has not been received, program control moves to S1106. The document sheet transmission command includes a read mode for selecting the resolution and the density for each document sheet and the phone number of a partner. As information about the partner station, the document sheet transmission command may include one-touch dial numbers and abbreviated dial numbers that are registered in the facsimile apparatus. Further, an end process condition and an abnormal end process condition, which designate the control process that is preformed following the transmission, may also be included. In this embodiment, as the end process condition, the erasure of a file is selected for memory transmission. As the abnormal end process condition, no redialing is designated for direct transmission, while non-erasure of a file and error retransmission are designated for memory transmission.

If, at S1101, the document sheet transmission command has been received, a check is performed to determine whether or not a document sheet transmission is acceptable (S1102). This decision is made by referring to the presence of a document sheet, the current use status of the read controller 106, the presence of a communication control job for another document sheet transmission command, etc. When it is determined that the transmission is not acceptable, at S1105, a response indicating that the document sheet transmission is disabled is sent to the information processing terminal 114. Program control then advances to S1106.

If, at S1102, it is determined that the transmission is acceptable, a communication control job for executing a received document sheet transmission command is entered (registered) in a communication control queue (S1103). Then, the completion of the reception and the service ID of the document sheet transmission command are transmitted to the information processing terminal 114 (S1104), and program control moves to S1106. Since the information processing terminal 114 receives the service ID, it can identify the results of the individual commands when they are received.

At S1106, a check is performed to determine whether or not notification of the end of the document sheet transmission has been made. This notification is made when the document sheet transmission is completed during the document sheet transmission control process, which will be described later. When the notification of the end of the document sheet transmission is present, an end message that includes the service ID and the transmission result is sent to the information processing terminal 114 (S1107). By the receipt of the end message, the information processing terminal 114 is informed of the end of the document sheet transmission and the transmission result.

At S1108, a check is performed to determine whether or not a request for acquiring the document sheet transmission result has been received from the information processing terminal 114. When such a request has been received, the document sheet transmission status (transmission being performed, a document sheet being read, etc.) relative to the service ID, for which the acquisition of the status is requested, is transmitted (S1109). Program control then returns to S1101.

As is described above, in the document sheet transmission function, while the presence of the reception of a document sheet transmission command (S1101), the notification of the ending of the document sheet transmission (S1106), and the request for acquiring the document sheet transmission status (S1108) are monitored, the process that corresponds to the one that is detected is performed.

FIGS. 12A and 12B are flowcharts for document sheet transmission control in this embodiment. The communication control jobs, which are registered in the communication control queue by the above described document sheet transmission function, are performed by the communication control program in the ROM 102 following the priority order that is set by a command. When the communication control for the document sheet transmission is begun, the end process condition that is instructed by a command is set at S1201. In this embodiment, the erasure of a file for memory transmission constitutes the end process condition. As the abnormal end process condition, no redialing is set for direct transmission and the non-erasure of a file and error retransmission are set for memory transmission.

Then, a check is performed to determine whether or not direct transmission is to be executed (S1202). This decision may be made by the instruction included in a command, or may be made by the setting of the facsimile apparatus.

When the direct transmission is to be executed, the transmission control process is begun. The communication controller 108 makes a call to a partner that is designated by a command (S1203). Then, the read mode included in the command is set to a read mode that is determined by the reception faculties of the partner station (S1204). The reception faculties of the partner station are decided by the communication results with the partner station before the document sheet transmission. The previous communication results are stored in the RAM 103 for each one-touch dialing/abbreviated dialing, so that the reception faculties of the partner station may be determined from the stored contents. While the read controller 106 reads the document, the codec processing unit 111 converts the data that is read into a coding system (MH, MR, MMR, etc.) that corresponds to the reception faculties of the partner station, and transmits the converted data (S1205). When a communication error has occurred during the transmission (S1206), the error end process is performed at S1210. When there is no communication error, the transmission is continued until the data transmission for the document sheet is completed (S1207). When the transmission for the document sheet is terminated, a check is performed to determine whether or not the data for a succeeding document sheet should be transmitted (S1208). This decision may be based on the detection of a succeeding document sheet, or in response to an instruction that is included in the document sheet transmission command. When the data for a succeeding document sheet are to be transmitted, program control returns to step S1204 to start the transmission for the succeeding document sheet. When the transmission for the succeeding document sheet is not to be performed, program control advances to S1209.

If, at S1202, direct transmission is not to be executed, the read mode is set to a read mode that is indicated by a command (S1212). While the read controller 106 reads the document, the codec processing unit 111 encodes the data and stores the coded data in the image memory 104 (S1213). When a read error or a memory storage error has occurred during the reading (S1214), the error end process is performed at S1210. When there is no error, the read control is continued until the storing of document data in the memory is terminated (S1215). When the data for the document has been stored in the image memory 104, a check is performed to determine whether or not a succeeding document sheet is to be read (S1216). This decision may be based on the detection of a succeeding document, or in response to an instruction in the document sheet transmission command. When a succeeding document sheet is to be read, program control returns to S1212 to initiate the reading of the succeeding document sheet. When a succeeding document sheet is not to be read, program control advances to S1217.

At S1217, the transmission control is begun, and the communication control 108 makes a call to a partner that is designated by a command. Then, the codec processing unit 111 decodes the coded data that has previously been stored in the image memory 104 to obtain original data (S1218), the resolution converter 110 performs resolution conversion of the data, and the codec processing unit 111 encodes the converted data to provide data that is in consonance with the reception faculties of the partner station and transmits the resultant data (S1219). When a communication error has occurred during the transmission (S1220), the error end process is performed at S1210. When there is no communication error, the transmission is continued until the transmission of the stored coded data is terminated (S1221). When the transmission is completed, program control goes to S1209.

In the end process at S1209, the end process condition that is set at S1201 is executed. In this embodiment, the erasure of a file that has been transmitted during the memory transmission process is performed. In the error end process at S1210, the abnormal end process condition that is set at S1201 is executed. In this embodiment, for direct transmission, redialing is not performed when an error has occurred during the transmission. For memory transmission, the file is not erased, and the redial and wait process is performed. As for the file that is not erased, redialing is made when a predetermined time has elapsed, and an error image is transmitted.

Finally, notification of the normal end or the error end of the document sheet transmission is made (S1211), and the document sheet transmission control process is terminated.

According to the document sheet transmission function as described above, the abnormal end process condition is included in a command, so that the recovery control process for the error transmission can be established for each communication.

Further, by performing queuing control and priority control for a command, an efficient and highly operational transmission function can be provided. In addition, by employing the service ID, the information processing terminal 114 can identify commands when the command results are received.

7. File upload function

The file upload function is to convert data (coded data/ PDL/character data), which are stored in the image memory 104 of the facsimile apparatus, into a data type that is requested for a file that is managed in the facsimile apparatus, and to transfer the converted data to the information processing terminal 114.

FIG. 13 is a flowchart showing the control process for the file upload function.

In the flowchart in FIG. 13 is shown the file upload process where coded data and PDL that are stored in the image memory 104 of the facsimile apparatus in this embodiment are transferred to the information processing terminal 114 for a file that is managed by the facsimile apparatus.

In the file upload process, when a file upload is requested by a command from the information processing terminal 114 that is transmitted via the I/F controller 113, the file upload process is performed. It is noted that any contradiction that exists between the command and the parameter level is eliminated in advance during the analyzation of the command. Since with this command the transfer process is immediately performed upon request, a service ID for the request of the file upload is not returned.

At step S8A-001, a check is performed to determine whether or not a file designated by a file ID is present in the image memory 104. The information processing terminal 114 can employ the functions for acquiring the reception result and the file management to obtain a file ID in advance. If the file ID is effective, program control advances to step S8A-002.

At step S8A-002, the data type of the designated file is examined. If the data type of the designated file is coded data, program control goes to step S8A-003. If the data type is PDL, program control moves to step S8A-004. If the data type is anything other than those, program control goes to step S8A-005.

When the data type of the file designated by the information processing terminal 114 is coded data, at step S8A-003 the image data in the file is employed to generate image data in a required coding system and with a required resolution. Program control then advances to step S8A-005. The details will be explained later.

When the data type of the file designated by the information processing terminal 114 is PDL, at step S8A-004, the PDL data in the file is employed to prepare data of a required type. Program control then advances to step S8A-005. The details will be explained later.

If, at step S8A-005, the data type of a file designated by the information processing terminal 114 is coded data or PDL, data that is prepared at step S8A-003 or at step S8A-004 is transferred via the I/F controller 113 to the information processing terminal 114. If the data type of the designated file is other than those two, the data that is held in the file is transferred, without any change, via the I/F controller 113 to the information processing terminal 114. Program control then advances to step S8A-006. At step S8A-006, as the end condition for the command, a check is performed to determine whether or not there is a request to delete the file that has been transferred. If such a request is present, program control moves to step S8A-007. If there is no such requests, the file upload process is terminated.

At step S8A-007, if a job where the file is referred to is registered in a transmission queue, etc., a check is performed to determine whether or not the job is on standby or is being executed. If there is no job that uses the file as reference, program control moves to step S8A-008. If there is a job that uses the file as a reference, program control moves to step S8A-009.

At step S8A-008, the file is deleted and the file upload process is terminated.

The procedure at step S8A-009 is performed when the file ID is invalid at step S8A-001, or when, at step S8A-007, a job for which the file is used is registered in the communication queue and is in a wait state or being executed. The information processing terminal 114 is notified of the contents of an error via the I/F controller 113. The file upload process is thereafter terminated.

Figure 14:
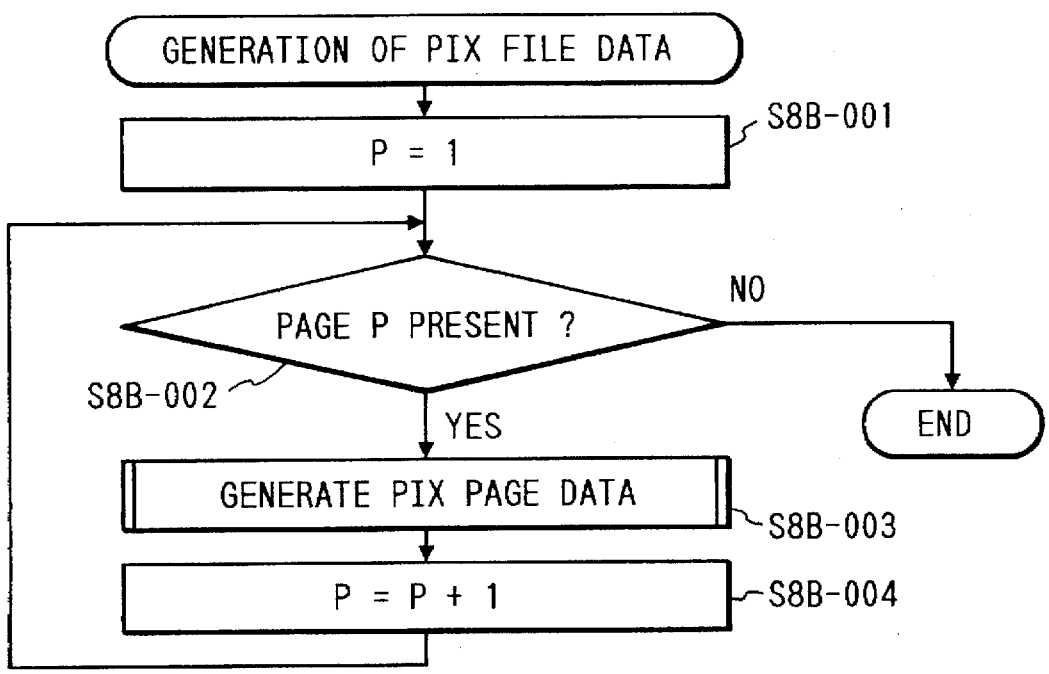
FIG. 14 is a flowchart showing a Pix file data generation process in FIG. 13.

FIG. 14 is a detailed flowchart for the data generation process for a Pix file that is performed at step S8A-003 in FIG. 13.

First, at step S8B-001, a variable P that represents a page number is initialized to 1, and program control advances to step S8B-002.

At step S8B-002, a check is performed to determine whether or not the page P is present in a designated file. It is noted that there is no file present that has no pages. If the page P is present, program control moves to step S8B-003.

At step S8B-003, image data for the designated page is employed to generate image data of which coding system and resolution are required for each page, and program control goes to step S8B-004. The details will be described later.

At step S8B-004, the variable P that represents a page number is set to P+1, and program control returns to step S8B-002.

If, at step S8B-002, the page P is not present in the designated file, the process for generating Pix file data is terminated.

Through the above process, image data of which coding system and resolution which are required for each page, are prepared for each of the pages that constitute a designated file.

Figure 15:
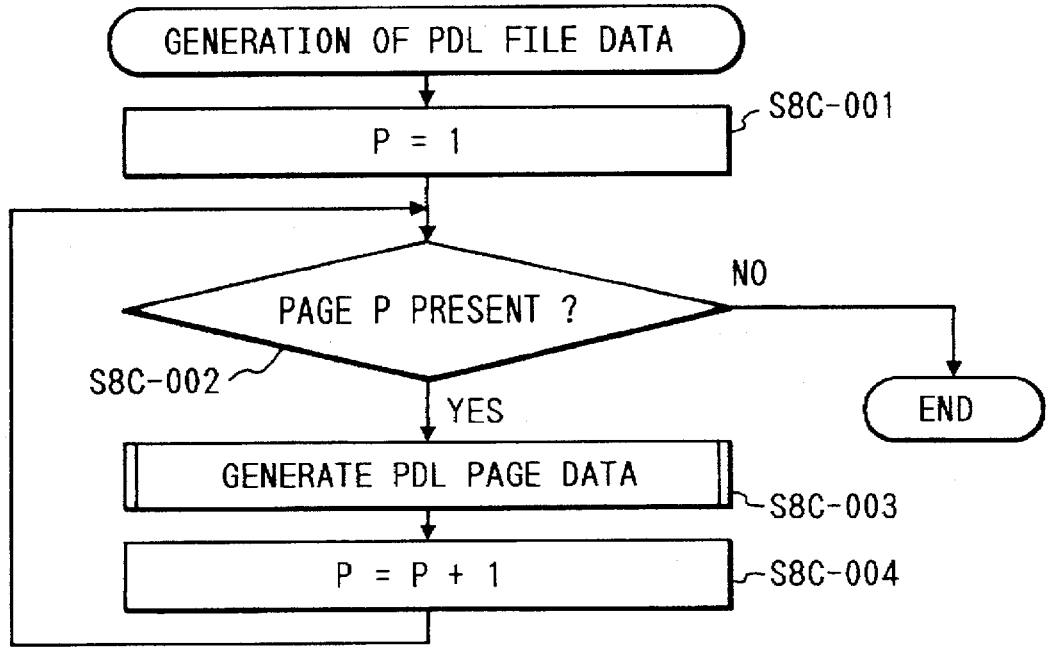
FIG. 15 is a flowchart showing a PDL file data generation process in FIG. 13.

FIG. 15 is a detailed flowchart for the data generation process for a PDL file that is performed at step S8A-004 in FIG. 13.

First, at step S8C-001, variable P that represents a page number is initialized to 1, and program control advances to step S8C-002.

At step S8C-002, a check is performed to determine whether or not the page P is present in a designated file. It is noted that there is no file present that has no pages. If the page P is present, program control moves to step S8C-003.

At step S8C-003, PDL data of the designated page is employed to generate image data of a data type that is required for each page, and program control goes to step S8C-004. The details will be described later.

At step S8C-004, the variable P that represents a page number is set to P+1, and program control returns to step S8C-002.

If, at step S8C-002, the page P is not present in the designated file, the process for generating PDL file data is terminated.

Through the above process, PDL data of a data type that is required for each page is prepared for each of the pages that constitute a designated file.

In the above described file uploading process, coded data and PDL data that are stored in the facsimile apparatus are converted into a requested data type for the file that is managed in the facsimile apparatus, and the converted data are transferred to the information processing terminal 114.

In the above process, data of a type that is requested for each page is produced for all the pages that constitute a selected file. However, when the information process terminal 114 is so designed that a requested data type is in common to all the pages of a file, not for individual pages, the structure of a file upload command that is sent from the information processing terminal 114 can be simplified.

Further, in the above process, data of a requested type are generated for all the pages that constitute a designated file, and the data are transferred via the I/F controller 113 to the information processing terminal 114. However, if the data are transferred to the information processing terminal 114 via the I/F controller 113 while the data of the requested type are being generated, the capacity of a buffer memory in which the data of the requested type are temporarily stored can be reduced, and further, manufacturing costs can be lowered.

According to the above described process, (1) the coding system and the resolution of an image that the facsimile apparatus has received are converted in consonance with a request, and the resultant data can be transferred to an information processing terminal. This is effective for an OCR process that is performed by the information processing terminal.

(2) PDL can be rasterized by a data converter. When this function is employed with the download function or the function in (1), processes having heavy loads, such as rasterization and resolution conversion that is performed while image quality is a consideration, can be distributed from the information processing terminal to the available facsimile apparatus, which is a peripheral device.

(3) Files that have a different data type that is Generated through multi-document communication in G4 facsimile can be transferred individually to the information processing terminal. When this function is used with the reception function, it is possible to transfer data to the information processing terminal, beginning with a document whose data are arranged. during the communication process.

8. Page upload function

The page upload function is the transfer of data (coded data/PDL/character data), which are stored in the image memory 104 of the facsimile apparatus by a file that is managed in the facsimile apparatus, to the information processing terminal 114.

FIG. 16 is a flowchart showing the control process for the page upload function.

In the page upload process, when a page upload is requested by a command that is transmitted from the information processing terminal 114 via the I/F controller 113, the page upload process is performed. It is noted that any contradictions that exists between the command and the parameter level is eliminated in advance during the analyzation of the command. Since with this command the transfer process is immediately performed upon request, a service ID for the request of the page upload is not returned.

At step S9A-001, a check is performed to determine whether or not a file designated by a file ID is present in the image memory 104. The information processing terminal 114 employs the functions for acquisition of the reception result and for file management to obtain a file ID in advance. If the file ID is effective, program control advances to step S9A-002. If the file ID is invalid, program control moves to step S9A-010.

At step S9A-002, the presence of a page that is indicated by a page number is ascertained. The information processing terminal 114 can acquire the total page numbers for each file in advance by obtaining the reception result or by using the file management function. If the page number is valid, program control advances to step S9A-003. If the page number is not invalid, program control moves to step S9A-010.

At step S9A-003, the data type of a designated file is examined. If the data type of the designated file is coded data, program control goes to step S9A-004. If the data type is PDL, program control moves to step S9A-005. If the data type is anything other than those, program control goes to step S9A-010.

When the data type of the file designated by the information processing terminal 114 is coded data, at step S9A-004 the image data on the selected page is employed to generate image data in a required coding system and with a required resolution. Program control then advances to step S9A-006. The details will be explained later.

When the data type of the file designated by the information processing terminal 114 is PDL, at step S9A-005, the PDL data in the file is employed to prepare data of a required type. Program control then advances to step S9A-006. The details will be explained later.

If, at step S9A-006, the Pix data and PDL data that are prepared at step S9A-004 and step S9A-005 are transferred via the I/F controller 113 to the information processing terminal 114. Program control then advances to step S9A-007.

At step S9A-007, as the end condition of the command, a check is performed to determine whether or not there is a request for the deletion of the page that has been transferred. If such a request is present, program control moves to step S9A-008. If there is no such request, the page upload process is terminated.

At step S9A-008, if a Job where the page is referred to is registered in a transmission queue, etc., a check is performed to determine whether or not the job is on standby or is being executed- If there is no job that uses the file as reference, program control moves to step S9A-009. If there is a job that uses the page as a reference, program control moves to step S9A-010.

At step S9A-009, the page is deleted from a file and if, as a result, there are no pages remaining in the file, the file is also deleted. The page upload process is thereafter terminated.

The procedure at step S9A-010 is performed when the file ID or a page number is invalid at step S9A-001 or at step S9A-002, when the file data type at step S9A-003 is neither coded data nor PDL, or when, at step S9A-008, the job that the file is used is registered in the communication queue and is in a wait state or is being executed. The information processing terminal 114 is notified via the I/F controller 113 of the contents of an error. The page upload process is thereafter terminated.

FIG. 17 is a detailed flowchart for the data generation process for a Pix file that is performed at step S8B-003 in FIG. 14 or at step S9A-004 in FIG. 16.

First, at step S9B-001, a check is performed to determine whether or not resolution Rsrc of a designated page is equal to a requested resolution Rdst. If the resolutions are different, procedures at steps S9B-002 and S9B-003 are sequentially performed.

At step S9B-002, the codec processing unit 111 decodes the image data of a designated page, and program control advances to step S9B-003.

At step S9B-003, as the result of the process at step S9B-002, the data that are output by the codec processing unit 111 are transmitted to the resolution conversion unit 110 to generate the data having a resolution of Rdst. Program control then moves to step S9B-004.

At step S9B-004, a check is performed to determine whether or not a requested data type is original data. If the original data are not requested, program control moves to step S9B-005. If the original data are requested, notification is made that the data that are output by the resolution conversion unit 110 can be used without any change. The process for generating Pix page data is thereafter terminated.

At step S9B-005, data that are output from the resolution conversion unit 110 through the process at step S9B-003 are transmitted to the codec processing unit 111 to generate data in a requested coding system Cdst. The process for generating Pix page data is thereafter terminated.

If, at step S9B-001, both resolutions are equal, program control goes to step S9B-006.

At step S9B-006, a check is performed to determine whether or not a coding system Csrc for the designated page is the same as the requested coding system Cdst. If the both coding systems differ, program control advances to step S9B-007.

At step S9B-007, the codec processing unit 111 is so controlled that image data are decoded for the designated page, and program control goes to step S9B-004.

At step S9B-004, the same process as is described above is performed. If the requested data type is not the original data, program control moves to step S9B-005.

At step S9B-005, as in the above process, the data that have been output by the codec processing unit 111 through the procedure at step S9B-007 are again transmitted to the codec processing unit 111 to generate data in a requested coding system Cdst. The process for generating Pix page data is thereafter terminated.

If, at step S9B-006, both coding systems are the same, notification is made that data for the designated page can be used without any change. The process for generating Pix page data is thereafter terminated.

By the above-mentioned processes, the image data for the designated page is employed to generate image data in the requested coding system and with the requested resolution.

FIG. 18 is a detailed flowchart for the data generation process for a PDL page that is performed at step S8C-003 in FIG. 15 or at step S9A-005 in FIG. 16.

First, at step S9C-001, a check is performed to determine whether or not PDL data is required. If the PDL data is not required, that is, coded data or original data is required, program control moves to step S9C-002 and step S9C-003.

At Step S9C-002, the data converter 105 is controlled to analyze PDL data for a designated page and rasterize the data (develop to original image data). Program control is then advances to step S9C-003.

At step S9C-003, the data that is output from the data converter 105 through the procedure at step S9C-002 is transmitted to the resolution conversion unit 110 to generate data having the requested resolution. Program control then moves to step S9C-004.

At step S9C-004, a check is performed to determine whether the requested data type is the original data. If the requested data are not the original data, program control advances to step S9C-005. If the requested data are the original data, notification is made that the data that are output by the resolution convert unit 110 can be used without any change. Then, the process for generating PDL page data is terminated.

At step S9C-005, the data that is output by the resolution convert unit 110 through the procedure at step S9C-003 is transmitted to the codec processing unit 111 to generate data in a requested coding system. The process for generating the PDL page data is thereafter terminated.

If, at step S9C-001, PDL data are requested, notification is made that the data for a designated page can be employed without any change. The process for generating PDL page data is thereafter terminated.

Through the above described process, the PDL data of a designated page is employed to prepare data of a requested type.

As described above, in the page upload process, the facsimile apparatus of the embodiment converts, into a required data type, coded data or PDL data that are stored in the facsimile apparatus for each page of a file that is managed by the facsimile apparatus.

By performing the above described processes:

(1) For an image on an arbitrary page that is received by the facsimile apparatus, the coding system and resolution can be converted in consonance with a request, and the results can be transmitted to an information processing terminal. This is very effective for the selection of received data; for example, the data for only a first page having the lowest resolution is transferred to the information processing terminal, and, as needed, is converted into a data type that the information processing terminal easily handles, and the resultant data is retransmitted. Compared with when all the data are transferred in the original coding system and with the original resolution, the Mount of data transferred between the information processing terminal and the facsimile apparatus is reduced.

(2) The information processing terminal can automatically delete only a page whose data has been transferred. When this function is employed with the reception function, even if data to be received is so large that it exceeds the image memory capacity of the facsimile apparatus, the receipt of such data is possible by also using the memory of the information processing terminal.

9. Scan data transfer function

The scan data transfer function is the transfer to the information processing terminal 114 of image data that are read by the read controller 1061 of the facsimile apparatus. With this function, the read controller 106 of the facsimile apparatus can serve as a scanner that is a peripheral and is connected to the information processing terminal 114 via an external interface.

FIG. 19 is a flowchart showing the control process for the scan data transfer.

The scan data transfer process is initiated when a scan data transfer request command is received from the information processing terminal 114, which is connected by the external interface.

At step S10A-1, a command received from the information processing terminal 114 is analyzed to determine whether or not there is an abnormality, such as an parameter error, in the command. When no abnormality is found, program control advances to step S10A-2. When an abnormality is found, program control moves to step S10A-9. The scan data transfer request command includes parameters that designate read resolution, read density, an image processing method, a read document sheet size, a transfer image size, a transfer data coding system, a transfer data size, etc.

At step S10A-2, a check is performed to determine whether or not data that are not yet transferred are present. When there are data that have not yet been transferred, program control moves to step S10A-8. When there are no data remaining to be transferred, program control advances to step S10A-3.

At step S10A-3, a check is performed to determine whether or not the read controller 106 is executing another process, whether or not an abnormality has occurred in the scanner, and whether or not a document sheet is set. When the scanning is enabled, program control moves to step S10A-4. When the scanning is disabled, program control goes to step S10A-9.

At step S10A-4, a document sheet is scanned by the image processing method at the read density that are designated by the parameters. Original image data are produced by scanning the document sheet and are immediately transferred to the resolution conversion unit 110. This process is performed by the read controller 106.

At step S10A-5, a check is performed to determine whether or not the scanner reading process has been terminated normally. When the process is terminated normally, program control advances to step S10A-6. When the process is terminated abnormally, program control moves to step S10A-9.

At step S10A-6, the original image data are converted to data that are in consonance with the resolution and the image size that are designated by the parameters. The converted data are immediately transferred to the codec processing unit 111. This process is performed by the resolution conversion unit 110.

At step S10A-7, the converted data is coded in a coding system that is designated by the parameter. The coded data are immediately transferred to a transfer buffer memory in the I/F controller 113. This process is performed by the codec processing unit 111.

At step S10A-8, the coded data are transferred to the information processing terminal 114 in a group that is the equivalent in size of the transfer data size that is designated by the parameter.

At step S10A-9, the information processing terminal 114 is notified that an error has occurred.

According to the above described process, the read controller 106 of the facsimile apparatus can be employed as a peripheral by the information processing terminal 114. Since the resolution conversion unit 110 and the codec processing unit 111 in the facsimile apparatus can be used, scan data can be transferred that has various resolutions, image sizes, and coding systems.

10. Scan data storing function

The scan data storing function is the reading of a document by the read controller 106 upon a request from the information processing terminal 114 or from a user, and the storing of the data that is read in the image memory 104.

Data that are stored by this function can be transmitted or can be uploaded to the information processing terminal 114 in consonance with the request from the information processing terminal 114.

This function is accomplished by performing the multitasks that includes a scan data storing process that is shown in the flowchart in FIG. 20 and a scan data storing interface process that is shown in the flowchart in FIG. 21.

FIG. 20 is a flow chart showing the scan data storing process that is begun when a scan data storing request is registered in a read control queue. The scan data storing process request command includes parameters that designate read resolution, read density, an image processing method, a read document sheet size, a stored image size, and a magnification power for storage. Further, as the end condition that accompanies the command, when the scanner of the read controller 106 is of a sheet reading type that has an automatic paper feeder, the following settings are possible:

(1) All of the document that is placed on a document support plate is read and is stored as a single file.

(2) The reading setup for each page is changed, a command is issued for each document sheet, and all papers are employed as a single file.

(3) Only the first page of a document placed on the document support plate is stored as a single file.

When the scanner of the read controller 106 is a book reading scanner, the following settings are possible:

(1) A single document sheet that is placed on the document support plate is employed as one file.

(2) The command is issued for each page, a different document sheet is positioned for each scanning, and a switch parameter that indicates that the page is the final page is added to a command.

When such a situation as the memory being full has occurred during the execution of the read process and that process is therefore temporarily halted, the following conditions can be established by the abnormal processing condition:

(1) data that have been read are abandoned;

(2) data that have been read are stored with no change;

(3) data that are insufficient for one page are abandoned;

(4) storing is restarted as memory becomes available when it is ensured that some memory will become available, after a specific time elapses, because the data in the memory is being transmitted or the received document is being output.

At step S11A-1, a check is performed to determine whether or not there is an abnormality in a received command. When an abnormality such as a parameter error is found, program control moves to step S11A-10. When there is no abnormality, program control advances to step S11A-2.

At step S11A-2, the state of the scanner is examined. When the reading of a document is possible, program control advances to step S11A-3. When the reading is not acceptable, program control moves to step S11A-10. When the scanner is not used by any other service and has no abnormality, and the document sheet is set at the reading position, document reading is possible. A variable indicating the service state is defined as [reading in progress]. When the page that is read is the first page, the file ID is obtained to associate it with the service ID.

At step S11A-3, the read controller 106 employs parameters (read density, read resolution, an image processing method, and a read document size) that are designated by the scan data storing request, scans a document sheet using a scanner, and converts the data into digital data of an original image data type.

At step S11A-4, a check is performed to determine whether or not the process at step S11A-3 has been terminated normally. When the process has been terminated normally, program control moves to step S11A-5. When an abnormality, such as the jamming a document sheet has occurred, program control goes to step S11A-10. For the abnormal end process, the contents of an error are stored in the service state variable.

At step S11A-5, the resolution conversion unit 110 employs parameters (stored image size, storing magnification, etc.) that are designated by the scan data storing request command, and performs resolution conversion (enlargement/reduction process) of the original image data, which are generated at step S11A-4.

At step S11A-6, the codec processing unit 111 encodes data that are prepared at step S11A-5 to obtain facsimile code data.

At step S11A-7, the facsimile code data prepared at step S11A-6 are stored in the image memory 104.

At step S11A-8, a check is performed to determine whether or not the storing process has been terminated normally. When the process has been terminated normally, page information is prepared to correlate it with file information. When file information has not yet been prepared, the file information is also generated. Program control then advances to step S11A-9. When the process is terminated as a result of an abnormality, such as the memory being full, program control moves to step S11A-10.

At step S11A-9, an interface function (FIG. 21) is notified that the process has been terminated normally, and the count of the pages for which service state variables are stored is incremented by one. When a succeeding document sheet is not positioned for reading, the service state variable is set to [storage end].

At step S11A-10, a process that is in consonance with the abnormal process condition is performed, and the interface function (FIG. 21) is notified that the scan data storing process has been terminated by an error. The service state variable is set to [error end].

When the information processing terminal 114 uses a service ID to request a notice concerning the progress of a service, the service state variable is employed by the facsimile apparatus to notify the information processing terminal of that state. The service ID, the service progress, and the number of stored pages are stored in the variable. For an error end, error types are also stored in correlation with the variable.

FIG. 21 is a flowchart showing the interface process that is included in the scan data storing process.

At step S11B-1, a check is performed to determine whether or not a scan data storage request command has been received from the information processing terminal 114. If that command has been received, program control advances to step S11B-2. If not, program control moves to step S11B-4.

At step S11B-2, the received command is registered in a read control queue.

At step S11B-3, a service ID is obtained to notify to the information processing terminal 114 that the command has been received, and a response indicating a command entry is transmitted.

At step S11B-4, a check is performed to determine whether or not notification has been made that the storing of the scanner data has ended. When such a notice is received, program control advances to step S11B-5. If no notice is received, program control goes to step S11B-6.

At step S11B-5, a response indicating that scanner data storing has been terminated is transmitted to the information processing terminal 114. At this time, data that includes the final results, a file ID, and error information are sent if the process is terminated due to an abnormality.

At step S11B-6, a check is performed to determine whether or not an end result request command has been received, for which a service ID is designated by the information processing terminal 114, requesting the progress for the scan data storing process. When the command has been received, program control advances to step S11B-7. If no command has been received, program control returns to step S11B-1.

At step S11B-7, the service state variable is transmitted to the information processing terminal 114.

According to the above process, since the scanner function of the facsimile apparatus is employed with the upload function, the scanner function can be used as a scanner that serves as a peripheral of the information processing terminal. Since parameters are designated for uploading, the uploading is enabled for a data type, such as a facsimile coding system or the original image data system, that is convenient and consonant with the capabilities of the information processing terminal. Therefore, the load placed on the information processing terminal can be less than that placed on a general scanner.

11. Reception function

The reception function involves the changing of the mode of the facsimile apparatus to a receive mode that is designated by the information processing terminal, and the reception in the receive mode when data is sent to the facsimile apparatus.

FIG. 22 is a flowchart showing a process (reception function), such as the receipt of a receiving mode setting instruction, that is performed via the information processing terminal 114, the I/F controller 113, etc. FIGS. 23A and 23B are flowcharts showing a reception process (reception control) that the facsimile apparatus (image processing apparatus) performs in response to a command from the information processing terminal 114.

The receive mode of the facsimile apparatus is set by a command from the information processing terminal 114. The receive modes are "memory receive," "memory receive+printout," and "normal receive."

In the "memory receive" mode, a received document is stored in the image memory 104 of the facsimile apparatus. The information processing terminal 114 is notified of the file ID of the document, the service ID for identifying the reception process, and information, such as UUI (User User information), that is transmitted by a well known INS64 service. In this embodiment, the above described information is referred to simply as "received file ID" information. Since a plurality of documents are sometimes received in one communication transmission in the reception process according to G4 protocol, the file ID that the information processing terminal 114 is to be notified of is different for each document that is received. Also, each time the received file ID notice is required from the information processing terminal 114, an appropriate response is transmitted.

In the "memory receive+printout" mode, which is performed in parallel with the "memory receive" process, the received document is printed using the record controller 112. Here, the "memory receive+printout" mode and the "memory receive" mode are especially defined as a "remote receive" mode.

In the "normal receive" mode, the operation of the facsimile apparatus is returned to normal reception.

The facsimile apparatus performs the control process as is shown in FIG. 22 to accomplish a multi-unit operation with the information processing terminal 114. More specifically, whether or not the receive mode is designated by the information processing terminal 114 is constantly monitored (S12A-1). Then, constant monitoring is performed to determine whether or not a notice for a received file ID that is to be transmitted to the information processing terminal 114 is present in the facsimile apparatus (S12A-4). Further constant monitoring is performed to determine whether or not a notice for the received file ID is urgently requested by the information processing terminal 114 (S12A-6). When the receive mode is designated by the information processing terminal 114 (S12A-1), the receive mode of the facsimile apparatus is set to a requested receive mode (S12A-2). A response indicating that the request has been normally received is transmitted (S12A-3). The changing of the mode of the facsimile apparatus to a new receive mode is effective in the following reception process except for a reception process that is in the process of being performed. If a notification of a received file ID that is to be transmitted to the information processing terminal 114 has occurred in the facsimile apparatus (S12A-4), a message for the received file ID is forwarded to the information processing terminal 114 in consonance with the notice (S12A-5). When a notice of a received file ID is required by the information processing terminal 114 (S12A-6), a message for the received file ID is transmitted only when the notice of the received file ID that is to be forwarded to the information processing terminal 114 is present in the facsimile apparatus (S12A-7).

The reception processes for the individual receive modes will now be described while referring to the flowcharts in FIGS. 23A and 23B.

When the facsimile apparatus receives a call (S12B-1), it confirms whether or not the call is in the "remote receive" mode (the "normal receive" mode) (S12B-2). If the call is in the remote receive mode, a check is performed to determine whether or not that mode is the "memory receive" mode or the "memory receive+printout" mode (S12B-3).

If the mode is the "memory receive" mode, first, the information processing terminal 114 is notified of the file ID for a document that is to be received and stored (S12B-12). After the notice is sent, the state of the facsimile apparatus is shifted to the upload function usable state so that the information processing terminal 114 can upload the received document using a page upload function. The received document is fetched by the communication controller 108, and is decoded by the codec processing unit 111 (S12B-13). The decoded data is again encoded by the codec processing unit 111 to store that data in the image memory data 104, and finally the resultant data is written in the image memory 104 (S12B-14). Since the image processing is performed by the determined unit, the process is repeated until the end of a page (S12B-15) or the end of one document is reached (S12B-16).

This flowchart is representative of a case where the received document is image data that is encoded by a well known MMR or MH. However, when it is found by referring to the communication procedures that the received document is, for example, character data such as ASCII data, PDL (printer description language), original data, or a control document for G4 facsimile communication, such data is stored in the image memory 104 without passing through the codec processing unit 111. Further, in some cases, in consonance with the setting of the facsimile apparatus and the setting by the information processing terminal 114, CG development is performed on character data by the data converter 115, or PDL data is converted into image data by the data converter 115, and the resultant data can also be stored in the image memory 104 via the codec processing unit 111.

When a different document is received as a single communication, the processes at S12B-12 and the following steps are performed. When the communication is terminated (S12B-17), information reflecting the communication result in the receive mode is written in the RAM 103 in which communication management information is stored (S12B-11).

In the "memory receive+printout" mode, as well as in the "memory receive" mode, first, the information processing terminal 114 is notified of a file ID for a document that is to be received (S12B-4). The state of the facsimile apparatus is shifted to the page upload function usable state. The received data is decoded (S12B-5), and the process (S12B-7) that corresponds to that in the "memory receive" mode is performed on that data. Then, the data is transmitted to the record controller 112 via the resolution convert unit 110 that converts it to obtain a resolution that is required for a printer (S12B-6). The process hereafter is the same as that in the "memory receive" mode. A printing process is not performed when data other than image data, for example, ASCII data, and PDL data, is received. Or, in consonance with the setting of the facsimile apparatus or an instruction of the information processing terminal 114, the data converter 115 can perform CG development of ASCII data, or can convert PDL data into image data for printing.

In the "normal receive" mode, the facsimile apparatus performs its normal reception process. More specifically, a received document is fetched by the communication controller 108, and is decoded by the codec processing unit 111 (S12B-18). Then, the resolution of the data is converted by the resolution convert unit 110 to correspond to that required for the printer, and is transmitted to the record controller 112 (S12B-19). This process is repeated until the end of a page (S12B-20) and the end of one document is reached (S12B-21). When the communication is terminated (S12B-22), the reception result information is written in the RAM 103 where communication management information is stored (S12B-11).

Through the above described process, the facsimile apparatus performs the reception function.

According to the reception function, since the operation can be changed to the reception process that is consonant with an instruction from the information processing terminal 114, the function that serves as the facsimile apparatus can be upgraded. For example, since, in some receive modes, the information processing terminal 114 is notified of the file ID that identifies a received document, the information processing terminal 114 employs the page upload function and the file upload function to enable the transfer of the received document to the information processing terminal 114 during or following its reception. Further, since the information processing terminal 114 is notified of the service ID for identifying the reception process, the information processing terminal 114 employs the communication management function to acquire the communication result information concerning the reception process.

12. Polling function

The polling function involves issuance of a call for polling by the facsimile apparatus in response to an instruction from the information processing terminal 114, and performance of a reception process, in polling-receive, by the facsimile apparatus in a receive mode instructed by the information processing terminal 114.

FIG. 24 is a flowchart showing a process (a polling function), such as the receipt of a request for issuance of a call for polling (a polling request), that is performed via the information processing terminal 114, the I/F controller 113, etc. FIGS. 25A and 25B are flowcharts showing a process (polling control) that the facsimile apparatus (image processing apparatus) performs in response to a request (command) from the information processing terminal 114.

The receive mode of the facsimile apparatus is set by a polling request command from the information processing terminal 114. The receive modes are "memory receive" and "memory receive+printout."

In the "memory receive" mode, a polling document that is received is stored in the image memory 104 of the facsimile apparatus. The information processing terminal 114 is notified of the file ID for the document, the service ID for identifying the reception process, and information such as UUI (User User information) that is transmitted by a well known INS64 service. In this embodiment, the above described information is referred to Simply as "receive file ID" information. Since a plurality of documents are sometimes received as a single communication in the reception process according to G4 protocol, the file ID that the information processing terminal 114 is to be notified of is different for each document that is received. Also, each time the received file ID notice is required by the information processing terminal 114, an appropriate response is transmitted.

In the "memory receive+printout" mode, which is performed in parallel with the "memory receive" mode, the received document is printed using the record controller 112.

The facsimile apparatus performs the control process as is shown in FIG. 24 to accomplish multi-unit operation with the information processing terminal 114. More specifically, whether or not a polling call instruction is received by the information processing terminal 114 is constantly monitored (S13A-1). Then, constant monitoring is performed to determine whether or not a notice for a polling receive file ID or for an error that is to be transmitted to the information processing terminal 114 is present in the facsimile apparatus (S13A-4). Further constant monitoring is performed to determine whether or not a notice of the polling receive file ID or of error information is positively requested by the information processing terminal 114 (S13A-6). When a polling call instruction is transmitted from the information processing terminal 114 (S13A-1), the polling call instruction is entered in the polling control queue of the facsimile apparatus (S13A-2). Then, a response is transmitted as notification that the polling instruction has been received normally (S13A-3). The response includes a service ID for identifying the polling service. If a notice for a polling receive file ID or a notice for an error, which is to be transmitted to the information processing terminal 114, is present in the facsimile apparatus (S13A-4), a message that corresponds to the contents of the notice is forwarded to the information processing terminal 114 (S13A-5). When a notice for a polling receive file ID or notice error information is required by the information processing terminal 114 (S13A-6), only when the notice for the receive file ID or the notice for an error, which is to be forwarded to the information processing terminal 114, is present in the facsimile apparatus (S13A-7) is a message that corresponds to the contents transmitted.

The procedures for the polling process will now be described while referring to the flowchart in FIGS. 25A and 25B.

First, if the facsimile apparatus falls into a state where a resource that is necessary for polling call/polling-receive can be acquired, one polling call request is extracted from the polling control queue, and a series for the process in FIGS. 25A and 25B is begun. A polling call request includes various information that is required for the polling. The included information are, for example, a dialing number for a partner, a communication protocol, an initial communication speed, a well known sub-address for G4 facsimile communication, a calling time, a polling ID that is used to reply to a query made by a partner station when polling-receive, an SEP (selective polling) frame and a PWD (password) frame, which are new frames for G3 communication, UUI (User User information) in INS64, and the receive modes as described previously. When the polling time is designated, the polling call is made for a selected destination at that time. If such a time is not designated, the polling call is performed immediately for a selected destination (S13B-1). When the call is connected, the polling ID is referred by the partner station (S13B-2). If the result of the reference is NG, the partner station cuts off the contact. A suspension process is then performed and a host is notified of it (S13B-18). Further, this is written as communication management information in an area for communication management information in the RAM 103 (S13B-11). When the result of the reference is OK, the transmission of a document from the partner station is waited for. Upon the receipt of the document, the reception process is performed in the receive mode (S13B-3).

More specifically, if the mode is the "memory receive" mode, first, the information processing terminal 114 is notified of the file ID for the identification of a document that is to be stored during the polling reception (S13B-12). After the notification is made, the state of the facsimile apparatus is shifted to the upload function usable state so that the information processing terminal 114 can upload the received document using a page upload function. The received document is fetched by the communication controller 108, and is decoded by the codec processing unit 111 (S13B-13). The decoded data is again encoded by the codec processing unit 111 for the storage of that data in the image memory data 104, and finally the resultant data is written in the image memory 104 (S13B-14). Since the image processing is performed by the determined unit, the process is repeated until the end of a page (S13B-15) or the end of one document is reached (S13B-16).

This flowchart represents a case where the received document is image data that is encoded by a well known MMR or MH. However, when it is found by referring to the communication procedures that the received document is, for example, character data such as ASCII data, PDL (printer description language), original data, or is a control document for G4 communication, such data is stored in the image memory 104, without passing through the codec processing unit 111. Further, in some cases, in consonance with the setting of the facsimile apparatus and the setting by the information processing terminal 114, CG development is performed on character data by the data converter 115, or PDL data is converted into image data by the data converter 115. The resultant data can also be stored via the codec processing unit 111 in the image memory 104.

When a different document is received as a single communication, the processes at S13B-12 and the following steps are performed. When the communication is terminated (S13B-17), information concerning the communication result in the receive mode is written in the RAM 103 in which communication management information is stored (S13B-11).

In the "memory receive+printout" mode, as well as in the "memory receive" mode, first, the information processing terminal 114 is notified of the file ID for a document that is to be received by the polling (S13B-4). The state of the facsimile apparatus is shifted to the page upload function usable state. The received data is decoded (S13B-5), and the process (S13B-7) that is the same as that in the "memory receive" mode is performed on that data. Then, the data is transmitted to the record controller 112 via the resolution convert unit 110 that converts the resolution to that required for to a printer (S13B-6). The process hereafter is the same as that in the "memory receive" mode. A printing process is not performed when data other than image data, for example, ASCII data, and PDL data, are received. Or, in consonance with the setting of the facsimile apparatus or an instruction of the information processing terminal 114, the data converter 115 can perform CG development of ASCII data, or convert PDL data into image data for the printing of the data.

Through the above described process, the facsimile apparatus performs the reception function.

According to the polling function, since the operation can be changed to the polling reception process that is consonant with an instruction from the information processing terminal, the function that serves as the facsimile apparatus can be upgraded. For example, it is possible in the remote mode to send a polling call request, which employs a destination list that is managed by the information processing terminal. Since the information processing terminal 114 is notified of a file ID that is an identifier for a received document, the information processing terminal 114 employs the page upload function and the file upload function, so that the received document can be transferred to the information processing terminal during or after the reception. Further, since the information processing terminal 114 is notified of the service ID for identifying the reception process, the information processing terminal 114 employs the communication management function to acquire the communication result information concerning the reception process.

13. Communication management function

The communication management function, upon a request by the information processing terminal 114, provides for the notification of the information processing terminal 114 of the communication result information that is managed in the image processing apparatus. There are roughly two communication methods: one is a notification method for a managed list of identifiers (service IDs) that indicate individual communication results, and the other is a notification method, which is instructed by the information processing terminal 114, for the communication result that corresponds to an individual identifier (service ID).

One embodiment of the communication management function of the facsimile apparatus will now be described. First, a form for managing communication result information in the facsimile apparatus will be explained while referring to FIG. 26, and then the notification procedures for communication result information will be explained while referring to the flowchart in FIG. 27.

The facsimile apparatus manages communication result information having the structure that is shown in FIG. 26. Service IDs for identifying transmission and reception services are provided in the facsimile apparatus. When a transmission instruction is received from the information processing terminal 114, the information processing terminal 114 is notified of the service ID that indicates the transmission service. The facsimile apparatus manages result information for each service ID. That is, for each service ID there is a result information data structure such as is shown in FIG. 26 (hereafter, the data structure for each service ID is referred to simply as a communication control table). It is assumed that the maximum value in the communication control table that the facsimile apparatus can manage is 40. When the communication result information value exceeds the maximum value, a method is employed that overwrites with new information the oldest information that is entered in the communication control table. Further in a single communication control table is stored a communication mode name (such as normal transmission, confidential transmission, relay transmission), communication start time, communication end time, line type (G4 or G3), partner's phone number, partner's sub-address, partner's TID (terminal name), partner's abbreviated name, the number of pages, a receive BOX number (a confidential BOX number for confidential reception, etc.), charge data, communication results, a file ID (identifier for a file to be transmitted or for a received file), and a communication complete flag. Information concerning these items for each file are separately managed by the file ID. When a plurality of files are received in a single communication, the remaining file information can be acquired by examining the file information that corresponds to the file ID. The communication complete flag is employed to indicate whether or not the information processing terminal 114 was notified in the past of a specific result. If notification of the result was made even once in the past, the flag is set to 1. If no notification has ever been made, the flag is set to 0. The communication result information is stored in the RAM 103.

The notification procedures for communication management information will now be described while referring to FIG. 27. A command for acquiring communication result information is transmitted from the information processing terminal 114 (14B-1). When this command is received, a process for this command is immediately performed without performing the queuing control that requests the command.

Then, a check is performed to determine whether or not this command is for "the acquisition of the result information for a designated service ID" or for "a request for a service ID" (14B-2). If the command is for "the acquisition of result information for a designated service ID", the communication result information concerning the designated service ID is searched for in the RAM 103 (14B-3). The information is then transmitted to the information processing terminal 114 (14B-4), and the communication complete flap for the service ID in the communication control table is set to 1 (14B-5). When, at 14B-2, the command is for "a request for a service ID", a check is performed to determine whether or not a rewind is required (14B-6). The information that is contained in the notification to the information processing terminal 114 when there is "a request for a service ID" is essentially the result information for a service ID for which no notification has yet been made (the communication complete flag is to 0). The rewind request is for clearing all communication complete flags in the communication management table, and for the notification of a head service ID. When the rewind request is present, according to the decision at 14B-6, all the communication complete flags in the communication control table are cleared (14B-7), and the head service ID is forwarded to the information processing terminal 114 (14B-8). When there is no rewind request, for the communication complete flags that are set to 0, a head service ID is transmitted to the information processing terminal 114 (14B-9). When a command, for the acquisition of communication result information, that does not request a rewind is successively received, a service ID that is managed next to a service ID for which a notification was made immediately before is sent out.

Through the above described procedures, the facsimile apparatus notifies the information processing terminal 114 of the communication result information.

According to the above described communication management function, by providing means that can notify the information processing terminal 114 of the communication result information, the function of the facsimile apparatus can be upgraded. For example, the information processing terminal can acquire, any time, result information concerning a service, such as a transmission that is performed in consonance with an instruction from the information processing terminal. Even when recording paper in the facsimile apparatus is exhausted, the information processing terminal can confirm communication result information, so that the reliability of the system is increased.

14. File management function

The file management function involves the provision of a file ID for image data that is stored in the image memory 104 and the management of the data as a file, and the notification, which is requested by the information processing terminal 114, of information concerning a file or the deletion of a file.

FIG. 28 is a schematic diagram for explaining the file management in this embodiment.

In a file management area, each file of image data that is stored in the image memory 104 is stored in RAM 103 in correlation with the stored positions of a file ID and file inherent information, such as file types (scanner stored document, received document, downloaded document, etc.), file attributes (normal file attributes, confidential receive file attributes, polling wait file attributes, etc.), data formats (MH, MR, MMR, JBIG, original image data, ASCII, PDL, etc.), a fixed number of pages, a box number (a number defining a box when a file attribute is for a confidential receive file or a polling wait file), an on-use flag (which indicates whether or not a print request, a transmission request, etc., has been received), and page management data.

The file inherent data are linked by a next pointer (nextptr). An end symbol of, for example, "0" is provided for the last data to terminate the series of data.

A head file pointer is a variable that is provided in the RAM 103, and an address at which the head file data is stored is also held. When no file is managed, an end symbol such as 0 is stored. An ID list notice pointer is also a variable that is provided in the RAM 103. As well as the head file pointer, an address is stored indicating the location for file management data where file information for which a notification is to be made next is stored. When there is no data for which notification is to be made, an end symbol such as 0 is stored. This variable is employed when notification of the file ID list is made in response to a file ID list acquisition request command, which will be described later.

In the page management data area, data for each page of a file is managed. The management data is stored in the RAM 103 in correlation with a page number, resolution, an image size (A4, B4, etc.), and a data storage address and the data size of the image memory 104.

The above described data are prepared at the same time as image data are stored in the image memory; for example, during the reception process, the download process, or the scan data storage process.

The process that is performed when a file management command is received from the information processing terminal will be explained while referring to FIG. 29. The process in this flowchart is begun when the file management command is received from the information processing terminal 114. The file management commands are a file data acquisition command for requesting information of a specific file, a page data acquisition command for requesting information for a specific page of a specific file, and a file ID list request command for requesting a file ID list.

At step S15B-1, a received command is analyzed. When a command is for "file data acquisition", program control moves to step S15B-2. When it is for "page data acquisition", program control goes to step S15B-6. When the command is for a "file ID list", program control moves to step S15B-10. When an abnormality, such as a parameter error, is found in a command, program control goes to step S15B-14.

The procedure at step S15B-2 is performed when the command is for "file data acquisition". As for the file data acquisition command, a file ID for a desired file, for which data is required, is received as a parameter. In this process, with the file ID, the file management data area is searched beginning with the head file.

At step S15B-3, a check is performed to determine whether or not the desired file was found as a result of the search at step S15B-2. When the file was found, program control advances to step S15B-4. When the file was not found, program control moves to step S15B-14.

At step S15B-14, the targeted file data are copied into a transfer buffer memory of the I/F controller 113.

At step S15B-5, the copied file data are transferred to the information processing terminal 114.

The process at step S15B-6 is performed when the received command is for "page data acquisition". As for the page data acquisition command, a file ID and a page number of a desired page, for which data is required, are received as parameters. In this process, the targeted page is searched for in the page management information by referring to the file ID and the page number.

If, at step S15B-7, the targeted page is found through the search at step S15B-6, program control advances to step S15B-8. When the targeted page is not found, program control goes to step S15B-14.

At step S15B-8, the targeted page data are copied into the transfer buffer of the I/F controller 113.

At step S15B-9, the copied page data are transferred to the information processing terminal 114.

The process at step S15B-10 is performed when the command is for a "file ID list". As for the file ID list request command, a parameter switch that is located at the head or at a continuation position is received, and only one file ID is returned. In this process, a check is performed to determine whether or not the parameter switch is located at the head. If the parameter switch is located at the head, program control goes to step S15B-11. When the parameter switch is located for continuation, program control goes to step S15B-12.

At step S15B-11, the head file data address, which is stored at the position pointed at by the head file pointer, is stored in the location pointed at by ID list pointer in FIG. 28.

At step S15B-12, the file ID of the file data that is pointed at by the ID list pointer in FIG. 28 is copied to the transfer buffer of the I/F controller 113. An address for the next file data is stored at a location pointed at by the ID list pointer.

At step S15B-13, the copied file ID is transferred to the information processing terminal 114.

At step S15B-14, to the information processing terminal 114 is notified of an error.

A process for file deletion will now be explained while referring to FIG. 30. In the flowchart for explaining the file deletion process in FIG. 30, this process is initiated when a file deletion request command is received from the information processing terminal 114. The file deletion request command includes as a parameter a file ID for a file that is to be deleted.

At step S15C-1, a received command is analyzed and a check is performed to determine whether or not there is an abnormality such as a parameter error. If there is no abnormality, program control moves to step S15C-2. If an abnormality is found, program control goes to step S15C-7.

At step S15C-2, a target file that is designated by the parameter is searched for.

When, at step S15C-3, the file is found through the search, program control advances to step S15C-4. If the file is not found, program control goes to step S15C-7.

At step S15C-4, a check is performed to determine whether or not the file that was found is being used. When the file is being used, program control goes to step S15C-7. When the file is not used, program control advances to step S15C-5. The performance of the process at step S15C-4 can prevent the deletion of a file that is to be transmitted.

At step S15C-5, real data, page data, and file data of the targeted file are deleted. First, the real data area in the image memory 104 is opened to release the page data. This process is performed for all the pages of the target file, and the file data are opened. When the head file pointer points to the deleted file, the next file pointer is copied to the head file pointer. When the ID list pointer points to the deleted file, the next pointer is also copied.

At step S15C-6, the information processing terminal 114 is notified of the termination of the file deletion process.

At step S15C-7, the information processing terminal 114 is notified of the occurrence of an error.

According to the above described file management function, the information processing terminal 114 can acquire the file data in the image memory 104 and delete a file from the memory 104.

15. System memory management function

The system memory management function is used to refer to or register various data that are managed in the RAM 103 of the facsimile apparatus. Such data include dial data that are used by the facsimile apparatus for transmission, user data such as user's (local) phone number and user's (local) abbreviated name, and service data such as a signal transmission level and a control parameter for communication protocol.

Figure 31:
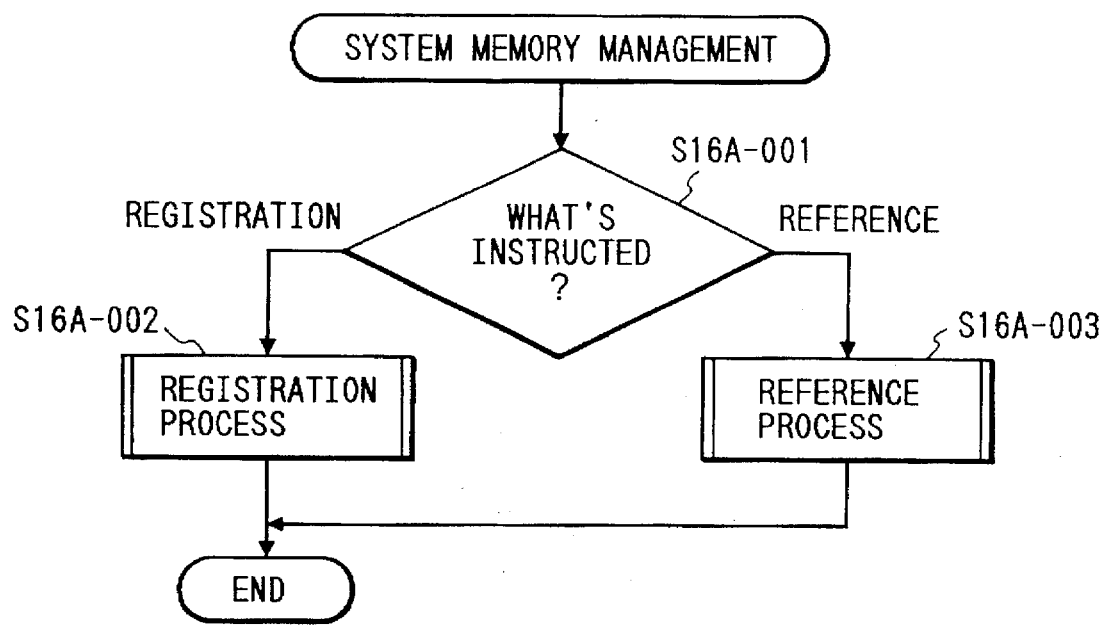
FIG. 31 is a flowchart showing the control process performed by the CPU 101 for a system memory management function.

FIG. 31 is a flowchart for the control process of the system memory management.

In this system memory management function, when the file upload is requested by a command that is sent via the I/F controller 113 from the information processing terminal 114, the file upload process is performed. The contradictions that exist between a command and a parameter level is eliminated in advance during the analyzation of the command.

At step S16A-001, a check is performed to determine whether or not the command of the information processing terminal 114 is a registration request for adding and altering various data, or a reference request for referring to various data. When the command is a registration request, program control advances to step S16A-002. When the command is a reference request, program control goes to step S16A-003.

At step S16A-002, in response to the request, a registration process is performed, such as addition and alteration of dial data, user data, or service data. The system memory management process is thereafter terminated. The detailed process will be described later.

At step S16A-003, in response to the request, a reference process is performed to transfer part of, or all of, dial data, user data, or service data via the I/F controller 113 to the information processing terminal 114. The system memory management process is thereafter terminated. The detailed process will be explained later.

Figure 32:
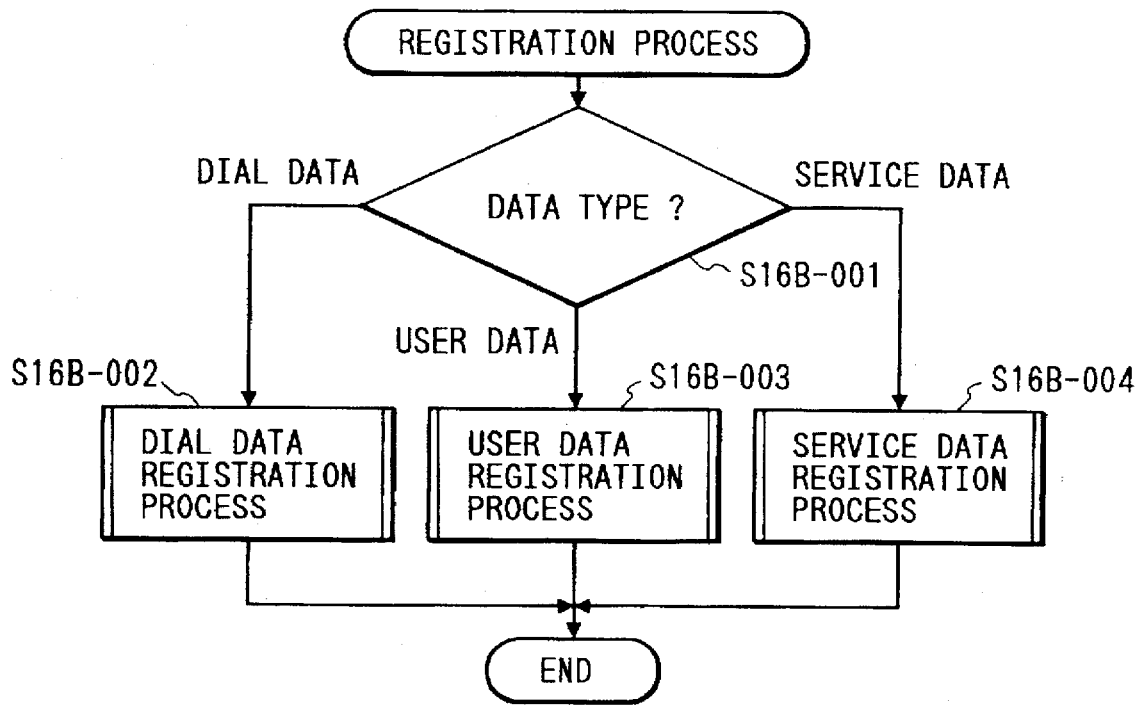
FIG. 32 is a flowchart showing the registration process in FIG. 31.

FIG. 32 is a detailed flowchart for a registration process that is performed at step S16A-002 in FIG. 31.

At step S16B-001, a type of data for which a registration process, such as addition and alteration, is performed is ascertained. When the data type is dial data, program control advances to step S16B-002. When the data type is user data, program control moves to step S16B-003. When the data type is service data, program control moves to step S16B-004.

At step S16B-002, the addition and alteration of dial data that are used for transmission are performed and the registration process is terminated. The details will be described later.

At step S16B-003, addition and alteration of user data, such as user's phone number and user's abbreviated name, are performed, and the registration process is terminated. The details will be explained later.

At step S16B-004, addition and alteration of service data, such as a signal transmission level and a control parameter of a communication protocol, are performed, and the registration process is terminated. The details will be explained later.

Figure 33:
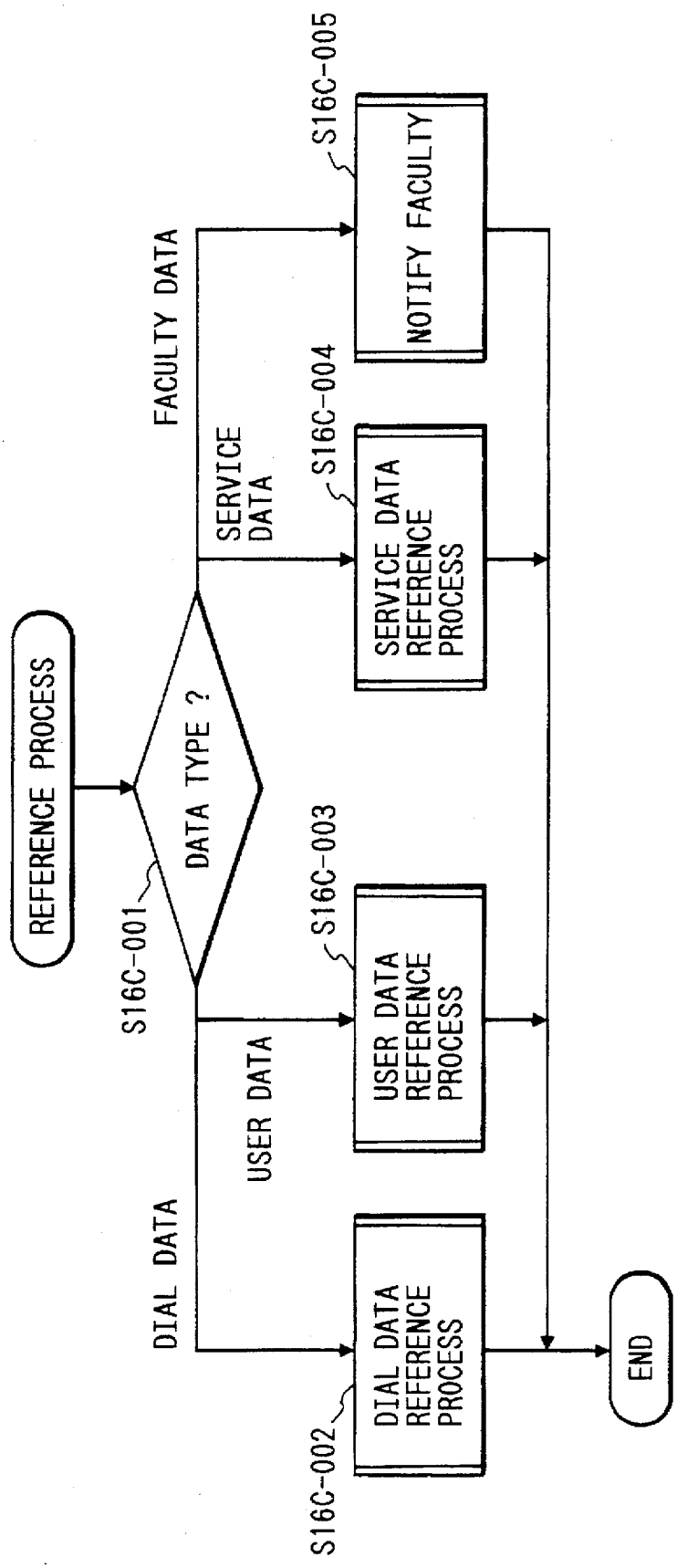
FIG. 33 is a flowchart showing the reference process in FIG. 31.

FIG. 33 is a detailed flowchart for a registration process that is performed at step S16A-003 in FIG. 31.

At step S16C-001, a type of data, for which a reference process is to be performed, is ascertained. When the data type is dial data, program control advances to step S16C-002. When the data type is user data, program control moves to step S16C-003. When the data type is service data, program control moves to step S16C-004. When the data type is faculty data, program control goes to step S16C-005.

At step S16C-002, the reference process for dial data that are used for transmission is performed, and the process is thereafter terminated. The details will be described later.

At step S16C-003, the reference process for user data, such as user's phone number and user's abbreviated name, is performed, and the process is thereafter terminated. The details will be explained later.

At step S16C-004, the reference process for service data, such as a signal transmission level and a control parameter of a communication protocol, is performed, and the process is terminated. The details will be explained later.

At step S16C-005, transferred in a character data format via the I/F controller 113 to the information processing terminal 114 are data concerning the functions that the facsimile apparatus in this embodiment has and that the information processing terminal 114 can utilize. These functions include transmission, reception, printing, and scanning functions, and data for identifying a unit, such as a maker name, an apparatus name, a ROM version, and a serial number. The reference process is thereafter terminated.

Figure 34:
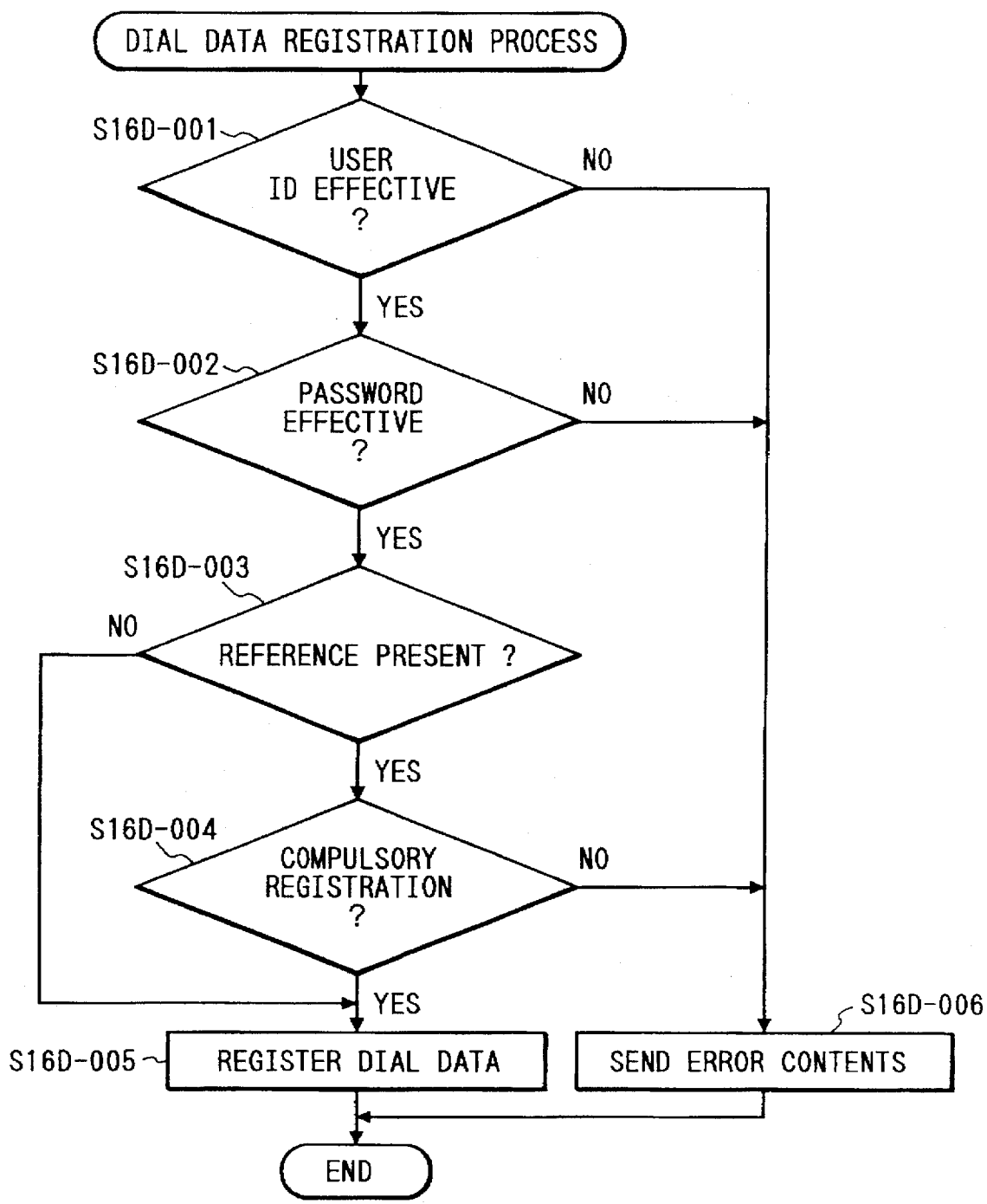
FIG. 34 is a flowchart showing the dial data registration process in FIG. 32.

FIG. 34 is a detailed flowchart showing the dial data registration process performed at step S16B-002 in FIG. 32.

At step S16D-001, a check is performed to determine whether or not a user ID that is sent from the information processing terminal 114 is effective. If the user that has the user ID is already registered in the apparatus, program control advances to step S16D-002. If the user is not registered yet, program control moves to step S16D-006.

At step S16D-002, a check is performed to determine whether or not a password that is sent from the information processing terminal 114 is effective. If a password that corresponds to the user ID is not registered in the apparatus, or if a password that corresponds to the user ID is already registered and that password matches the designated password, program control moves to step S16D-003. On the contrary, when the password that corresponds to the user ID is already registered, and that password does not match the designated password, program control goes to step S16D-006.

At step S16D-003, if a job focusing dial data, which is designated by the user ID and the index number, is registered in the transmission queue, a check is performed to determine whether the job is in the wait state or is being executed. When there is no job that uses the dial data, program control moves to step S16D-005. When there is a job, program control goes to step S16D-006.

At step S16D-004, a check is performed to determine whether or not compulsory registration is requested as a command failure process condition. If it is requested, program control advances to step S16D-005, and otherwise, goes to step S16D-006.

At step S16D-005, partner's phone number and partner's abbreviated name, which are transmitted from the information processing terminal 114, and data, such as parameters required for facsimile communication, are registered in the area of the RAM 103, which is designated by the user ID and the index number. When the area that is designated by the user ID and the index number is unused, an addition process is performed. When the area is already used for registration, an alteration process is performed. If the data that are transmitted from the information processing terminal 114 are invalid, a deletion process is performed. The dial data registration process is thereafter terminated.

At step S16D-006, when the user ID or the password that is sent from the information processing terminal 114 is invalid, or when there is already a job that uses dial data that are to be registered and no compulsory registration is required, dial data are registered. The contents of the error are output via the I/F controller 113 to the information processing terminal 114. The dial data registration process is abnormally terminated.

Figure 35:
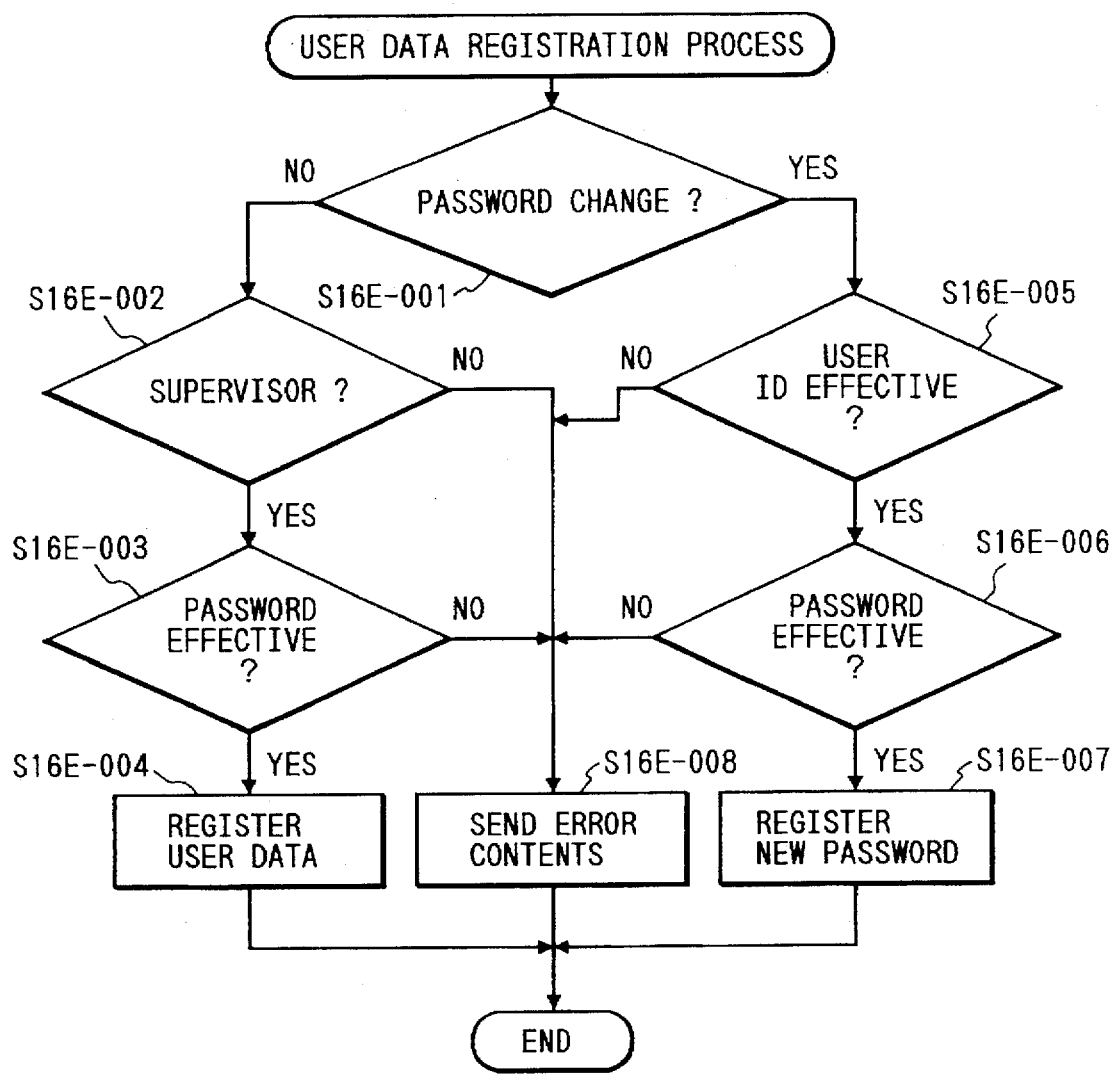
FIG. 35 is a flowchart showing the user data registration process in FIG. 32.

FIG. 35 is a detailed flowchart for a user data registration process performed at step S16D-003 in FIG. 32.

At step S16E-001, a check is performed to determine whether or not a request, which is sent via the I/F controller 113 from the information processing terminal 114, concerns the alteration of a password. If the request is not for the alteration of a password, program control advances to step S16E-002.

At step S16E-002, a check is performed to determine whether or not the user ID sent from the information processing terminal 114 belongs to a system manager. If the user ID belongs to the system manager, program control advances to step S16E-003. If not, program control goes to step S16E-008.

At step S16E-003, a check is performed to determine whether or not a password that is sent from the information processing terminal 114 is effective. If a password of a system manager is not registered in the apparatus, or if a password of a system manager is already registered and that password matches the designated password, program control moves to step S16E-004. On the contrary, when the password of the system manager is already registered, and that password does not match the designated password, program control goes to step S16E-008.

At step S16E-004, data that are received from the information processing terminal 114 are stored in the areas of the RAM 103 that correspond to all the data items, or the data items that are designated by the information processing terminal 114, such as local phone number, the local abbreviated name, and data concerning user management. In the registration of data for user management, for example, if the user ID is not yet registered, the addition of user ID is performed. If the user ID is already registered, alternation of the user ID is performed. If no user data is provided, deletion of the user ID is performed. The user data registration process is thereafter terminated.

When, at step S16E-001, the change of the password is requested, program control moves to step S16E-005. At step S16E-005, a check is performed to determine whether or not a user ID that is sent from the information processing terminal 114 is effective. If the user that has the user ID is already registered in the apparatus, program control advances to step S16E-006. If the user ID is not registered, program control moves to step S16E-008.

At step S16E-006, a check is performed to determine whether or not a password that is sent from the information processing terminal 114 is effective. If a password that corresponds to the user ID is not registered in the apparatus, or if a password that corresponds to the user ID is already registered and that password matches the designated password, program control moves to step S16E-007. On the contrary, when the password that corresponds to the user ID is already registered, and that password does not match the designated password, program control goes to step S16E-008.

At step S16E-007, a new password that is sent from the information processing terminal 114 is registered in the area for the user's password in the RAM 103 that is designated by the user ID. The user data registration process is thereafter terminated.

The procedure at step S16E-008 is performed when, at step S16E-002, the user ID sent from the information processing terminal 114 does not belong to the system manager, or when, at one of steps S16E-003, S16E-005, and S16E-006, the user ID or the password is ineffective. The contents of an error are output via the I/F controller 113 to the information processing terminal 114. The user data registration process is abnormally registered.

Figure 36:
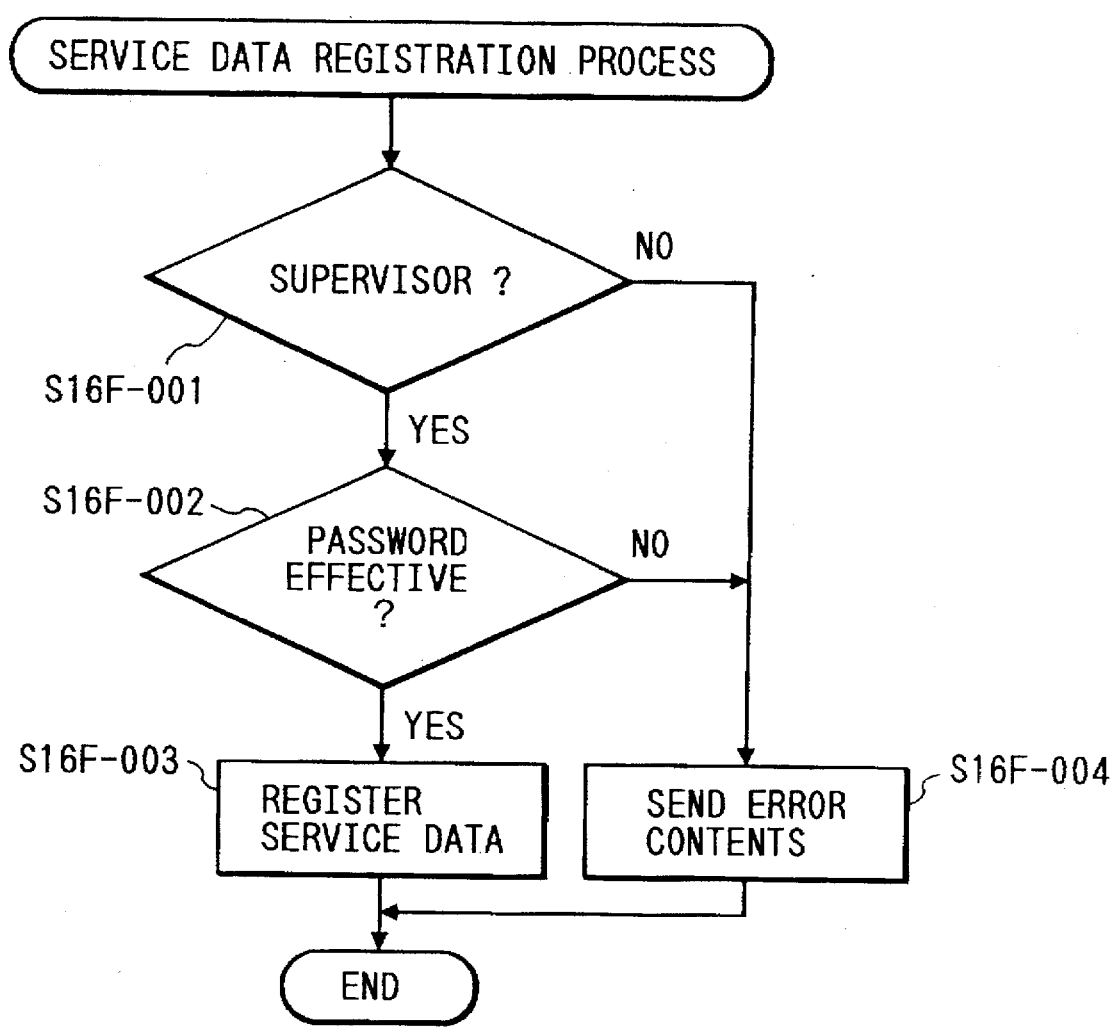
FIG. 36 is a flowchart showing the service data registration process in FIG. 32.

FIG. 36 is a detailed flowchart showing a service data registration process performed at step S16B-004 in FIG. 32.

At step S16F-001, a check is performed to determine whether or not a user ID transmitted from the information processing terminal 114 belongs to the system manager. When the user ID belongs to a system manager, program control advances to step S16F-002. If not, program control moves to step S16F-004.

At step S16F-002, a check is performed to determine whether or not a password that is sent from the information processing terminal 114 is effective. If a password of a system manager is not registered in the apparatus, or if a password of a system manager is already registered and that password matches the designated password, program control moves to step S16F-003. On the contrary, when the password of the system manager is already registered, and that password does not match the designated password, program control goes to step S16F-004.

At step S16F-003, data that are received from the information processing terminal 114 are stored in the areas of the RAM 103 that correspond to all the data items, or the data items that are designated by the information processing terminal 114, such as a signal transmission level, and a control parameter for a communication protocol. The service data registration process is thereafter terminated.

Figure 37:
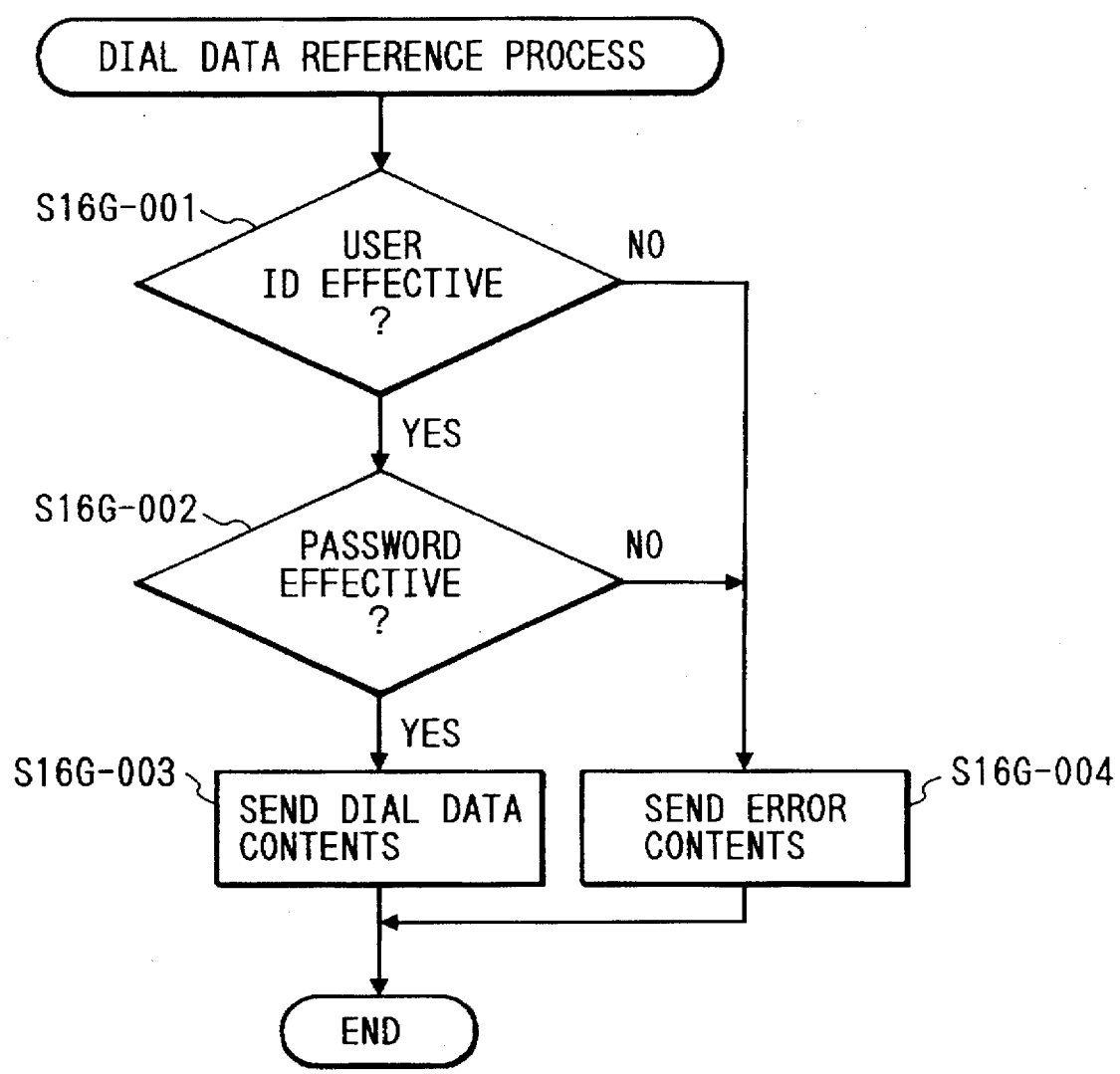
FIG. 37 is a flowchart showing the dial data reference process in FIG. 33.

When the user ID or the password that is sent from the information processing terminal 114 is invalid, the procedure at step S16F-004 is performed. The contents of the error are output via the I/F controller 113 to the information processing terminal 114. The service data registration process is abnormally terminated, FIG. 37 is a detailed flowchart showing the dial data reference process performed at step S16C-002 in FIG. 33.

At step S16G-001, a check is performed to determine whether or not a user ID that is sent from the information processing terminal 114 is effective. If the user that has the user ID is already registered in the apparatus, program control advances to step S16G-002. If the user ID is not registered yet, program control moves to step S16G-004.

At step S16G-002, a check is performed to determine whether or not a password that is sent from the information processing terminal 114 is effective. If a password that corresponds to the user ID is not registered in the apparatus, or if a password that corresponds to the user ID is already registered and that password matches the designated password, program control moves to step S16G-003. On the contrary, when the password that corresponds to the user ID is already registered, and that password does not match the designated password, program control goes to step S16G-004.

At step S16G-003, via the I/F controller 113 to the information processing terminal 114 are output partner's phone number, partner's abbreviated name, and data, such as parameters required for facsimile communication, that are registered in the areas of the RAM 103 that are designated by the user ID and the index number, or in the areas of the RAM 103 that correspond to the designated user ID and all the index numbers. The dial data reference process is thereafter terminated.

The procedure at step S16G-004 is performed when the user ID or the password that is sent from the information processing terminal 114 is invalid. The contents of the error are output via the I/F controller 113 to the information processing terminal 114. The dial data reference process is abnormally terminated.

Figure 38:
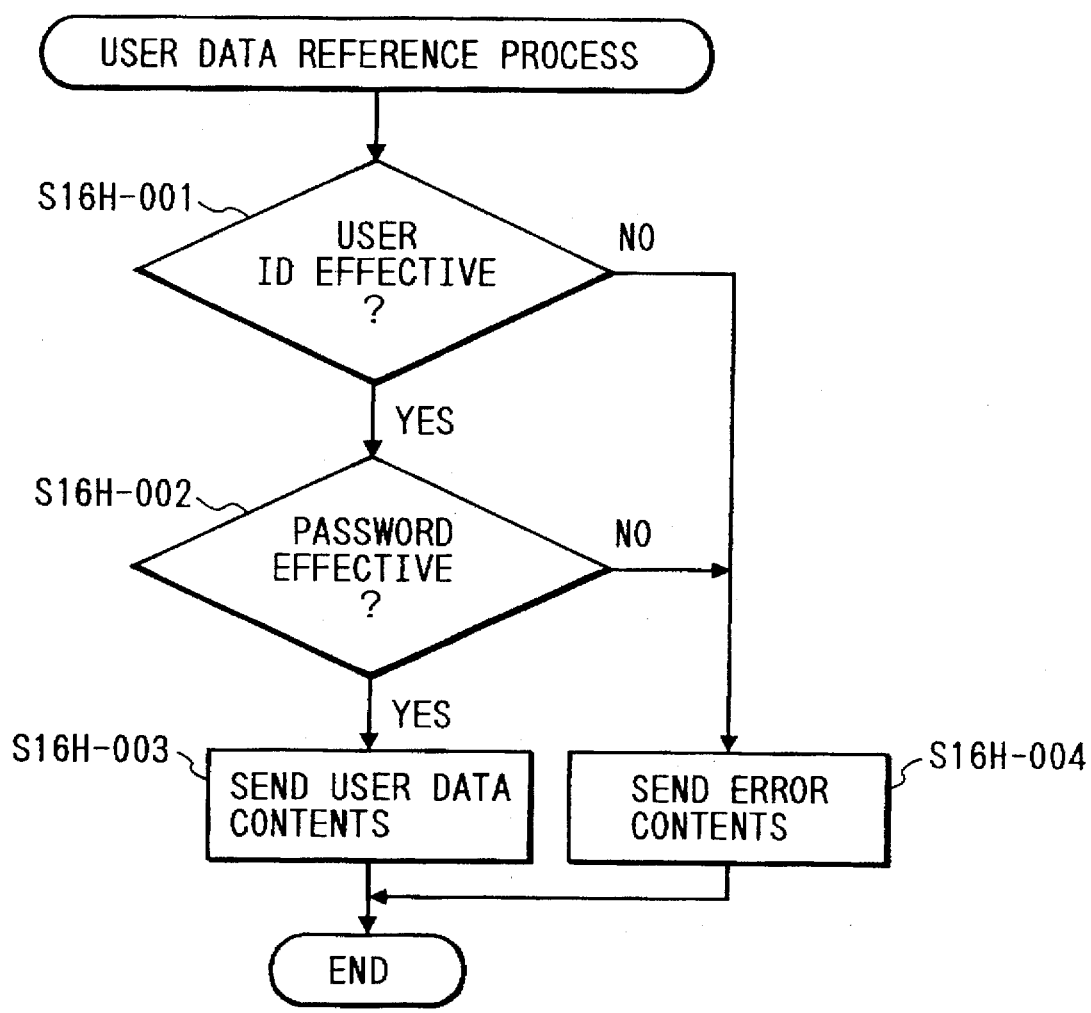
FIG. 38 is a flowchart showing the user data reference process in FIG. 33.

FIG. 38 is a detailed flowchart for a user data reference process performed at step S16C-003 in FIG. 33.

At step S16H-001, a check is performed to determine whether or not the user ID sent from the information processing terminal 114 is effective. If the user that has the user ID is registered in advance in the apparatus, program control advances to step S16H-002. If not, program control goes to step S16H-004.

At step S16H-002, a check is performed to determine whether or not a password that is sent from the information processing terminal 114 is effective. If a password that corresponds to the user ID is not registered in the apparatus, or if a password that corresponds to the user ID is already registered and that password matches the designated password, program control moves to step S16H-003. On the contrary, when the password that corresponds to the user ID is already registered, and that password does not match the designated password, program control goes to step S16H-004.

At step S16H-003, output to the information processing terminal 114 are data that are stored in the areas of the RAM 103 that correspond to all the data items or the data items, such as user's phone number, the user's abbreviated name, and data concerning user management, that are designated by the information processing terminal 114. The user data reference process is thereafter terminated.

When the user ID or the password that is sent from the information processing terminal 114 is invalid, the procedure at step S16H-004 is performed. The contents of the error are output via the I/F controller 113 to the information processing terminal 114. The service data reference process is abnormally terminated.

Figure 39:
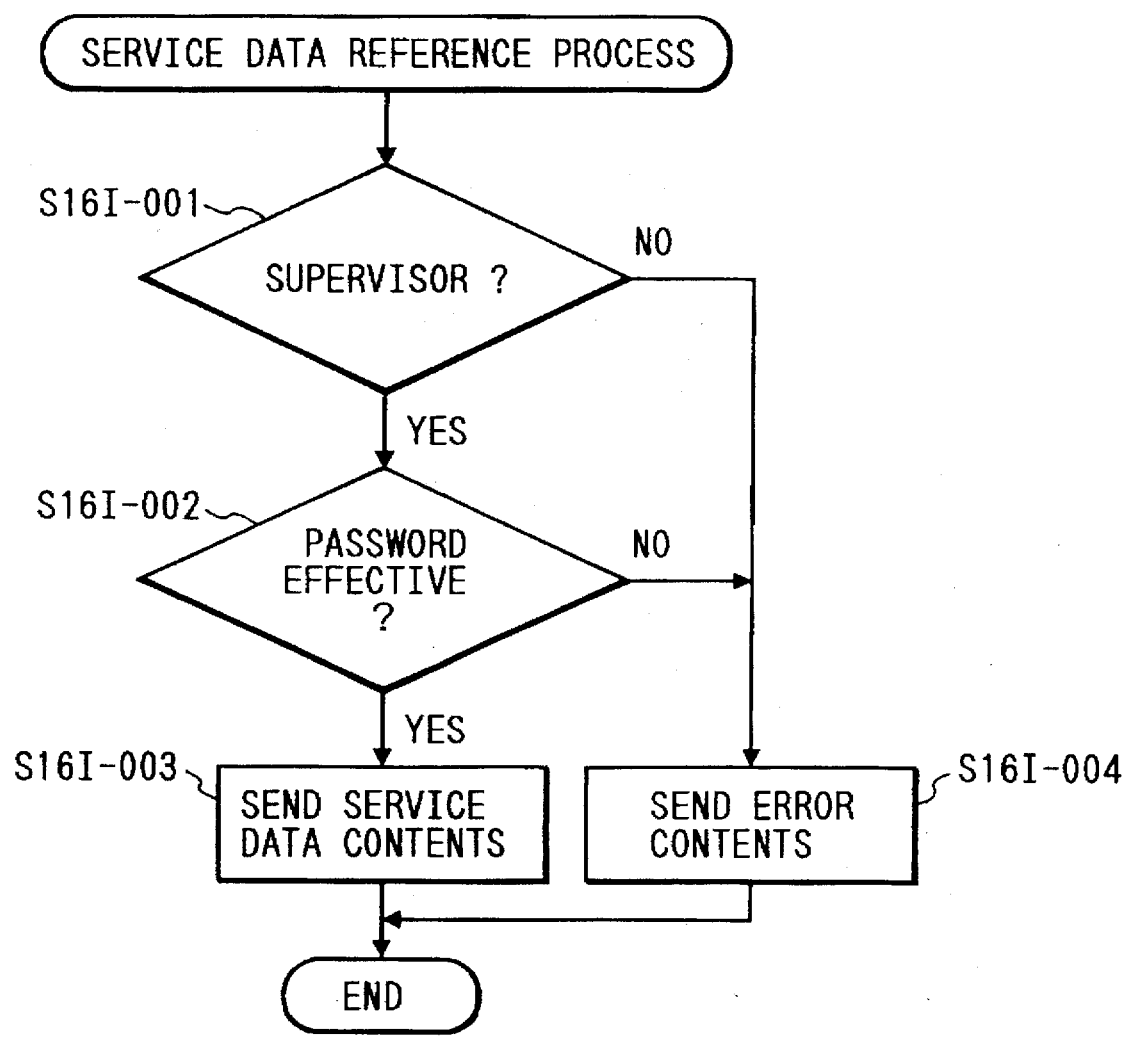
FIG. 39 is a flowchart showing the service data reference process in FIG. 33.

FIG. 39 is a detailed flowchart showing a service data reference process performed at step S16C-004 in FIG. 33.

At step S16I-001, a check is performed to determine whether or not a user ID transmitted from the information processing terminal 114 belongs to the system manager. When the user ID belongs to a system manager, program control advances to step S16I-002. If not, program control moves to step S16I-004.

At step S16I-002, a check is performed to determine whether or not a password that is sent from the information processing terminal 114 is effective. If a password of a system manager is not registered in the apparatus, or if a password of a system manager is already registered and that password matches the designated password, program control moves to step S16I-003. On the contrary, when the password of the system manager is already registered, and that password does not match the designated password, program control goes to step S16I-004.

At step S16I-003, data that are received from the information processing terminal 114 are stored in the areas of the RAM 103 that correspond to all the data items, or data items, such as a signal transmission level and a control parameter for a communication protocol, that are designated by the information processing terminal 114. The service data reference process is thereafter terminated.

When the user ID or the password that is sent from the information processing terminal 114 is invalid, the procedure at step S16I-004 is performed. The contents of the error are output via the I/F controller 113 to the information processing terminal 114. The service data reference process is abnormally terminated.

As described above, in response to a request from the information processing terminal 114, the facsimile apparatus in the embodiment performs the reference and registration processes for various data that are managed by the facsimile apparatus and that are dial data used for transmission, user data such as the user's phone number and the user's abbreviated name, and service data such as a signal transmission level, and a control parameter for a communication protocol. Further, according to the above processes, (1) Even a facsimile apparatus that can display only limited characters can use a high-level user interface of the information processing terminal, so that the operation of the facsimile apparatus can be increased.

(2) Since user data, such as the user's phone number and the user's abbreviated name, that are seldom altered and service data, such as a signal transmission level and a control parameter for a communication protocol, of which alteration requires a license of an expert, are so designed that only a specific user can change those data, even if the facsimile apparatus of the present invention is used by multiple people with the information processing terminals, the above data can not be erroneously changed.

(3) Since the dial data that are used for transmission are managed by each user, even if multiple people utilize the facsimile apparatus of the present invention through the information processing terminals, the individual privacy is protected.

(4) It is possible to make a reference and registration for dial data that are used for transmission and to set, in common, both dial data that are managed by the information processing terminal and by the facsimile apparatus of the present invention. That is, either when the facsimile apparatus of the present invention is used in the same way as for a conventional stand-alone facsimile apparatus, or when it is employed under the control of the information processing terminal, the facsimile apparatus can be used smoothly with no trouble.

(5) When a job that uses dial data that are to be changed is registered in the transmission queue, usually, the registration process is abnormally terminated. Therefore, wrong dialing due to an erroneous change of the data can be prevented.

16. Voice data management function

The voice data management function is to download/upload voice data and voice management information that are managed by the auto answer/record controller 109.

FIG. 40 is a block diagram illustrating a voice data processor in the auto answer/record controller 109 in this embodiment. The individual components will now be described.

A DSP 18A-1 performs a compression/decompression process, such as ADPCM, on digitized voice data. The process abides by the answer/record control program of the ROM 102, and is initiated by a command for data storing/reading, which is sent via a bus 18A-8.

A DA converter 18A-2 converts a digital voice signal that is generated by the DSP 18A-1 into an analog signal. A transmission amplifier 18A-3 adjusts a gain of the output signal from the DA converter 18A-2. An AD converter 18A-4 converts the analog voice signal into a digital signal. A reception amplifier 18A-5 adjusts the gain of an input signal to the AD converter 18A-4.

A voice data storing RAM 18A-6 is employed to store voice data that are compressed by the DSP 18A-1. This RAM may be one part of the RAM 103. A voice data bus 18A-7 is employed to extract or store voice data by the DSP 18A-1 in the voice data storing RAM 18A-6. A bus 18A-8 is equivalent to the system bus 119 in FIG. 1, and is employed to exchange a command for recording/reproduction, a digital voice signal, which is processed by the DSP 18A-1, etc.

"Line Out" indicates the output of an analog signal. The output analog signal is released via a loudspeaker of the console unit 107 and the communication controller 108 to the communication line 116/117 and the telephone set 115. "Line In" indicates the input of the analog signal, and voice from the microphone of the console unit 107 and voice through the communication line 116/117 and the telephone set 115 via the communication controller 108 are input.

FIG. 41 is a schematic diagram illustrating the voice management in this embodiment.

A voice management record is stored in the RAM 103. Voice ID, a voice mode (response message, reception message, or speech message), record start time, a record period, and voice management table numbers, which will be described later, are stored in the individual management records.

The management records are linked together by a next pointer (nextptr). An end symbol of, for example, "0" is provided for the last data to terminate the series of data.

A head file pointer is a variable that is provided in the RAM 103, and an address at which the head file data are stored is held. When no file is managed, an end symbol such as 0 is stored.

The voice management table is used by the DSP 18A-1 to manage compressed voice data in the voice storing RAM 18A-6. The voice management table is provided in the RAM of the DSP 18A-1. A number that can be identified is assigned to each management table, and the start address and the data size of voice data, which are stored in the voice storing RAM 18A-6, are entered in the voice management table.

The auto answer/record control program in the ROM 102, for example, issues a storage start command to the DSP, acquires a voice management table number where a message is stored, and then stores data together with others such as a voice ID into the voice management record. To read out the message, a voice management table number in the voice management record, which is found by a voice ID, and a read command are issued. Then, the DSP 18A-1 can employ the voice management table number to sequentially access the voice data beginning with the start address.

FIG. 42 is a flowchart showing the control process for voice data management function in this embodiment.

At step S1801, a check is performed to determine whether or not a requested process is a voice data process. This request may be made by a command that is transmitted via the I/F controller 113 from the information processing terminal 114, or the facsimile apparatus may voluntarily perform this process. When the request is made for a voice data process, a check is performed to determine whether or not the process is an upload process (S1802). When the upload process is requested, the voice data upload process is performed at S1803. When the upload process is not requested, the voice data download process is performed at S1804.

In the voice data upload process (S1803), a voice message that is managed by a designated voice ID is read from the voice storing RAM 18A-6, and is output as a digital signal via the I/F controller 113 to the information processing terminal 114. If necessary, the digital signal process, such as sampling rate conversion, is performed by the DSP 18A-1.

In the voice data download process (S1804), a digital signal, which is received via the I/F controller 113 from the information processing terminal 114, is stored in the voice storing RAM 18A-6, and a voice management record and a voice management table are prepared. If necessary, the digital signal process, such as sampling rate conversion, is performed by the DSP 18A-1.

When, at S1801, the request is not form the voice data process, at S1805, a check is performed to determine whether or not the upload process is requested. When the upload process is requested, at S1806, the voice management information upload process is performed. when the upload process is not requested, at S1807, a voice management information operating process is performed.

In the voice management information upload process (S1806), a data, such as voice ID for currently recorded voice data, a recording start time, a mode, and a recording period, that are stored in the voice management record are transmitted via the I/F controller 113 to the information processing terminal 114.

In the voice management information operating process (S1807), a voice message that corresponds to a designated voice ID is erased, or voice is output from the loudspeaker of the console unlit 107.

According to the voice data management function, the download and upload processes for voice data and voice management information can be performed. It is therefore possible to manage voice data by the information processing terminal.

Further, voice data and voice management information are automatically uploaded to the information processing terminal each time a reception message is recorded or when several received messages are accumulated. The message full state can be prevented and an easily operating apparatus can be provided.

17. Host dial function

The host dial function is to make a call from the information processing terminal and to perform a line control process. This function performs a series of processes of linking of lines, connection to a communication partner, and disconnection of lines, so that the information processing terminal can use the dial function of the facsimile apparatus.

FIG. 43 is a flowchart for the control process of the facsimile apparatus with a host dialing function.

At step S19-001, a host dial instruction is received. In this process, the CPU 101 of the facsimile apparatus receives the host dial instruction. This instruction sometimes includes both the linking of the lines and a select signal number, and other times does not. For example, suppose that the communication partner is selected from an address list that is included in the database, which the information processing terminal uses, and that partner is forced to make a call. This corresponds to the former case. When there is no instruction received, a request for the host dial result is monitored (S19-010).

At step S19-002, the host dial execution condition is ascertained. In this process, the received host dial instruction is translated and a check is performed to determine whether or not the instruction can be executed. This decision is made by referring to statuses of a modem, an NCU, a communication line, a handset, and a telephone set. When the instruction can not be executed, an error response is transmitted (S19-003). When the instruction can be executed, a dial process (S19-004) is performed.

At step S19-003, an error response is transmitted to the information processing terminal 114.

At step S19-004, a dial process in consonance with the host dial instruction is performed. The dial process includes not only a calling process, but also the control of communication lines for calling that the facsimile apparatus can perform, such as linking and disconnecting of lines, operation of an on-hook key land a hands-free key, DT and the setting of detection or non-detection of ringing tone and busy tone, and setting/release of a pending state.

At step S19-005, the connection state is transmitted. In this process, the CPU 101 of the facsimile apparatus controls the NCU and the modem to send to the information processing terminal 114 the connection state, such as normal connection or detection of busy tone.

At step S19-006, the succeeding data reception from the host is ascertained. In this process, the CPU 101 of the facsimile apparatus examines whether or not the next data (host dial instruction) has been received. When the data indicating the reception (S19-001) of host dial instruction designate a series of processes, it is assumed that there is no next data. A specific method for confirmation is selected as the end condition. For example, as an example, it is assumed that there is no next data when no data is transmitted until 60 seconds elapses following the calling and the connecting to the communication partner. When there is no next data present, a response is transmitted (S19-008). As an example case of the reception of the next data, the information processing terminal 114 issues an instruction (S19-001) to execute only the linking of communication lines, and a select signal is to be transmitted in consonance with the result. When there is the next data present, the dial process (S19-004) is performed in consonance with that data.

At step S19-007, a response is transmitted. In this process, the CPU 101 of the facsimile apparatus sends a response that indicates the result obtained by executing the host dial process to the information processing terminal 114.

At step S19-008, a check is performed whether or not the line is released. The CPU 101 of the facsimile apparatus examines whether or not the line is released.

At step S19-009, an end message is forwarded. The CPU 101 of the facsimile apparatus transmits an end notice to the information processing terminal 114.

At step S19-010, a check is performed to determine whether or not there is a request for the host dial result. In this process, the CPU 101 of the facsimile apparatus examines whether or not the information processing terminal 114 has made a request for the result of the host dial process. When there is no request, program control is returned in the waiting state.

At step S19-011, the result obtained by the host dial process is transmitted. The CPU 101 of the facsimile apparatus sends the host dial result to the information processing terminal 114.

According to the host dial function, the dialing can be performed by using data that the information processing terminal handles without requiring the direct manipulation of the facsimile apparatus or the telephone set. In other words, the address list and phone data that are prepared by various application software can be linked with the dial function, and the operation can be more facilitated.

The control processes of the individual functions of the facsimile apparatus in this embodiment have been explained. The control processes of the functions can be variously modified to accomplish these functions.

What is claimed is:

1. An image processing apparatus comprising:
   interface means for exchanging data with an external information processing terminal;
   instruction receiving means for receiving an instruction via said interface means from said external information processing terminal, said instruction receiving means being able to receive another instruction even though said apparatus is performing a control process for one instruction, said instruction including first information indicating a type of a process to be performed and second information indicating how to perform the process; and
   control means, capable of controlling various processes, such as communication, image recording, image reading, for selecting a type of process to be performed in accordance with the first information, and changing control of the selected process in accordance with the second information.

2. An image processing apparatus according to claim 1, wherein said instruction includes third information indicating a process to be performed when an abnormality has occurred during said various processes.

3. An image processing apparatus comprising:
   interface means for exchanging data with an external information processing terminal;
   instruction receipt means for receiving an instruction via said interface means from said external information processing terminal;
   control means for controlling various processes, such as communication, image recording, and image reading, in accordance with said instruction received by said instruction receipt means; and
   identifier issuing means for transmitting an identifier, for specifying said instruction received by said instruction receipt means, via said interface means to said external information terminal.

4. An image processing apparatus according to claim 3, further comprising means for setting a priority order for executing said various processes.

5. An image processing apparatus according to claim 3, wherein said instruction receipt means receives another instruction even if a control process for one instruction is being performed.

6. An image processing apparatus according to claim 3, further comprising process result notification means for, when said various processes are terminated, performing notification of results of said various processes via said interface means, with said identifier that corresponds to each of said results.

7. An image processing apparatus according to claim 3, wherein said instruction includes first information indicating types of said various processes and second information indicating a process to be performed when said various processes are terminated.

8. An image processing apparatus according to claim 3, wherein said instruction includes third information indicating a process to be performed when an abnormality has occurred during said various processes.

9. An image processing apparatus according to claim 6, wherein said instruction receipt means receives from said external information processing terminal an instruction requesting a processing state for an operation that corresponds to said identifier, and wherein said process result notification means performs a notification for a process result of said operation that corresponds to said identifier.

10. An image processing method performed in an image processing apparatus which is connected to an external information terminal and performs a data processing operation in accordance with an instruction from the external information processing terminal, comprising the steps of:
    receiving the instruction from the external information processing terminal;
    receiving another instruction even though the apparatus is performing a control process for one instruction, the instruction including first information indicating a type of a process to be performed and second information indicating how to perform the process;
    selecting a type of a process to be performed in accordance with the first information; and
    changing performance of the selected process in accordance with the second information.

11. An image processing method according to claim 10, wherein the instruction includes third information indicating an error process to be performed when an abnormally has occurred during the selected process.

12. An image processing method performed in an image processing apparatus which is connected to an external information terminal and performs a data processing operation in accordance with an instruction from the external information processing terminal, comprising the steps of:
    receiving the instruction from the external information processing terminal;
    transmitting an identifier for specifying the received instruction to the external information processing terminal; and
    controlling various processes, such as communication, image recording, and image reading, in accordance with the received instruction.

13. An image processing method according to claim 12, wherein said instruction receiving step includes receiving another instruction even if a control process for one instruction is being performed.

14. An image processing method according to claim 12, further comprising a step of notifying the external information processing terminal of results of the various processes with the identifier that corresponds to each of the results when the various processes are terminated.

15. An image processing method according to claim 12, wherein the instruction includes first information indicating a type of a process to be performed and second information indicating how to perform the process.

16. An image processing method according to claim 12, wherein the instruction includes third information indicating an error process to be performed when an abnormality has occurred during the various process.

17. An image processing method according to claim 12, further comprising the steps of:

receiving an instruction requesting a processing state, which includes the identifier, from the external information processing terminal; and notifying the external information processing terminal of a processing state corresponding to the identifier included in the instruction.

18. An image processing method according to claim 12, further comprising the step of setting a priority order for executing the various processes.

* * * * *

UNITED STATES PATENT AND TRADEMARK OFFICE
CERTIFICATE OF CORRECTION

PATENT NO. : 5,720,014

DATED : February 17, 1998

INVENTOR(S): ATSUSHI IKEDA ET AL.

It is certified that error appears in the above-identified patent and that said Letters Patent is hereby corrected as shown below:

<u>COLUMN 29</u>

Line 61, "Mount" should read --amount--.

<u>COLUMN 39</u>

Line 56, "flap" should read --flag--.

<u>COLUMN 52</u>

Line 50, "abnormally" should read --abnormality--.

<u>COLUMN 53</u>

Line 15, "process." should read --processes.--.

Signed and Sealed this

Eighteenth Day of August, 1998

*Attest:*

BRUCE LEHMAN

*Attesting Officer*    *Commissioner of Patents and Trademarks*